(12) United States Patent
Gross et al.

(10) Patent No.: US 11,279,649 B2
(45) Date of Patent: Mar. 22, 2022

(54) FRACTURE AND SCRATCH RESISTANT GLASS ARTICLES

(71) Applicant: CORNING INCORPORATED, Corning, NY (US)

(72) Inventors: Timothy Michael Gross, Corning, NY (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/606,596

(22) Filed: May 26, 2017

(65) Prior Publication Data

US 2017/0341973 A1    Nov. 30, 2017

Related U.S. Application Data

(60) Provisional application No. 62/358,379, filed on Jul. 5, 2016, provisional application No. 62/342,558, filed on May 27, 2016.

(51) Int. Cl.
    *C03C 3/097*    (2006.01)
    *C03C 21/00*    (2006.01)
    *C03C 4/18*     (2006.01)

(52) U.S. Cl.
    CPC ............... *C03C 3/097* (2013.01); *C03C 4/18* (2013.01); *C03C 21/002* (2013.01); *C03C 2204/00* (2013.01)

(58) Field of Classification Search
    CPC ....... C03C 21/002; C03C 3/097; C03C 3/091; C03C 3/064; C03C 3/083; C03C 3/04; C03C 3/089; C03C 10/0054
    See application file for complete search history.

(56) References Cited

U.S. PATENT DOCUMENTS 3,395,998 A * 8/1968 Olcott .................... C03C 3/083
                                                    65/111
3,433,611 A   3/1969 Saunders et al.
(Continued)

FOREIGN PATENT DOCUMENTS

CN    102167507 A    8/2011
GB     1115972 A     6/1968
(Continued)

OTHER PUBLICATIONS

English Translation of JP2018541181 Office Action dated Jun. 3, 2020; 10 Pages; Japanese Patent Office.
(Continued)

*Primary Examiner* — Humera N. Sheikh
*Assistant Examiner* — Elizabeth D Ivey
(74) *Attorney, Agent, or Firm* — Jeffrey A. Schmidt

(57) ABSTRACT

Embodiments of glass compositions, glass articles and chemically strengthened glass articles are disclosed. In one or more embodiments, the glass composition comprises $Li_2O$, greater than about 0.9 mol % $B_2O_3$, $Al_2O_3$ in an amount greater than or equal to 10 mol %, and from about 60 mol % to about 80 mol % $SiO_2$. Embodiments of the chemically strengthened glass article include a first major surface and an opposing second major surface defining a thickness t, a compressive stress layer extending from the first major surface to a depth of compression greater than about 0.12 t, a maximum compressive stress of about 200 MPa or greater, and a Knoop Lateral Cracking Scratch Threshold greater than about 6 N, as measured on either one of the first major surface and the second major surface. Methods for forming such chemically strengthened glass articles are also disclosed.

24 Claims, 18 Drawing Sheets

(56) References Cited

U.S. PATENT DOCUMENTS

| | | | |
|---|---|---|---|
| 3,907,577 A | 9/1975 | Kiefer et al. | |
| 4,848,998 A * | 7/1989 | Snitzer | C03B 37/01211 |
| | | | 65/390 |
| 8,445,394 B2 | 5/2013 | Aitken et al. | |
| 8,652,978 B2 | 2/2014 | Dejneka et al. | |
| 8,664,130 B2 | 3/2014 | Beall et al. | |
| 8,778,820 B2 | 7/2014 | Gomez et al. | |
| 8,854,623 B2 | 10/2014 | Fontaine et al. | |
| 2002/0049128 A1 * | 4/2002 | Koyama | C03C 3/062 |
| | | | 501/69 |
| 2009/0099002 A1 * | 4/2009 | Fujiwara | C03C 3/068 |
| | | | 501/78 |
| 2009/0142568 A1 | 6/2009 | Dejneka et al. | |
| 2011/0294649 A1 | 12/2011 | Gomez et al. | |
| 2012/0052271 A1 * | 3/2012 | Gomez | C03C 3/091 |
| | | | 428/213 |
| 2012/0135848 A1 | 5/2012 | Beall et al. | |
| 2012/0236526 A1 * | 9/2012 | Weber | C03C 21/002 |
| | | | 361/807 |
| 2012/0321898 A1 | 12/2012 | Meinhardt et al. | |
| 2013/0189486 A1 | 7/2013 | Wang et al. | |
| 2013/0274085 A1 | 10/2013 | Beall et al. | |
| 2014/0023865 A1 * | 1/2014 | Comte | C03C 21/002 |
| | | | 428/410 |
| 2014/0308526 A1 | 10/2014 | Chapman et al. | |
| 2015/0064474 A1 * | 3/2015 | Dejneka | C03B 32/02 |
| | | | 428/410 |
| 2015/0239772 A1 | 8/2015 | Baker et al. | |
| 2016/0376187 A1 | 12/2016 | Gross | |
| 2017/0047542 A1 | 2/2017 | Dejneka et al. | |
| 2017/0174556 A1 | 6/2017 | Miyabe et al. | |

FOREIGN PATENT DOCUMENTS

| | | | |
|---|---|---|---|
| JP | 05-744068 A | 3/1993 | |
| JP | 2011-505323 A | 2/2011 | |
| JP | 2013-527115 A | 6/2013 | |
| JP | 2013-536155 A | 9/2013 | |
| JP | 2013-544229 A | 12/2013 | |
| JP | 2015-516930 A | 6/2015 | |
| JP | 2015-520097 A | 7/2015 | |
| JP | 2015-527970 A | 9/2015 | |
| JP | 2019-517448 | 6/2019 | |
| WO | 2015/162845 A1 | 10/2015 | |
| WO | 2015/164241 A1 | 10/2015 | |
| WO | 2016057787 A2 | 4/2016 | |
| WO | WO-2016057787 A2 * | 4/2016 | C03C 3/091 |

OTHER PUBLICATIONS

Chinese Patent Application No. 201780010712.3, Office Action dated Apr. 13, 2021, 7 pages (English Translation Only); Chinese Patent Office.

International Search Report and Written Opinion of the International Searching Authority; PCT/US2017034442; dated Jul. 26, 2017; 14 Pages; European Patent Office.

* cited by examiner

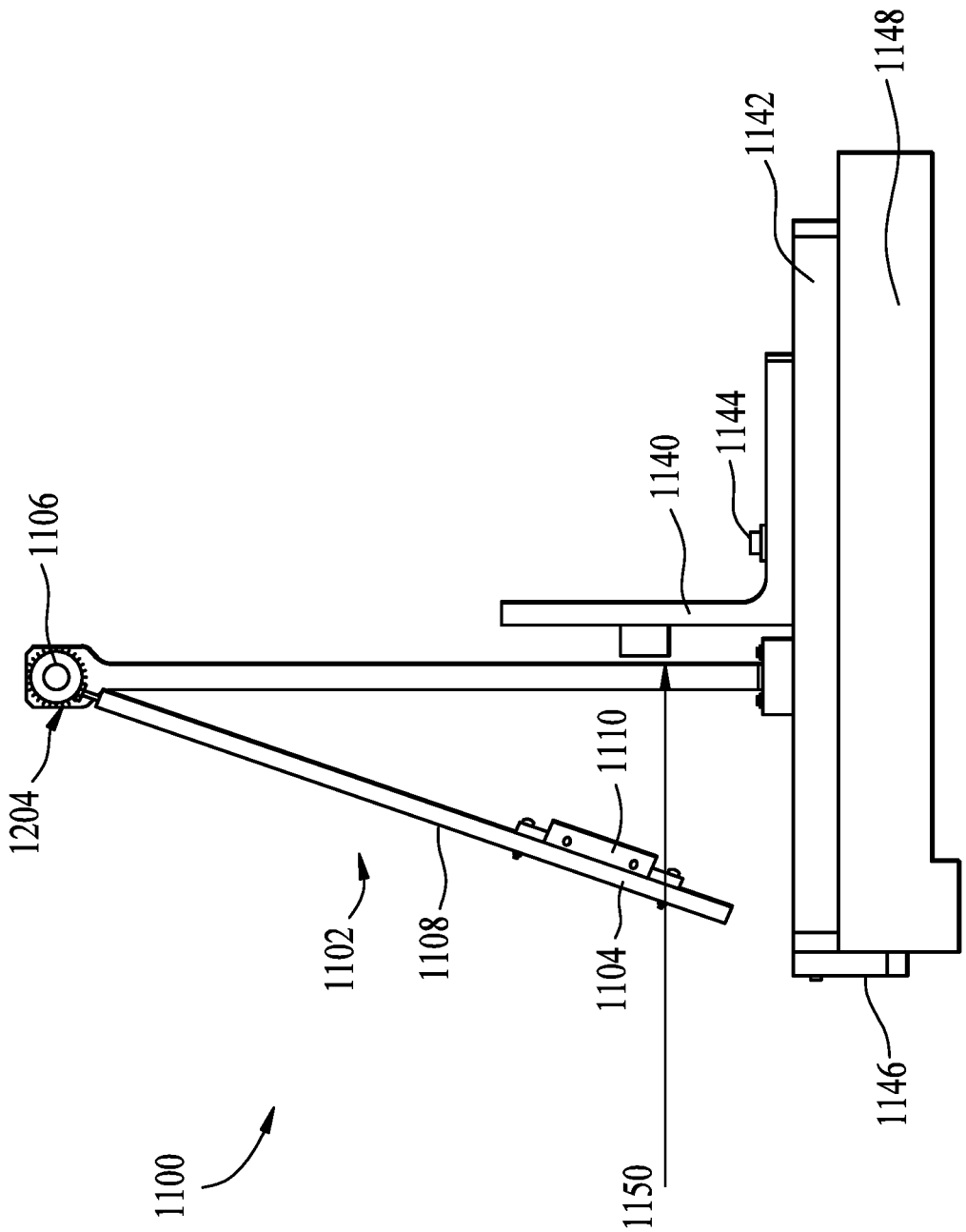

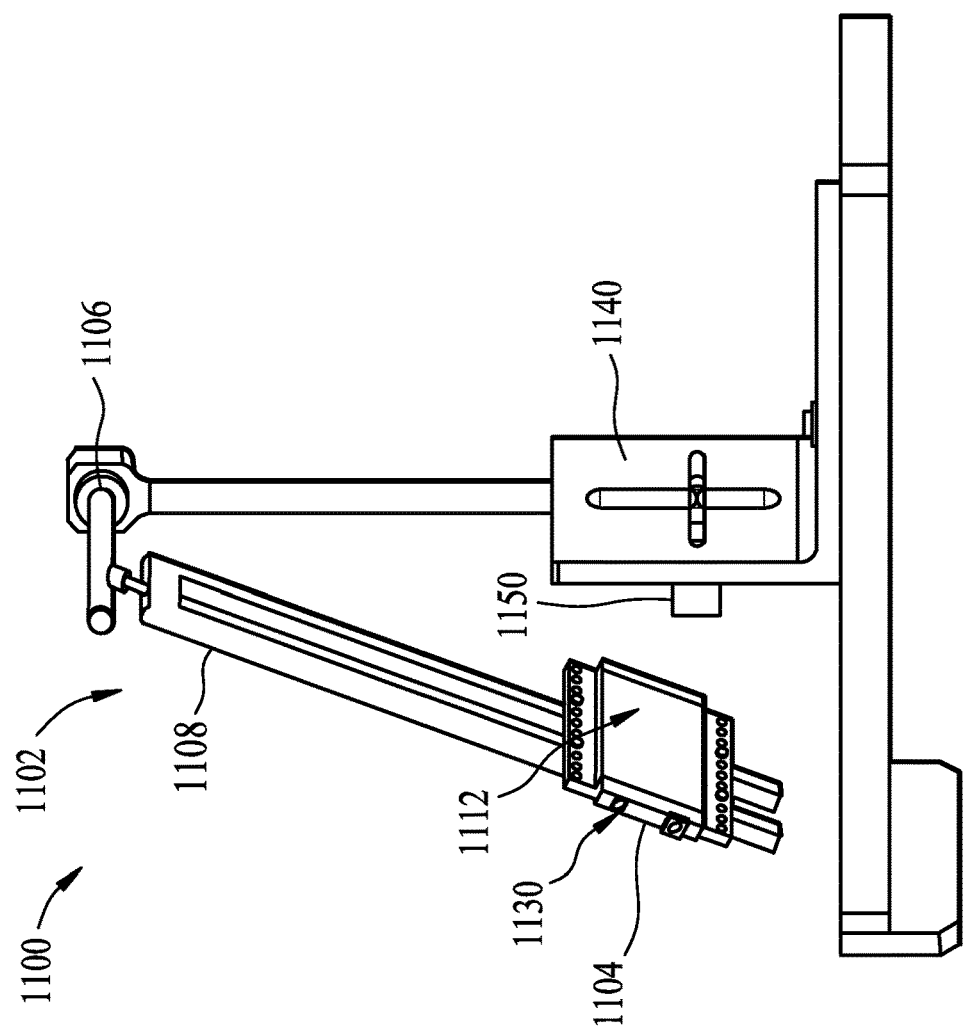
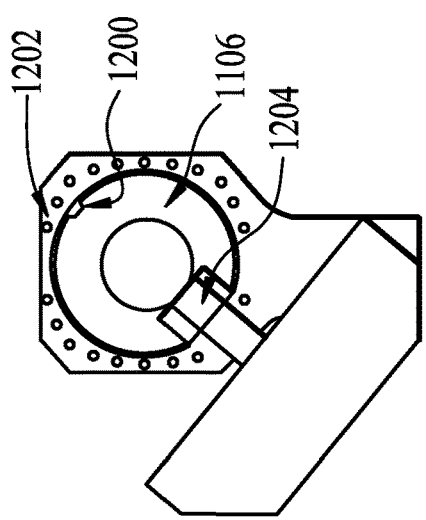

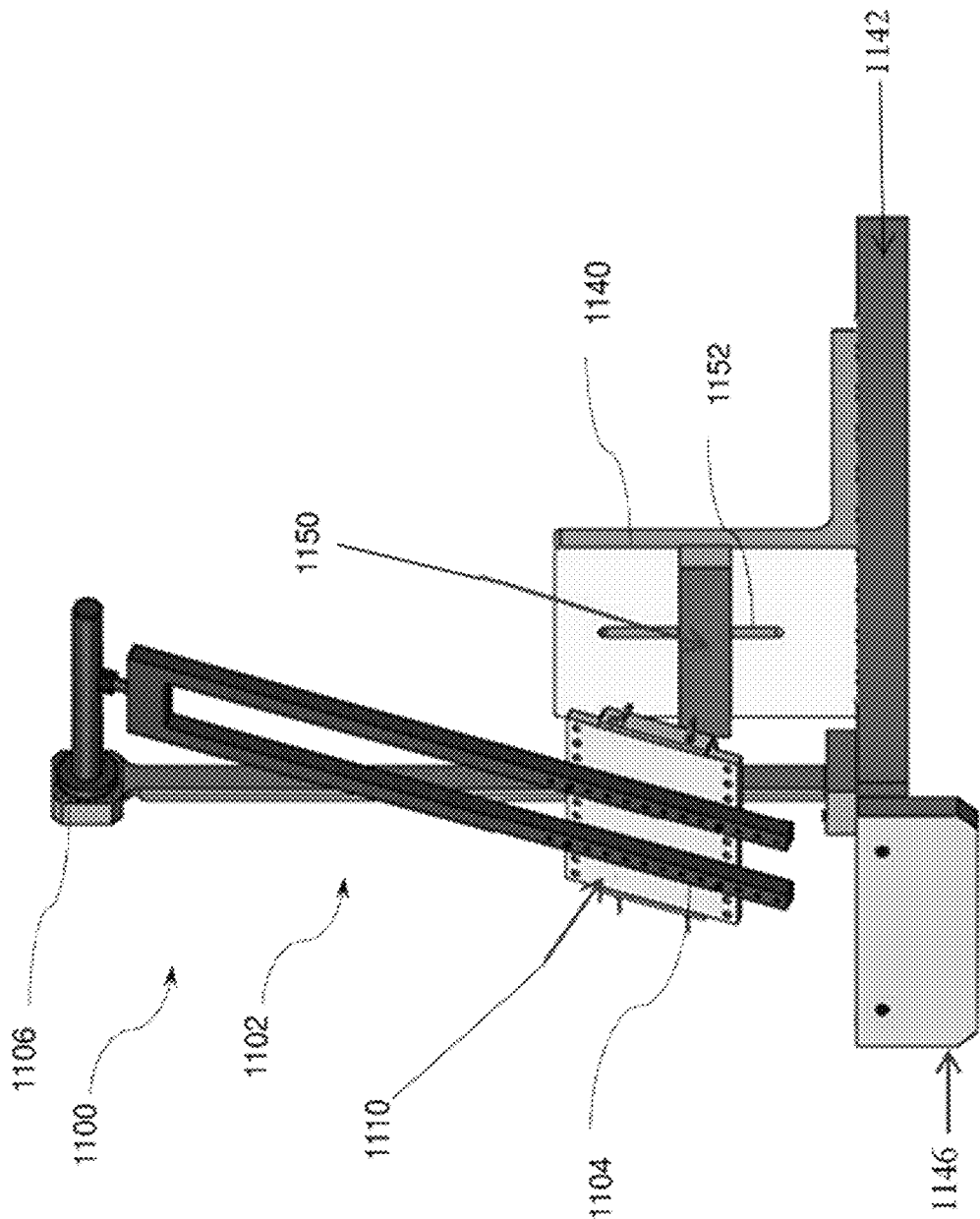

FRACTURE AND SCRATCH RESISTANT GLASS ARTICLES

CROSS-REFERENCE TO RELATED APPLICATIONS

This application claims the benefit of priority under 35 U.S.C. § 119 of U.S. Provisional Application Ser. No. 62/358379 filed on Jul. 5, 2016 and U.S. Provisional Application Ser. No. 62/342558 filed on May 27, 2016, the contents of each of which are relied upon and incorporated herein by reference in their entireties.

BACKGROUND

The disclosure relates to fracture and scratch resistant glass articles and more particularly to glass articles that include $Li_2O$ and $B_2O_3$-containing compositions and exhibit a deep depth of compression and high scratch resistance after being strengthened.

Glass articles often experience severe impacts that can introduce large flaws into a surface of such articles. Such flaws can extend to depths of up to about 200 micrometers (microns, or µm) from the surface. Traditionally, thermally tempered glass articles have been used to prevent failures caused by the introduction of such flaws into the glass because thermally tempered glass articles often exhibit deep compressive stress (CS) layers (e.g., approximately 21% of the total thickness of the glass article), which can prevent the flaws from propagating further into the glass article and thus, can prevent failure. An example of a stress profile generated by thermal tempering is shown in FIG. 1. FIG. 1 is a cross-sectional illustration of the stress profile of a thermally tempered glass article 100 along its thickness, which is depicted along the x-axis. The magnitude of the stress is illustrated on the y-axis with the line 101 representing a zero stress and the crossover between compressive stress and tensile stress.

In FIG. 1, the thermally treated glass article 100 includes a first surface 102, a thickness $t_1$, and a surface CS 110. The thermally treated glass article 100 exhibits a CS that decreases from the first surface 101 to a depth of compression (DOC) 130, the depth within the glass article at which the stress changes from compressive to tensile stress. At depths beyond the DOC, the stress is then tensile and reaches a maximum central tension (CT) 120.

Thermal tempering is currently limited to thick glass articles (i.e., glass articles having a thickness $t_1$ of about 3 millimeters or greater) because, to achieve the thermal strengthening and the desired residual stresses, a sufficient thermal gradient must be formed between the core of such articles and the surface. Such thick articles are undesirable or not practical in many applications such as display (e.g., consumer electronics, including mobile phones, tablets, computers, navigation systems, and the like), architecture (e.g., windows, shower panels, countertops etc.), transportation (e.g., automotive, trains, aircraft, sea craft, etc.), appliance, or any application that requires superior fracture resistance but thin and light-weight articles.

Although chemical strengthening is not limited by the thickness of the glass article in the same manner as thermally tempering, known chemically strengthened glass articles do not exhibit the stress profile of thermally tempered glass articles. An example of a stress profile generated by chemical strengthening (e.g., by an ion exchange process), is shown in FIG. 2. FIG. 2 is a cross-sectional illustration of the stress profile of a known chemically strengthened glass article 200 along its thickness, which is depicted along the x-axis. The magnitude of the stress is illustrated on the y-axis with the line 201 representing a zero stress and the crossover from compressive stress to tensile stress. In FIG. 2, the chemically strengthened glass article 200 includes a first surface 201, a thickness $t_2$ and a surface CS 210. The glass article 200 exhibits a CS that decreases from the first surface 201 to a DOC 230, the depth at which the stress changes from compressive to tensile stress. Beyond the DOC, the stress is tensile and reaches a maximum CT 220. As shown in FIG. 2, such profiles exhibit a substantially flat CT region or CT region with a constant or near constant tensile stress along at least a portion of the CT region. Often, known chemically strengthened glass articles exhibit a lower maximum CT value, as compared to the maximum central value shown in FIG. 1.

Accordingly, there is a need for thin glass articles that exhibit improved fracture resistance.

SUMMARY

A first aspect of this disclosure pertains to an aluminosilicate glass article comprising a composition including $Li_2O$, $P_2O_5$, and greater than about 0.9 mol % $B_2O_3$. In one or more embodiments, the composition includes $SiO_2$ in an amount in the range from about 60 mol % to about 80 mol %, $Al_2O_3$ in an amount greater than or equal to about 10 mol % or 13.5 mol %, $Li_2O$ in an amount in the range from about 5 mol % to about 11 mol %, $P_2O_5$ in an amount in the range from about 1 mol % to about 5 mol %, greater than about 0.9 mol % $B_2O_3$, and $Na_2O$ in an amount in the range from about 0.5 mol % to about 12 mol %.

In one or more embodiments, the composition includes $SiO_2$ in an amount in the range from about 60 mol % to about 80 mol %, $Al_2O_3$ in an amount greater than or equal to 10 mol %, $Li_2O$ up to and including about 10 mol %, $P_2O_5$ in an amount in the range from about 1 mol % to about 5 mol %, greater than about 0.9 mol % $B_2O_3$; and $Na_2O$ in an amount in the range from about 0.5 mol % to about 12 mol %.

In one or more embodiments, $Al_2O_3$ is present the composition in an amount in the range from about 13.5 mol % to about 18 mol %. In one or more embodiments, the amount of $P_2O_5$ in the composition may be less than about 3 mol %. In one or more embodiments, the amount of $B_2O_3$ is in an amount in the range from about 0.9 mol % to about 6.5 mol % or from about 1 mol % to about 6.5 mol %. In one or more embodiments, the total amount of $B_2O_3$, $P_2O_5$, $SiO_2$ and $Al_2O_3$ is about 80 mol % or greater.

In one or more embodiments, the composition includes $R_2O$. As used herein, $R_2O$ refers to alkali metal oxides such as $Li_2O$, $Na_2O$, $K_2O$, $Rb_2O$, and $Cs_2O$. In one or more embodiments, the composition includes a total amount of $R_2O$ (meaning the total amount of any and all alkali metal oxides in the composition) in the range from about 12 mol % to about 20 mol %.

In one or more embodiments, the amount of $Na_2O$ is in an amount in the range from about 3 mol % to about 11 mol %. In some embodiments, the composition includes $Li_2O$ in an amount in the range from about 5 mol % to about 11 mol % or from about 5 mol % to about 7 mol %. Optionally, the composition may be substantially free of $K_2O$. In one or more embodiments, the amount of $Na_2O$ is greater than the amount of $Li_2O$.

In one or more embodiments, the composition includes RO. As used herein RO refers to alkaline earth metal oxides such as MgO, CaO, SrO, BaO, ZnO and the like. In some embodiments, the total amount of RO (meaning the total amount of any and all alkaline earth metal oxides in the composition) is in the range from about 0.05 mol % to about 4 mol %. In one or more specific embodiments, the composition includes ZnO in an amount in the range from about 0.5 mol % to about 3 mol %.

The composition of one or more embodiments may include $SnO_2$. In one or more embodiments, the composition includes less than about 1.5 mol % $ZrO_2$.

In one or more embodiments, the composition exhibits a liquidus viscosity of about 300 kilopoise or less. In some other embodiments, the composition exhibits a liquidus viscosity greater than about 300 kilopoise.

A second aspect of this disclosure pertains to a chemically strengthened glass article. In one or more embodiments, the chemically strengthened glass article comprises a first major surface and an opposing second major surface defining a thickness t, and a composition comprising $Li_2O$, $P_2O_5$, greater than about 0.9 mol % $B_2O_3$, $Al_2O_3$ in an amount greater than or equal to 13.5 mol %, and from about 0.5 mol % to about 12 mol % $Na_2O$. In one or more embodiments, the composition of the chemically strengthened glass article may include $Li_2O$ in an amount less than or equal to about 10 mol %; $P_2O_5$, greater than about 0.9 mol % $B_2O_3$, $Al_2O_3$ in an amount greater than or equal to 10 mol %, and from about 0.5 mol % to about 12 mol % $Na_2O$.

In one or more embodiments, the chemically strengthened glass article includes a CS layer extending from the first major surface to a DOC greater than about 0.1 t or greater than or equal to about 0.12 t. In some embodiments, the chemically strengthened glass article includes a CS layer with a maximum CS of about 200 MPa or greater. In some embodiments, the CS layer comprises a surface CS of about 300 or greater. In one or more embodiments, the chemically strengthened glass article includes a maximum CT greater than about 40 MPa or a maximum CT in the range from about 40 MPa to about 100 MPa. In some instances the maximum CT is less than about 100 MPa. In one or more embodiments, the chemically strengthened glass article exhibits a ratio of maximum CT to absolute value of maximum CS is in the range from about 0.01 to about 0.2.

In one or more embodiments, the chemically strengthened glass article includes a stress profile extending along the entire thickness t, wherein all points of the stress profile between a thickness range from about 0•t up to 0.3•t and from greater than 0.7•t, comprise a tangent having a slope with an absolute value that is greater than about 0.1 MPa/micrometer. In other embodiments, the chemically strengthened glass article includes a stress profile extending along the entire thickness t, wherein each one of at least one point of the stress profile between a thickness range from about 0•t up to 0.3•t and at least one point of the stress profile from greater than 0.7•t, comprise a tangent having a slope with an absolute value that is greater than about 0.1 MPa/micrometer.

In one or more embodiments, the chemically strengthened glass article includes a concentration of a metal oxide that is both non-zero and varies along a thickness range from about 0•t to about 0.3•t. In some embodiments, the metal oxide comprises any one or more of $Na_2O$, $K_2O$ $Rb_2O$, and $Cs_2O$. In some embodiments, the concentration of the metal oxide is non-zero and varies along the entire thickness. In one or more embodiments, the metal oxide generates a stress along the thickness range along which its concentration is non-zero and varies. Optionally, the concentration of the metal oxide decreases from the first surface to a value at a point between the first surface and the second surface and increases from the value to the second surface. In one or more embodiments, the chemically strengthened glass article exhibits a maximum chemical depth of about 0.4•t or greater.

In one or more embodiments, the chemically strengthened glass article includes a Young's modulus of less than 85 MPa.

In one or more embodiments, the unstrengthened glass article and the chemically strengthened glass article comprise a Knoop Lateral Cracking Scratch Threshold greater than about 6 N, as measured on either one of the first major surface and the second major surface.

A third aspect of this disclosure pertains to a device comprising a housing having front, back, and side surfaces, electrical components that are at least partially inside the housing, a display at or adjacent to the front surface of the housing, and a cover article disposed over the display, wherein the cover article comprises the chemically strengthened glass article according to the embodiments described herein.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 10 is a side view of a testing apparatus for glass-based articles;

FIG. 11 is a side view of a portion of the testing apparatus shown in FIG. 10

FIG. 12 is a rear perspective view of the testing apparatus shown in FIG. 10.

FIG. 13 is a front perspective view of the testing apparatus shown in FIG. 10.

DETAILED DESCRIPTION

Figure 1:
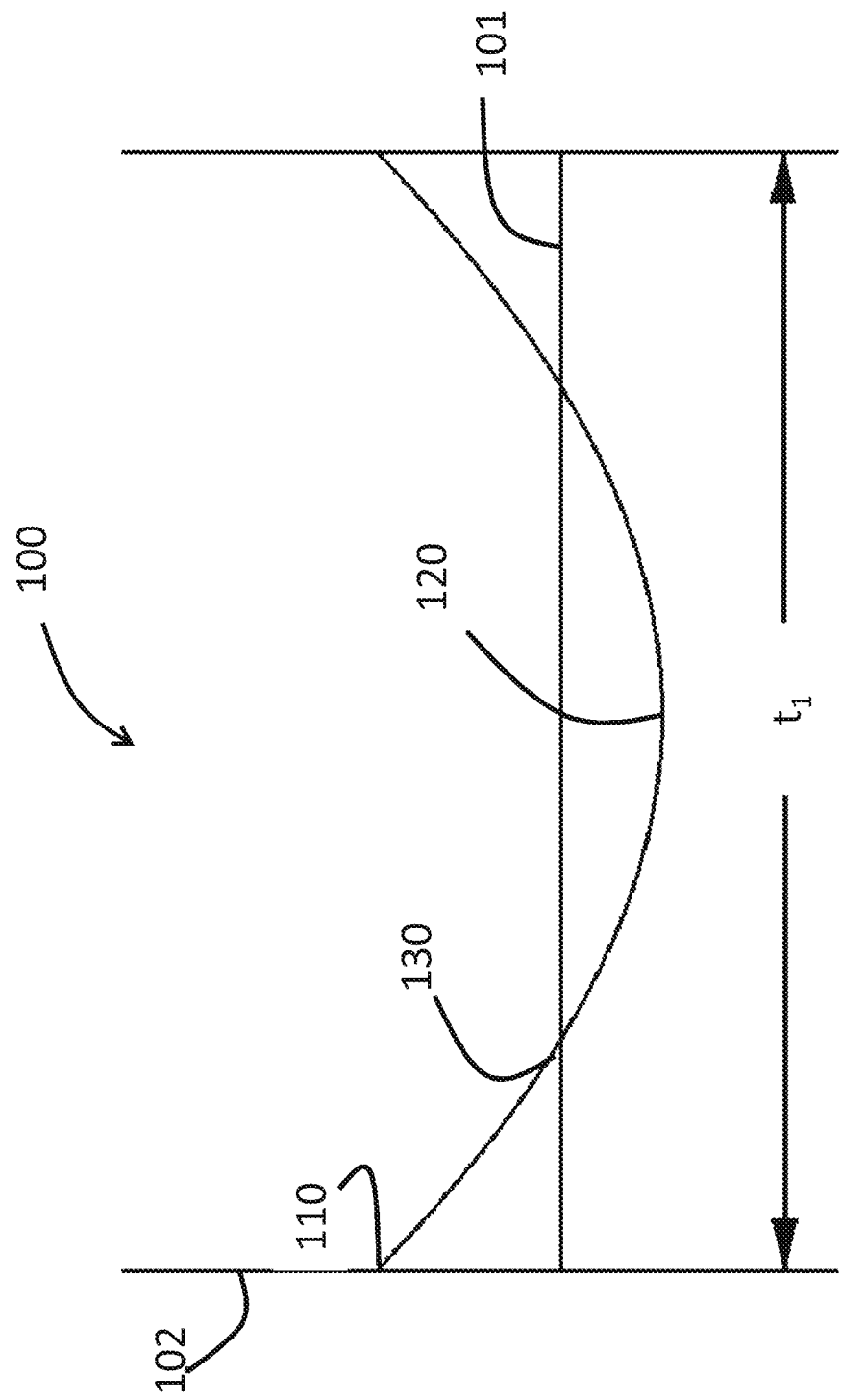
FIG. 1 is a cross-sectional view across a thickness of a known, thermally tempered glass article.

Reference will now be made in detail to various embodiments.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the term "glass article" is used in their broadest sense to include any object made wholly or partly of glass. Glass articles include laminates of glass and non-glass materials, laminates of glass and crystalline materials, and glass-ceramics (including an amorphous phase and a crystalline phase).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass article that is "substantially free of MgO" is one in which MgO is not actively added or batched into the glass article, but may be present in very small amounts as a contaminant.

Unless otherwise specified, all temperatures are expressed in terms of degrees Celsius (° C.). Coefficients of thermal expansion (CTE) are expressed in terms of parts per million (ppm) per degree Celsius (° C.) and represent a value measured over a temperature range from about 20° C. to about 300° C., unless otherwise specified. High temperature (or liquid) CTE is also expressed in terms of part ppm/° C., and represent a value measured in the high temperature plateau region of the instantaneous CTE vs. temperature curve. The high temperature CTE measures the volume change associated with heating or cooling of the glass through the transformation region.

As used herein the term "softening point" refers to the temperature at which the viscosity of a glass is approximately $10^{7.6}$ poise (P), the term "anneal point" refers to the temperature at which the viscosity of a glass is approximately $10^{13.2}$ poise, the term "200 poise temperature ($T^{220P}$)" refers to the temperature at which the viscosity of a glass is approximately 200 poise, the term "$10^{11}$ poise temperature" refers to the temperature at which the viscosity of a glass is approximately $10^{11}$ poise, the term "35 kP temperature) ($T^{35kP}$)" refers to the temperature at which the viscosity of a glass is approximately 35 kilopoise (kP), and the term "160 kP temperature ($T^{160kP}$)" refers to the temperature at which the viscosity of a glass is approximately 160 kP.

A first aspect of this disclosure pertains to an aluminosilicate glass article comprising a composition including $Li_2O$, $P_2O_5$ and $B_2O_3$. Unless otherwise specified, all compositions are described in mole percent (mol %) as analyzed on an oxide basis, and relate to the glass article prior to being chemically strengthened as described herein.

In one or more embodiments, the composition includes $SiO_2$ in an amount in the range from about 60 mol % to about 80 mol %, $Al_2O_3$ in an amount greater than or equal to 13.5 mol %, greater than about 0.9 mol % $B_2O_3$, $Li_2O$ in an amount in the range from about 5 mol % to about 11 mol %, $P_2O_5$ in an amount in the range from about 1 mol % to about 5 mol %, and $Na_2O$ in an amount in the range from about 0.5 mol % to about 12 mol %.

In one or more embodiments, the composition comprises $SiO_2$ in an amount in the range from about 60 mol % to about 80 mol %, $Al_2O_3$ in an amount greater than or equal to 10 mol %, greater than about 0.9 mol % $B_2O_3$, $Li_2O$ in an amount in the range from about 5 mol % to about 10 mol %, $P_2O_5$ in an amount in the range from about 1 mol % to about 5 mol %, and $Na_2O$ in an amount in the range from about 0.5 mol % to about 12 mol %.

In one or more embodiments, the composition includes $SiO_2$ in an amount in a range from about 60 mol % to about 80 mol %, about 60 mol % to about 78 mol %, from about 60 mol % to about 76 mol %, from about 60 mol % to about 75 mol %, from about 60 mol % to about 74 mol %, from about 60 mol % to about 72 mol %, from about 60 mol % to about 70 mol %, from about 60 mol % to about 68 mol %, from about 60 mol % to about 66 mol %, from about 60 mol % to about 64 mol %, from about 62 mol % to about 80 mol %, from about 64 mol % to about 80 mol %, from about 65 mol % to about 80 mol %, from about 66 mol % to about 80 mol %, from about 68 mol % to about 80 mol %, from about 70 mol % to about 80 mol %, from about 72 mol % to about 80 mol %, from about 74 mol % to about 80 mol %, from about 75 mol % to about 80 mol %, from about 62 mol % to about 68 mol %, or from about 63 mol % to about 64.5 mol %, and all ranges and sub-ranges therebetween.

In one or more embodiments, the composition comprises $Al_2O_3$ in an amount greater than about 10 mol %, greater than about 12 mol %, greater than about 13 mol %, greater than about 13.5 mol %, or greater than about 14 mol %. In some instances, $Al_2O_3$ may be present in the compositions described herein in a range from about 10 mol % to about 20 mol %, from about 10 mol % to about 18 mol %, from about 10 mol % to about 16 mol %, from about 10 mol % to about 15 mol %, from about 10 mol % to about 14 mol %, from about 11 mol % to about 20 mol %, from about 12 mol % to about 20 mol %, from about 12.5 mol % to about 20 mol %, from about 13 mol % to about 20 mol %, from about 13.5 mol % to about 20 mol %, from about 14 mol % to about 20 mol %, or from about 12.5 mol % to about 17 mol %, and all ranges and sub-ranges therebetween.

In one or more embodiments, the composition includes some amount of $B_2O_3$. In one or more embodiments, the composition includes $B_2O_3$ in an amount greater than about 0.1 mol %, greater than about 0.2 mol %, greater than about 0.3 mol %, greater than about 0.4 mol %, greater than about 0.5 mol %, greater than about 0.6 mol %, greater than about 0.7 mol %, greater than about 0.8 mol %, greater than about 0.9 mol %, or greater than about 1 mol %. In one or more embodiments, the composition comprises $B_2O_3$ in an amount in a range from about 0.5 mol % to about 7.5 mol %, from about 0.5 mol % to about 7 mol %, from about 0.5 mol % to about 6.5 mol %, from about 0.5 mol % to about 6 mol %, from about 0.5 mol % to about 5.5 mol %, from about 0.5 mol % to about 5 mol %, from about 0.5 mol % to about 4.5 mol %, from about 0.5 mol % to about 4 mol %, from about 0.5 mol % to about 3.5 mol %, from about 0.9 mol % to about 7.5 mol %, from about 0.9 mol % to about 7 mol %, from about 0.9 mol % to about 6.5 mol %, from about 0.9 mol % to about 6 mol %, from about 0.9 mol % to about 5.5 mol %, from about 0.9 mol % to about 5 mol %, from about 0.9 mol % to about 4.5 mol %, from about 0.9 mol % to about 4 mol %, from about 0.9 mol % to about 3.5 mol %, from about 1 mol % to about 7.5 mol %, from about 1 mol % to about 7 mol %, from about 1 mol % to about 6.5 mol %, from about 1 mol % to about 6 mol %, from about 1 mol % to about 5.5 mol %, from about 1 mol % to about 5 mol %, from about 1 mol % to about 4.5 mol %, from about 1 mol % to about 4 mol %, from about 1 mol % to about 3.5 mol %, from about 1.5 mol % to about 7.5 mol %, from about 2 mol % to about 7.5 mol %, from about 2.5 mol % to about 7.5 mol %, from about 3 mol % to about 7.5 mol %, from about 3.5 mol % to about 7.5 mol %, from about 4 mol % to about 7.5 mol %, from about 4 mol % to about 6 mol %, or from about 1.5 mol % to about 3 mol %, and all ranges and sub-ranges therebetween.

In one or more embodiments, the amount of $B_2O_3$ is limited to 7.5 mol % or less. Without being bound by theory, it is believed that higher amounts of $B_2O_3$ deteriorate the maximum CT value in a resulting chemically strengthened glass article. Moreover, the presence of $B_2O_3$ enhances scratch resistance of a glass article and a strengthened glass article, as described herein. Without being bound by theory, the inclusion of a 3-fold coordinated network former (such as $B_2O_3$), reduces constraints on the glass network, and permits the glass network to rearrange and densify when scratched (regardless of indenter shape), relative to a glass article that does not include $B_2O_3$. Other constituents that behave in the same or similar manner to $B_2O_3$ include $P_2O_5$, $SiO_2$, and $Al_2O_3$. In one or more embodiments, the total amount of $B_2O_3$, $P_2O_5$, $SiO_2$ and $Al_2O_3$ is maximized to improve scratch; however the total amount of these constituents should not exceed an amount that then causes a reduction in maximum CT in a glass article after chemical strengthening.

In one or more embodiments, the total amount of $B_2O_3$, $P_2O_5$, $SiO_2$ and $Al_2O_3$ in the composition is about 80 mol % or greater. In some embodiments, the total amount of $B_2O_3$, $P_2O_5$, $SiO_2$ and $Al_2O_3$ may be in a range from about 80 mol % to about 94 mol %, from about 80 mol % to about 92 mol %, from about 80 mol % to about 90 mol %, from about 80 mol % to about 88 mol %, from about 80 mol % to about 86 mol %, from about 82 mol % to about 94 mol %, from about 84 mol % to about 94 mol %, from about 86 mol % to about 94 mol %, or from about 88 mol % to about 94 mol %, and all ranges and sub-ranges therebetween In one or more embodiments, the composition may include a total amount of $R_2O$ in a range from about 10 mol % to about 22 mol %, from about 10 mol % to about 20 mol %, from about 10 mol % to about 18 mol %, from about 10 mol % to about 16 mol %, from about 10 mol % to about 15 mol %, from about 11 mol % to about 22 mol %, from about 12 mol % to about 22 mol %, from about 13 mol % to about 22 mol %, from about 14 mol % to about 22 mol %, from about 12 mol % to about 20 mol %, from about 12 mol % to about 18 mol %, or from about 13 mol % to about 17 mol %. In one or more embodiments, the composition may be substantially free of $Rb_2O$, $Cs_2O$ or both $Rb_2O$ and $Cs_2O$. As used herein, the phrase "substantially free" with respect to the components of the composition means that the component is not actively or intentionally added to the composition during initial batching, but may be present as an impurity in an amount less than about 0.001 mol %.

In one or more embodiments, the composition includes some amount of $Li_2O$. For example, in one or more embodiments, the composition comprises $Li_2O$ in an amount greater than or equal to about 1 mol %, more than or equal to about 2 mol %, more than or equal to about 3 mol %, or more than or equal to about 4 mol %. In one or more embodiments, the composition includes $Li_2O$ in a range from about 2.5 mol % to about 11 mol %, from about 3 mol % to about 11 mol %, from about 3.5 mol % to about 11 mol %, from about 4 mol % to about 11 mol %, from about 4.5 mol % to about 11 mol %, from about 5 mol % to about 11 mol %, from about 5.5 mol % to about 11 mol %, from about 6 mol % to about 11 mol %, from about 5 mol % to about 10.5 mol %, from about 5 mol % to about 10 mol %, from about 5 mol % to about 9.5 mol %, from about 5 mol % to about 9 mol %, from about 5 mol % to about 8.5 mol %, from about 5 mol % to about 8 mol %, from about 5 mol % to about 7 mol %, from about 4 mol % to about 10.5 mol %, from about 4 mol % to about 10 mol %, from about 4 mol % to about 9.5 mol %, from about 4 mol % to about 9 mol %, from about 4 mol % to about 8.5 mol %, from about 4 mol % to about 8 mol %, from about 4 mol % to about 7 mol %, from about 4 mol % to about 6 mol %, from about 4.5 mol % to about 10 mol %, from about 5 mol % to about 10 mol %, from about 5.5 mol % to about 10 mol %, from about 6 mol % to about 10 mol %, from about 6.5 mol % to about 10 mol %, from about 7 mol % to about 10 mol %, from about 7.5 mol % to about 10 mol %, from about 8 mol % to about 10 mol %, from about 8.5 mol % to about 10 mol %, from about 9 mol % to about 10 mol %, or from about 5 mol % to about 6 mol %, and all ranges and sub-ranges therebetween.

In one or more embodiments, the ratio of $Li_2O$ to the sum or total amount of $B_2O_3$, $P_2O_5$, $SiO_2$ and $Al_2O_3$ ($B_2O_3+P_2O_5+SiO_2+Al_2O_3$) is less than about 0.074 (e.g., about 0.073 or less, about 0.072 or less, about 0.071 or less, about 0.07 or less). In some embodiments, the ratio of $Li_2O$ to the sum or total amount of $B_2O_3$, $P_2O_5$, $SiO_2$ and $Al_2O_3$ is in the range from about 0.065 to about 0.073. The addition of some $Li_2O$ aids in ion-exchange, for example, allowing faster and/or deeper ion-exchange, which provides advantageous CS profiles. In some embodiments, the amount of $Li_2O$ may be balanced against the sum or total amount of $B_2O_3$, $P_2O_5$, $SiO_2$ and $Al_2O_3$ ($B_2O_3+P_2O_5+SiO_2+Al_2O_3$), which provides scratch resistance. With a proper amount of balancing, as with maintaining this ratio (of $Li_2O$ to the sum or total amount of $B_2O_3$, $P_2O_5$, $SiO_2$ and $Al_2O_3$) as noted above, a glass may have advantageous scratch performance as well as drop performance (from an advantageous CS profile).

In one or more embodiments, the composition some amount of $Na_2O$. For example, in one or more embodiments, the composition comprises $Na_2O$ in an amount greater than or equal to about 0.5 mol %, greater than or equal to about 1 mol %, more than or equal to about 2 mol %, more than or equal to about 3 mol %, or more than or equal to about 4 mol %. In one or more embodiments, the amount of $Na_2O$ is less than or equal to 10 mol %. In one or more embodiments, the composition includes $Na_2O$ in a range from about 0.5 mol % to about 12 mol %, 1 mol % to about 12 mol %, 1.5 mol % to about 12 mol %, 2 mol % to about 12 mol %, from about 2.5 mol % to about 12 mol %, from about 3 mol % to about 12 mol %, from about 3.5 mol % to about 12 mol %, from about 4 mol % to about 12 mol %, from about 4.5 mol % to about 12 mol %, from about 5 mol % to about 12 mol %, from about 5.5 mol % to about 12 mol %, from about 6 mol % to about 12 mol %, from about 3 mol % to about 12 mol %, from about 3 mol % to about 11 mol %, from about 3 mol % to about 10.5 mol %, from about 3 mol % to about 10 mol %, from about 3 mol % to about 9.5 mol %, from about 3 mol % to about 9 mol %, from about 3 mol % to about 8.5 mol %, from about 3 mol % to about 8 mol %, from about 3 mol % to about 7 mol %, from about 3.5 mol % to about 9 mol %, or from about 3 mol % to about 7.5 mol %, and all ranges and sub-ranges therebetween.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the composition includes less than about 2 mol % $K_2O$. In some instances, the composition may include $K_2O$ in an amount in a range from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, or from about 0 mol % to about 0.1 mol %. In one or more embodiments, the composition may be substantially free of $K_2O$.

In some embodiments, the glass composition may include one or more alkali earth metal oxides (RO) such as MgO, CaO, SrO, BaO and ZnO. In some embodiments, the total amount of RO may be a non-zero amount up to and including about 5 mol %. In one or more specific embodiments, the total amount of RO may be a non-zero amount up to and including about 4.5 mol %, up to and including about 4 mol %, up to and including about 3.5 mol %, up to and including about 3 mol %, up to and including about 2.5 mol %, up to and including about 2 mol %, up to and including about 1.5 mol %, or up to and including about 1 mol %. In one or more embodiments, the total amount of RO may be in the range from about 0.05 mol % to about 4.5 mol %, from about 0.05 mol % to about 4 mol %, from about 0.05 mol % to about 3.5 mol %, from about 0.05 mol % to about 3 mol %, from about 0.05 mol % to about 2.5 mol %, from about 0.05 mol % to about 2 mol %, from about 0.05 mol % to about 1.5 mol %, or from about 0.05 mol % to about 1 mol %. In some embodiments, the total amount or RO may be in the range from about 1 mol % to about 4 mol %, from about 1 mol % to about 3 mol %, or from about 1 mol % to about 2 mol %.

In one or more embodiments, the composition may include MgO in a non-zero amount up to and including about 2 mol %, or up to and including about 1 mol %. In some instances, the composition may be substantially free of MgO.

In one or more embodiments, the composition may include CaO in a non-zero amount up to and including about 2 mol %, or up to and including about 1 mol %. In some instances, the composition may be substantially free of CaO.

In one or more embodiments, the composition may include SrO in a non-zero amount up to and including about 2 mol %, or up to and including about 1 mol %. In some instances, the composition may be substantially free of SrO.

In one or more embodiments, the composition may include BaO in a non-zero amount up to and including about 2 mol %, or up to and including about 1 mol %. In some instances, the composition may be substantially free of BaO.

In one or more embodiments, the composition may include ZnO in a non-zero amount up to and including about 4.5 mol %, up to and including about 4 mol %, up to and including about 3.5 mol %, up to and including about 3 mol %, up to and including about 2.5 mol %, up to and including about 2 mol %, up to and including about 1.5 mol %, or up to and including about 1 mol %. In one or more embodiments, the total amount of ZnO may be in the range from about 0.05 mol % to about 4.5 mol %, from about 0.05 mol % to about 4 mol %, from about 0.05 mol % to about 3.5 mol %, from about 0.05 mol % to about 3 mol %, from about 0.05 mol % to about 2.5 mol %, from about 0.05 mol % to about 2 mol %, from about 0.05 mol % to about 1.5 mol %, or from about 0.05 mol % to about 1 mol %. In some embodiments, the total amount or ZnO may be in the range from about 1 mol % to about 4 mol %, from about 1 mol % to about 3 mol %, from about 1 mol % to about 2 mol %, from about 0.5 mol % to about 4 mol %, from about 0.5 mol % to about 3 mol %, or from about 0.5 mol % to about 2 mol %. In some instances, the composition may be substantially free of ZnO.

In one or more embodiments, the glass composition may include ZnO and may be substantially free of MgO, CaO, SrO and BaO. In one variant, the glass composition may include ZnO and one other RO (e.g., MgO, CaO, SrO or BaO) and may be substantially free of the other RO constituents. In one or more specific embodiments, the glass composition may include only two of the alkali earth metal oxides of MgO, CaO and ZnO and may be substantially free of the third of the earth metal oxides.

In one or more embodiments, the glass composition may include $P_2O_5$ in a range from about 0 mol % to about 10 mol %, from about 0 mol % to about 8 mol %, from about 0 mol % to about 7 mol %, from about 0 mol % to about 6 mol %, from about 0 mol % to about 4 mol %, from about 0 mol % to about 3 mol %, from about 0.1 mol % to about 10 mol %, from about 0.1 mol % to about 8 mol %, from about 0.1 mol % to about 6 mol %, from about 0.1 mol % to about 5 mol % from about 0.1 mol % to about 4 mol %, from about 0.1 mol % to about 3 mol %, from about 0.5 mol % to about 5 mol %, from about 0.5 mol % to about 4 mol %, from about 0.5 mol % to about 3 mol %, from about 1 mol % to about 5 mol %, from about 1 mol % to about 4 mol %, from about 1 mol % to about 3 mol % or from about 2 mol % to about 3 mol %. Without being bound by theory, the inclusion of some $P_2O_5$ in the composition manages the liquidus behavior of the glass and reduces high temperature CTE, which enables formation of thin glass articles. Without being bound by theory, the inclusion of some $P_2O_5$ also facilitates zircon breakdown of the glass. In some embodiments, the composition includes a lower amount of Na$_2$O (than typically utilized in chemical strengthening, e.g., about 12 mol % or less), Li$_2$O and P$_2$O$_5$ and this combination exhibits the liquidus behavior that provides the thermal history described herein and which permits fusion forming of the glass article. The presence of a particular thermal history in a glass article permits enhanced chemical strengthening.

In one or more embodiments, the composition may include some TiO$_2$. In such embodiments, TiO$_2$ may be present in an amount less than about 2 mol %, less than about 1 mol %, or less than about 0.5 mol %. In one or more alternative embodiments, the glass composition may be substantially free of TiO$_2$.

In one or more embodiments, the composition may include ZrO$_2$. In such embodiments, ZrO$_2$ may be present in an amount less than about 2 mol %, less than about 1.5 mol %, less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.15 mol %, or less than about 0.1 mol % and all ranges and sub-ranges therebetween. In one or more alternative embodiments, the glass composition may be substantially free, as defined herein, of ZrO$_2$.

In one or more embodiments, the composition may include Fe$_2$O$_3$. In such embodiments, Fe$_2$O$_3$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more alternative embodiments, the glass composition may be substantially free, as defined herein, of Fe$_2$O$_3$.

In some embodiments, the composition may be batched with from about 0 mol % to about 2 mol % of at least one fining agent selected from any one or more of Na$_2$SO$_4$, NaCl, NaF, NaBr, K$_2$SO$_4$, KCl, KF, KBr, As$_2$O$_3$, Sb$_2$O$_3$, and SnO$_2$. The composition according to one or more embodiments may further include SnO$_2$ in the range from about 0 to about 2, from about 0 to about 1, from about 0.1 to about 2, from about 0.1 to about 1, or from about 1 to about 2. The glass compositions disclosed herein may be substantially free of As$_2$O$_3$ and/or Sb$_2$O$_3$.

In one or more embodiments, the composition may specifically include 60 mol % to 65 mol % SiO$_2$; 12 mol % to about 18 mol % Al$_2$O$_3$; 4 mol % to about 8 mol % Li$_2$O; 0 mol % to about 4 mol % ZnO; 0 mol % to about 2 mol % MgO; 0 mol % to about 2 mol % TiO$_2$; 0.5 mol % to about 8 mol % B$_2$O$_3$; 4 mol % to about 12 mol % Na$_2$O; 0 mol % to about 2 mol % K$_2$O; 0 mol % to about 2 mol % ZrO$_2$; 1 mol % to about 4 mol % P$_2$O$_5$; and 0.05 mol % to about 0.2 mol % SnO$_2$.

In one or more embodiments, the composition may specifically include 62 mol % to 65 mol % SiO$_2$; 12 mol % to about 18 mol % Al$_2$O$_3$; 8 mol % to about 12 mol % Li$_2$O; 0 mol % to about 2 mol % ZnO; 0 mol % to about 2 mol % MgO; 0 mol % to about 2 mol % TiO$_2$; 0.5 mol % to about 8 mol % B$_2$O$_3$; 2 mol % to about 8 mol % Na$_2$O; 0 mol % to about 2 mol % K$_2$O; 0 mol % to about 2 mol % ZrO$_2$; 1 mol % to about 4 mol % P$_2$O$_5$; and 0.05 mol % to about 0.2 mol % SnO$_2$.

In one or more embodiments, the composition may specifically include 62 mol % to 68 mol % SiO$_2$; 10 mol % to about 18 mol % Al$_2$O$_3$; 5 mol % to about 11 mol % Li$_2$O; 0 mol % to about 2 mol % ZnO; 0 mol % to about 2 mol % MgO; 0 mol % to about 2 mol % TiO$_2$; 0.9 mol % to about 6 mol % B$_2$O$_3$; 2 mol % to about 10 mol % Na$_2$O; 0 mol % to about 2 mol % K$_2$O; 0 mol % to about 2 mol % ZrO$_2$; 1 mol % to about 4 mol % P$_2$O$_5$; and 0.05 mol % to about 0.2 mol % SnO$_2$.

In some embodiments, composition (or the glass article formed therefrom) comprises a liquidus viscosity that enables the formation of the glass articles via specific techniques. As used herein, the term "liquidus viscosity" refers to the viscosity of a molten glass at the liquidus temperature, wherein the term "liquidus temperature" refers to the temperature at which crystals first appear as a molten glass cools down from the melting temperature (or the temperature at which the very last crystals melt away as temperature is increased from room temperature).

In one or more embodiments, the composition (or the glass article formed therefrom) exhibits a liquidus viscosity in the range from about 100 kP to about 500 kP. In some embodiments, the composition (or the glass article formed therefrom) exhibits a liquidus viscosity of less than about 300 kilopoise (kP) or less. In some embodiments, the composition (or the glass article formed therefrom) exhibits a liquidus viscosity of about 250 kP or less, about 200 kP or less, or about 180 kP or less. In some embodiments, the composition (or the glass article formed therefrom) exhibits a liquidus viscosity of greater than about 300 kP. In some embodiments, the composition (or the glass article formed therefrom) exhibits a liquidus viscosity of about 350 kP or greater, about 400 kP or greater, about 450 kP or greater, about 500 kP or greater, about 750 kP or greater, about 1000 kP or greater, or about 2000 kP or greater.

In one or more embodiments, the composition (or the glass article formed therefrom) exhibits CTE measured over a temperature range from about 20° C. to about 300° C. in the range from about 55×10$^{-7}$ ppm/° C. to about 80×10$^{-7}$ ppm/° C., from about 58×10$^{-7}$ ppm/° C. to about 80×10$^{-7}$ ppm/° C., or from about 60×10$^{-7}$ ppm/° C. to about 80×10$^{-7}$ ppm/° C.

In some embodiments, the composition (or the glass article formed therefrom) exhibits CTE a high temperature (or liquid) CTE in the range from about 8×10$^{-7}$ ppm/° C. to about 18×10$^{-7}$ ppm/° C., from about 10×10$^{-7}$ ppm/° C. to about 18×10$^{-7}$ ppm/° C., from about 12×10$^{-7}$ ppm/° C. to about 18×0$^{-7}$ ppm/° C., from about 8×10$^{-7}$ 'ppm/° C. to about 16×10$^{-7}$ ppm/° C., from about 8×10$^{-7}$ ppm/° C. to about 14×10$^{-7}$ ppm/° C., from about 8×10$^{-7}$ ppm/° C. to about 12×10$^{-7}$ ppm/° C. or from about 8×10$^{-7}$ ppm/° C. to about 10×10$^{-7}$ ppm/° C.

In one or more embodiments, the composition or the glass article formed therefrom exhibits a Young's modulus in the range from about 70 GPa to about 85 GPa, from about 72 GPa to about 85 GPa, from about 74 GPa to about 85 GPa, from about 75 GPa to about 85 GPa, from about 76 GPa to about 85 GPa, from about 70 GPa to about 80 GPa, from about 72 GPa to about 80 GPa, from about 74 GPa to about 80 GPa, from about 75 GPa to about 80 GPa, from about 76 GPa to about 80 GPa, from about 70 GPa to about 78 GPa, from about 70 GPa to about 76 GPa, from about 70 GPa to about 75 GPa, from about 72 GPa to about 78 GPa, from about 75 GPa to about 79 GPa, or from about 70 GPa to about 77 GPa. The Young's modulus value recited in this disclosure refers to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

Figure 3:
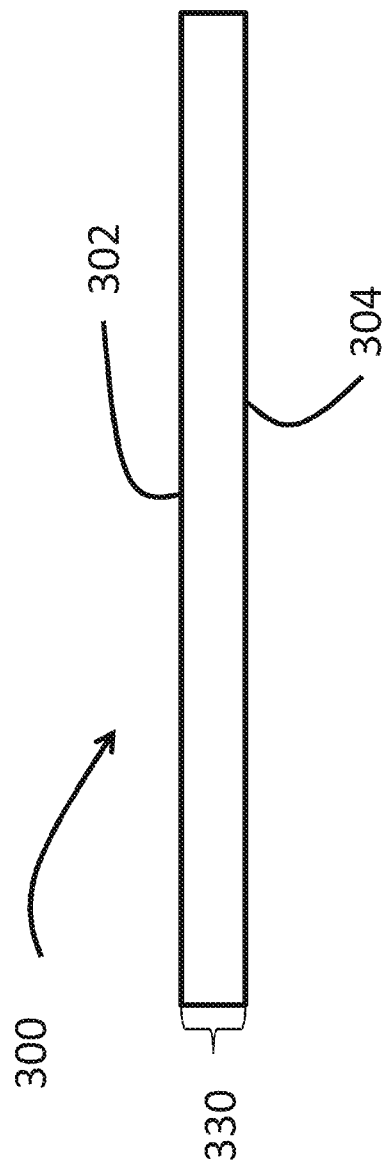
FIG. 3 is a side view of a glass article according to one or more embodiments.

Referring to FIG. 3, embodiments of the glass article 100 include a first major surface 302, an opposing second major surface 304 defining a thickness t 330 between the first major surface and the second major surface. In one or more embodiments, the glass article may include the compositions described herein.

In one or more embodiments, the thickness t may be about 3 millimeters or less (e.g., in the range from about 0.01 millimeter to about 3 millimeters, from about 0.1 millimeter to about 3 millimeters, from about 0.2 millimeter to about 3 millimeters, from about 0.3 millimeter to about 3 millimeters, from about 0.4 millimeter to about 3 millimeters, from about 0.01 millimeter to about 2.5 millimeters, from about 0.01 millimeter to about 2 millimeters, from about 0.01 millimeter to about 1.5 millimeters, from about 0.01 millimeter to about 1 millimeter, from about 0.01 millimeter to about 0.9 millimeter, from about 0.01 millimeter to about 0.8 millimeter, from about 0.01 millimeter to about 0.7 millimeter, from about 0.01 millimeter to about 0.6 millimeter, from about 0.01 millimeter to about 0.5 millimeter, from about 0.1 millimeter to about 0.5 millimeter, or from about 0.3 millimeter to about 0.5 millimeter.)

The glass article may be substantially planar sheet, although other embodiments may utilize a curved or otherwise shaped or sculpted article. In some instances, the glass article may have a 3D or 2.5D shape. Additionally or alternatively, the thickness of the glass article may be constant along one or more dimension or may vary along one or more of its dimensions for aesthetic and/or functional reasons. For example, the edges of the glass article may be thicker as compared to more central regions of the glass article. The length, width and thickness dimensions of the glass article may also vary according to the article application or use.

The glass article may be substantially transparent and free from light scattering. In one or more the glass article may exhibit a transmittance of about 88% or greater over a wavelength in the range from about 380 nm to about 780 nm, when measured at a thickness about 1 millimeter.

The glass article may have a refractive index in the range from about 1.45 to about 1.55. As used herein, the refractive index values are with respect to a wavelength of 550 nm.

The glass article may be characterized by the manner in which it is formed. For instance, where the glass article may be characterized as float-formable (i.e., formed by a float process), down-drawable and, in particular, fusion-formable or slot-drawable (i.e., formed by a down draw process such as a fusion draw process or a slot draw process).

Some embodiments of the glass articles described herein may be formed by a float process. A float-formable glass article may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass article that can be lifted from the tin onto rollers. Once off the bath, the glass article can be cooled further and annealed to reduce internal stress.

Some embodiments of the glass articles described herein may be formed by a down-draw process. Down-draw processes produce glass articles having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass articles may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass articles described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

In one or more embodiments, the glass articles described herein may exhibit an amorphous microstructure and may be substantially free of crystals or crystallites. In other words, the glass articles exclude glass-ceramic materials.

Figure 4:
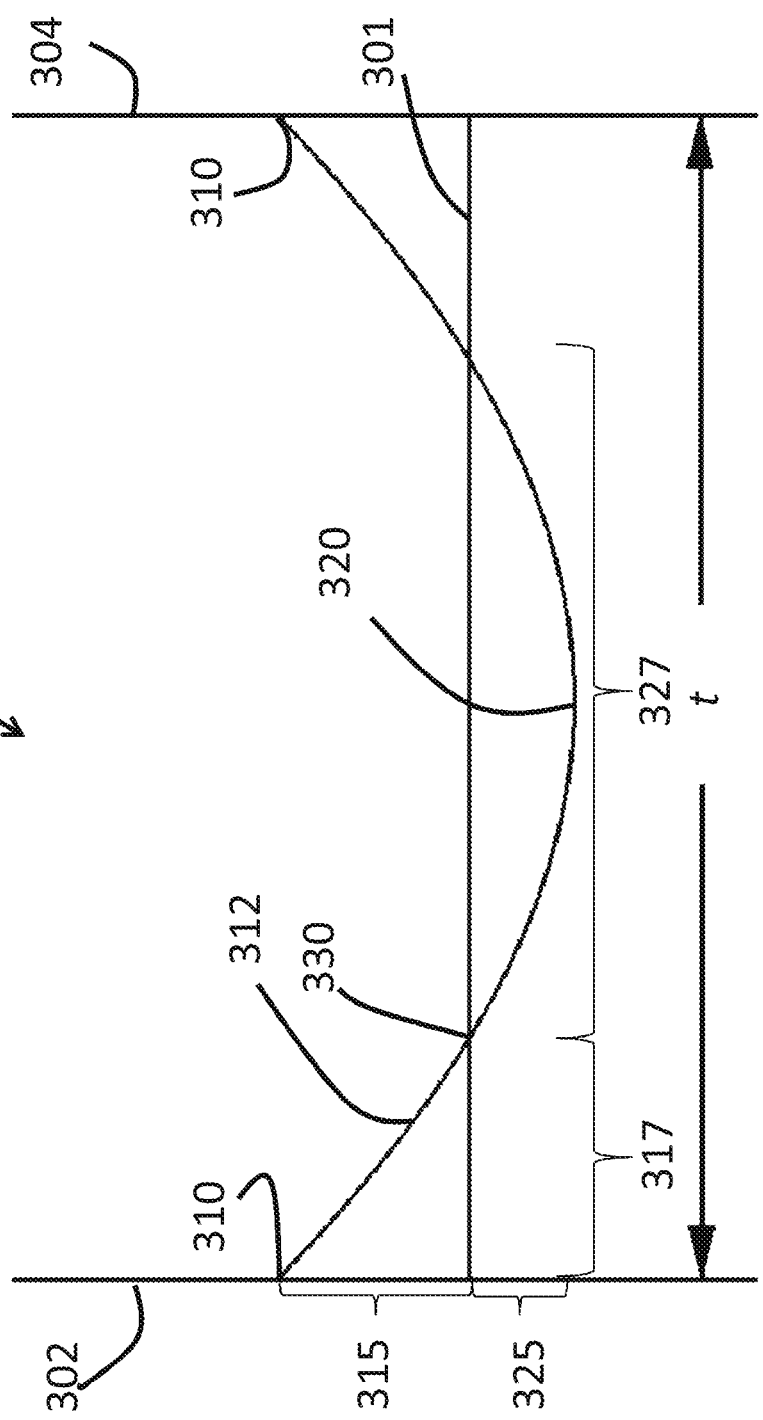
FIG. 4 is a cross-sectional view across the thickness of a chemically strengthened glass article according to one or more embodiments of this disclosure.

In one or more embodiments, the glass articles described herein may be chemically strengthened to impart a stress profile along the thickness t of the glass article. FIG. 4 is a cross-sectional illustration of the stress profile of a chemically strengthened glass article 300 along its thickness 330 (depicted along the x-axis). The magnitude of the stress is illustrated on the y-axis with the line 301 representing a zero stress.

The stress profile 312 includes a CS layer 315 (with a surface CS value 310) that extends from one or both the first major surface 302 and the second major surface 304 to a DOC 330, and a CT layer 325 (with a maximum CT 320) that extends from DOC 330 to the central portion of the article.

As used herein, DOC refers to the depth at which the stress within the glass article changes from compressive to tensile. At the DOC, the stress crosses from a positive (compressive) stress to a negative (tensile) stress (e.g., 330 in FIG. 4) and thus exhibits a stress value of zero. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

The CS layer has an associated depth or length 317 extending from a major surface 302, 304 to the DOC 330. The CT layer 325 also has an associated depth or length 327 (CT region or layer).

According to the convention normally used in the art, compression or compressive stress is expressed as a negative (<0) stress and tension or tensile stress is expressed as a positive (>0) stress, unless specifically noted otherwise. Throughout this description, however, when speaking in terms of compressive stress CS, such is given without regard to positive or negative values—i.e., as recited herein, CS=|CS| or absolute value of CS.

CS (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

DOC and maximum CT values are measured using a scattered light polariscope (SCALP) technique known in the art. Refracted near-field (RNF) method or SCALP may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal. The RNF profile is then smoothed, and used for the CT region. As noted above, the FSM technique is used for the surface CS and slope of the stress profile in the CS region near the surface.

As stated above, the stress profiles exhibited by the glass articles described herein are generated by chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass article generate a stress.

Ion exchange processes are typically carried out by immersing a glass article in a molten salt bath (or two or more molten salt baths) containing the larger ions to be exchanged with the smaller ions in the glass article. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass article in a salt bath (or baths), use of multiple salt baths, additional steps such as annealing, washing, and the like, are generally determined by the composition of the glass article (including the structure of the article and any crystalline phases present) and the desired DOC and CS of the glass article that results from strengthening. Exemplary molten bath composition may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass article thickness, bath temperature and glass (or monovalent ion) diffusivity. However, temperatures and immersion times different from those described above may also be used.

In one or more embodiments, the glass articles may be immersed in a molten salt bath of 100% $NaNO_3$, 100% $KNO_3$, or a combination of $NaNO_3$ and $KNO_3$ having a temperature from about 370° C. to about 480° C. In some embodiments, the glass article may be immersed in a molten mixed salt bath including from about 5% to about 90% $KNO_3$ and from about 10% to about 95% $NaNO_3$. In some embodiments, the glass article may be immersed in a molten mixed salt bath including $Na_2SO_4$ and $NaNO_3$ and have a wider temperature range (e.g., up to about 500° C.). In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass article may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass article. The spike may result in a greater surface CS value. This spike can be achieved by single bath or multiple baths, with the bath(s) having a single composition or mixed composition, due to the unique properties of the glass compositions used in the glass articles described herein.

In one or more embodiments, where more than one monovalent ion is exchanged into the glass article, the different monovalent ions may exchange to different depths within the glass article (and generate different magnitudes stresses within the glass article at different depths). The resulting relative depths of the stress-generating ions can be determined and cause different characteristics of the stress profile.

In one or more embodiments, Na+ and K+ ions are exchanged into the glass article and the Na+ ions diffuse to a deeper depth into the glass article than the K+ ions. The depth of penetration of K+ ions ("Potassium DOL") is distinguished from DOC because it represents the depth of potassium penetration as a result of an ion exchange process. The Potassium DOL is typically less than the DOC for the articles described herein. Potassium DOL is measured using a surface stress meter such as the commercially available FSM-6000 surface stress meter, manufactured by Orihara Industrial Co., Ltd. (Japan), which relies on accurate measurement of the stress optical coefficient (SOC), as described above with reference to the CS measurement.

In one or more embodiments, the chemically strengthened glass article may exhibit a surface CS that is 150 MPa or greater or about 200 MPa or greater (e.g., about 250 MPa or greater, about 300 MPa or greater, about 400 MPa or greater, about 450 MPa or greater, about 500 MPa or greater, or about 550 MPa or greater). In some instances the surface CS is about 700 MPa or greater. The surface CS may be up to about 900 MPa, up to about 1000 MPa, up to about 1100 MPa, or up to about 1200 MPa. In one or more embodiments, the surface CS may be in the range from about 400 MPa to about 900 MPa. The surface CS values provided herein may also comprise the maximum CS. In some embodiments, the surface CS is less than the maximum CS.

In one or more embodiments, the chemically strengthened glass article exhibits a maximum CT that is less than about $100/\sqrt{(t)}$, about $95/\sqrt{(t)}$ or less, about $90/\sqrt{(t)}$ or less, about $85/\sqrt{(t)}$ or less, about $80/\sqrt{(t)}$ or less, or about $71.5/\sqrt{(t)}$ or less, where t is thickness in mm. In one or more embodiments, the maximum CT may be greater than about $45/\sqrt{(t)}$. In one or more embodiments, the maximum CT may be about 100 MPa or less, about 90 MPa or less, about 80 MPa or less, about 75 MPa or less, or about 70 MPa or less (e.g., about 60 MPa or less, about 55 MPa or less, 50 MPa or less, or about 40 MPa or less). In one or more embodiments, the lower limit of the maximum CT may be 25 MPa, 40 MPa or 50 MPa. In some embodiments, the maximum CT 320 may be in the range from about 25 MPa to about 100 MPa (e.g., from about 25 MPa to about 90 MPa, from about 25 MPa to about 85 MPa, from about 25 MPa to about 80 MPa, from about 25 MPa to about 75 MPa, from about 25 MPa to about 70 MPa, from about 25 MPa to about 65 MPa, from about 40 MPa to about 100 MPa, from about 40 MPa to about 90 MPa, from about 40 MPa to about 80 MPa, from about 40 MPa to about 75 MPa, from about 40 MPa to about 70 MPa, from about 40 MPa to about 65 MPa, from about 45 MPa to about 80 MPa, from about 50 MPa to about 80 MPa, or from about 60 MPa to about 80 MPa.

The maximum CT 320 may be positioned at a range from about 0.3•t to about 0.7•t, from about 0.4•t to about 0.6•t or from about 0.45•to about 0.55•. It should be noted that any one or more of surface CS 310 and maximum CT 320 may be dependent on the thickness of the glass article. For example, glass articles having at thickness of about 0.8 mm may have a maximum CT of about 75 MPa or less. When the thickness of the glass article decreases, the maximum CT may increase. In other words, the maximum CT increases with decreasing thickness (or as the glass article becomes thinner).

In some embodiments, the ratio of the maximum CT 320 to the surface CS 310 in the range from about 0.01 to about 0.2 (e.g., in the range from about 0.01 to about 0.18, from about 0.01 to about 0.16, from about 0.01 to about 0.15, from about 0.01 to about 0.14, from about 0.01 to about 0.1, from about 0.02 to about 0.2, from about 0.04 to about 0.2, from about 0.05 to about 0.2, from about 0.06 to about 0.2, from about 0.08 to about 0.2, from about 0.1 to about 0.2, or from about 0.12 to about 0.2). In some embodiments, surface CS may be 1.5 times (or 2 times or 2.5 times) the maximum CT or greater. In some embodiments, the surface CS may be up to about 48 times the maximum CT, up to 40 times the maximum CT, up to 20 times the maximum CT, 10 up to times the maximum CT, or up to 8 times the maximum CT. The surface CS may be in the range from about 5 times up to about 50 times the maximum CT.

In one or more embodiments, the stress profile 312 comprises a maximum CS, which is typically the surface CS 310 and can be found at one or both of the first surface 302 and the second surface 304. In one or more embodiments, the CS layer or region 315 extends along a portion of the thickness to the DOC 317. In one or more embodiments, the DOC 317 may be about 0.1•t or greater. For example, the DOC 317 may be about 0.12•t or greater, about 0.14•t or greater, about 0.15•t or greater, about 0.16•t or greater, 0.17•t or greater, 0.18•t or greater, 0.19•t or greater, 0.20•t or greater, about 0.21•t or greater, or up to about 0.25•t. In one or more embodiments, the DOC 317 is substantially equal when measured from first major surface 302 and the second major surface 304 of the article.

In one or more embodiments, the glass article comprises a Potassium DOL in the range from about 6 micrometers to about 28 micrometers. In some embodiments, the Potassium DOL may be expressed as a function of the thickness t of the glass article. In one or more embodiments, Potassium DOL may be in the range from about 0.005 t to about 0.07 t. In some embodiments, the Potassium DOL may be in the range from about 0.005 t to about 0.07 t, from about 0.005 t to about 0.065 t, from about 0.005 t to about 0.06 t, from about 0.005 t to about 0.055 t, from about 0.005 t to about 0.05 t, from about 0.005 t to about 0.045 t, from about 0.005 t to about 0.04 t, from about 0.005 t to about 0.035 t, from about 0.005 t to about 0.03 t, from about 0.005 t to about 0.025 t, from about 0.005 t to about 0.02 t, from about 0.005 t to about 0.015 t, from about 0.005 t to about 0.01 t, from about 0.006 t to about 0.07 t, from about 0.008 t to about 0.07 t, from about 0.01 t to about 0.07 t, from about 0.015 t to about 0.07 t, from about 0.02 t to about 0.07 t, from about 0.027 t to about 0.05 t, from about 0.03 t to about 0.07 t, or from about 0.01 t to about 0.03 t.

In one or more embodiments, the compressive stress value at the Potassium DOL depth may be in the range from about 50 MPa to about 300 MPa. In some embodiments, the compressive stress value at the Potassium DOL depth may be in the range from about 50 MPa to about 280 MPa, from about 50 MPa to about 260 MPa, from about 50 MPa to about 250 MPa, from about 50 MPa to about 240 MPa, from about 50 MPa to about 220 MPa, from about 50 MPa to about 200 MPa, from about 60 MPa to about 200 MPa, from about 70 MPa to about 200 MPa, from about 75 MPa to about 200 MPa, from about 80 MPa to about 200 MPa, from about 90 MPa to about 200 MPa, from about 100 MPa to about 200 MPa, from about 110 MPa to about 200 MPa, from about 120 MPa to about 200 MPa, from about 130 MPa to about 200 MPa, or from about 150 MPa to about 200 MPa., from about 60 MPa to about 300 MPa, from about 70 MPa to about 300 MPa, from about 75 MPa to about 300 MPa, from about 80 MPa to about 300 MPa, from about 90 MPa to about 300 MPa, from about 100 MPa to about 300 MPa, from about 110 MPa to about 300 MPa, from about 120 MPa to about 300 MPa, from about 130 MPa to about 300 MPa, or from about 150 MPa to about 300 MPa.

In one or more embodiments, the chemically strengthened glass article exhibits a maximum chemical depth of about 0.4•t or greater, 0.5•t or greater, about 55•t or greater, or about 0.6•t or greater. As used herein, the term "chemical depth" means the depth at which an ion of the metal oxide or alkali metal oxide (e.g., the metal ion or alkali metal ion) diffuses into the glass article and the depth at which the concentration of that ion reaches a minimum value, as determined by Electron Probe Micro-Analysis (EPMA). The ion is the ion diffused into the chemically strengthened glass article as a result of ion exchange. Maximum chemical depth refers to the maximum diffusion depth of any ion exchanged into the chemically strengthened glass article by ion exchange process. For example, where a molten salt bath having more than one diffusing ionic species (i.e., a molten salt bath of both $NaNO_3$ and $KNO_3$), the different ionic species may diffuse to different depths into the chemically strengthened glass articles. The maximum chemical depth is the greatest diffusion depth of all the ionic species ion exchanged into the chemically strengthened glass article.

In one or more embodiments, the chemically strengthened glass article has a thickness in the range from about 0.7 mm to about 1.1 mm, a maximum CT in the range from about 40 MPa to about 75 MPa, a surface CS in the range from about 475 MPa to about 750 MPa, a DOC in the range from about 0.11 t to about 0.17 t, and a Potassium DOL in the range from about 6 micrometers to about 30 micrometers.

In one or more embodiments, the strengthened glass article has a thickness in the range from about 0.7 mm to about 1.1 mm, a maximum CT in the range from about 45 MPa to about 80 MPa, a surface CS in the range from about 700 to about 900 MPa, a DOC in the range from about 0.11 t to about 0.2 t, and a Potassium DOL in the range from about 8 micrometers to about 26 micrometers.

In one or more embodiments, the chemically strengthened glass article has a thickness in the range from about 0.7 mm to about 1.1 mm, a maximum CT in the range from about 70 MPa to about 100 MPa, a surface CS in the range from about 700 to about 900 MPa, and a DOC in the range from about 0.17 t to about 0.2 t.

Figure 2:
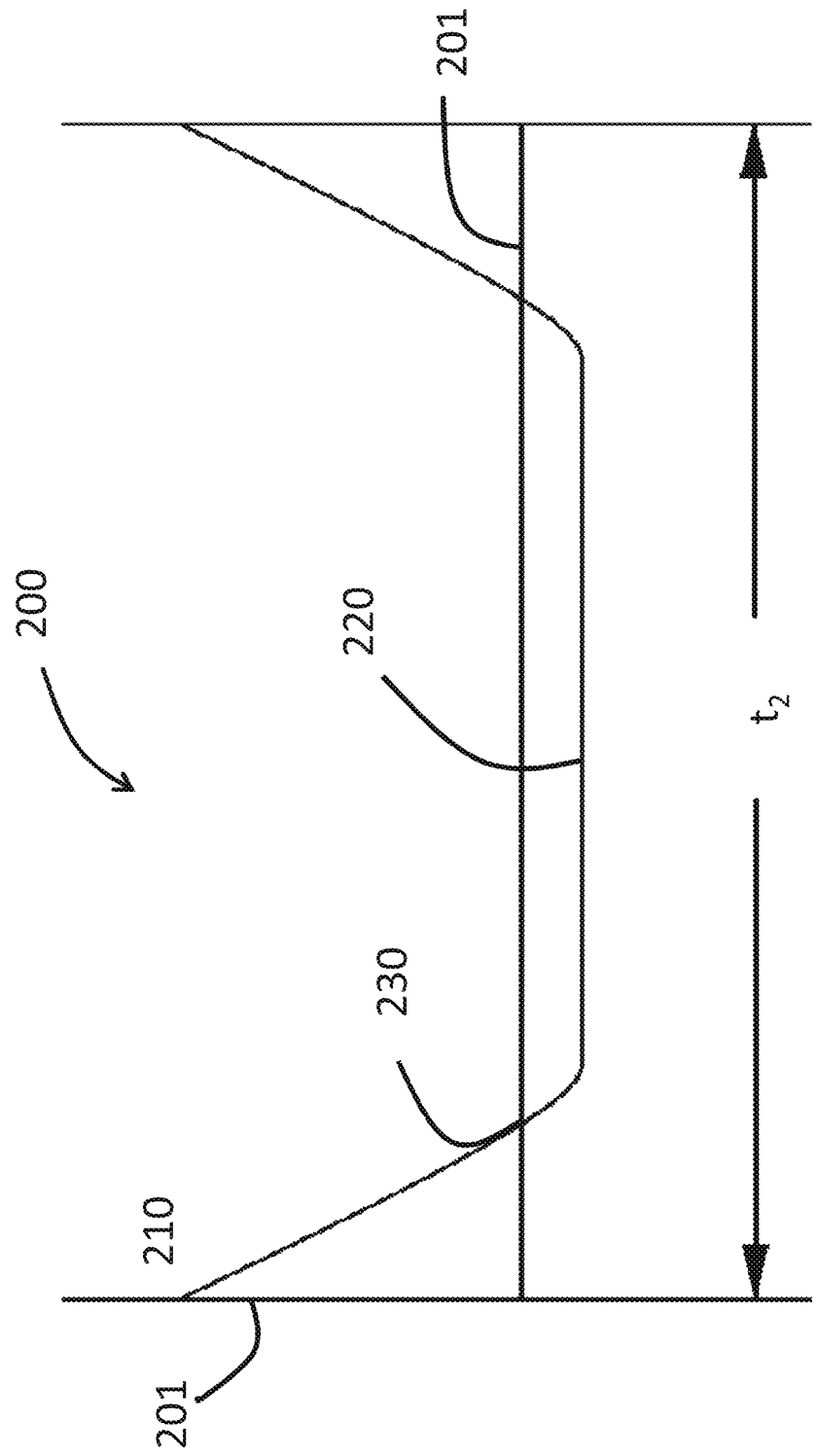
FIG. 2 is a cross-sectional view across a thickness of a known, chemically strengthened glass article.

In one or more embodiments, the stress profile 312 may be described as parabolic-like in shape. In some embodiments, the stress profile along the region or depth of the glass-article exhibiting tensile stress exhibits a parabolic-like shape. In one or more specific embodiments, the stress profile 312 is free of a flat stress (i.e., compressive or tensile) portion or a portion that exhibits a substantially constant stress (i.e., compressive or tensile). In some embodiments, the CT region exhibits a stress profile that is substantially free of a flat stress or free of a substantially constant stress. In one or more embodiments, all points of the stress profile 312 between a thickness range from about 0 t up to about 0.2•t and greater than 0.8•t (or from about 0•t to about 0.3•t and greater than 0.7•t) comprise a tangent having a slope that is less than about −0.1 MPa/micrometers or greater than about 0.1 MPa/micrometers. In other embodiments, at least one point of the stress profile 312 between a thickness range from about 0 t up to about 0.2•t and at least one point of the stress profile at a thickness greater than 0.8•t (or from about 0•t to about 0.3•t and greater than 0.7•t) comprises a tangent having a slope that is less than about −0.1 MPa/micrometers or greater than about 0.1 MPa/micrometers. In some embodiments, the tangent slope may be less than about −0.2 MPa/micrometers or greater than about 0.2 MPa/micrometers. In some more specific embodiments, the tangent slope may be less than about −0.3 MPa/micrometers or greater than about 0.3 MPa/micrometers. In even more specific embodiments, the tangent slope may be less than about −0.5 MPa/micrometers or greater than about 0.5 MPa/micrometers. In other words, the stress profile of one or more embodiments along these thickness ranges (i.e., 0•t up to about 0.2•t and greater than 0.8 t, or from about 0 t to about 0.3•t and 0.7•t or greater) exclude points having a tangent slope, as described herein. Without being bound by theory, known error function or quasi-linear stress profiles have points along these thickness ranges (i.e., from about 0•t up to about 0.2•t and greater than 0.8•t, or from about 0•t to about 0.3•t and 0.7•t or greater) that have a tangent with a slope of zero or of a value that is close to zero, i.e., that is in the range from greater than about −0.1 MPa/micrometers to less than about 0.1 MPa/micrometers (indicating a flat or zero slope stress profile along such thickness ranges, as shown in FIG. 2, 220). The glass articles of one or more embodiments of this disclosure do not exhibit such a stress profile having a flat or zero slope stress profile along these thickness ranges, as shown in FIG. 3.

In one or more embodiments, the glass article exhibits a stress profile in a thickness range from about 0.1•t to 0.3•t and from about 0.7•t to 0.9•t that comprises a maximum tangent slope and a minimum tangent slope. In some instances, the difference between the maximum tangent slope and the minimum tangent slope is about 3.5 MPa/micrometers or less, about 3 MPa/micrometers or less, about 2.5 MPa/micrometers or less, or about 2 MPa/micrometers or less.

In one or more embodiments, the glass article includes a stress profile 312 that is substantially free of any flat segments that extend in a depth direction or along at least a portion of the thickness t of the glass article. In other words, the stress profile 312 is substantially continuously increasing or decreasing along the thickness t. In some embodiments, the stress profile is substantially free of any flat segments in a depth direction having a length of about 10 micrometers or more, about 50 micrometers or more, or about 100 micrometers or more, or about 200 micrometers or more. As used herein, the term "flat" refers to a slope having a magnitude of less than about 0.55 MPa/micrometer, or less than about 0.22 MPa/micrometer along the flat segment. In some embodiments, one or more portions of the stress profile that are substantially free of any flat segments in a depth direction are present at depths within the glass article of about 5 micrometers or greater (e.g., 10 micrometers or greater, or 15 micrometers or greater) from either one or both the first surface or the second surface. For example, along a depth of about 0 micrometers to less than about 5 micrometers from the first surface, the stress profile may include linear segments, but from a depth of about 5 micrometers or greater from the first surface, the stress profile may be substantially free of flat segments. As used herein "linear" includes line segments having flat slope as well as line segments not having flat slopes.

In some embodiments, the stress profile may include linear segments at depths from about 0 t up to about 0.1 t and may be substantially free of linear segments at depths of about 0.1 t to about 0.4 t. In some embodiments, the stress profile from a thickness in the range from about 0 t to about 0.1 t may have a slope whose magnitude (in absolute value) is in the range from about 20 MPa/micron to about 200 MPa/micron. As will be described herein, such embodiments may be formed using a single ion-exchange process by which the bath includes two or more alkali salts or is a mixed alkali salt bath or multiple (e.g., 2 or more) ion exchange processes.

In one or more embodiments, the glass article may be described in terms of the shape of the stress profile along the CT region (327 in FIG. 3). For example, in some embodiments, the stress profile along the CT region (where stress is in tension) may be approximated by equation. In some embodiments, the stress profile along the CT region may be approximated by Equation (1):

$$\text{Stress}(x) = \text{MaxT} - (((CT_n \cdot (n+1))/0.5^n) \cdot |(x/t) - 0.5|^n) \quad (1)$$

In Equation (1), the stress (x) is the stress value at position x. Here the stress is positive (tension). In Equation (1), MaxT is the maximum tension value and $CT_n$ is the tension value at n and is less than or equal to MaxT. Both MaxT and $CT_n$ are positive values in units of MPa. The value x is position along the thickness (t) in micrometers, with a range from 0 to t; x=0 is one surface (302, in FIG. 3), x=0.5 t is the center of the glass article, at which position stress(x)=MaxT, and x=t is the opposite surface (304, in FIG. 3). MaxT used in Equation (1) is equivalent to the maximum CT, which may be less than about $71.5/\sqrt{(t)}$. In some embodiments, the MaxT used in Equation (1) may be in the range from about 50 MPa to about 80 MPa (e.g., from about 60 MPa to about 80 MPa, from about 70 MPa to about 80 MPa, from about 50 MPa to about 75 MPa, from about 50 MPa to about 70 MPa, or from about 50 MPa to about 65 MPa), and n is a fitting parameter from 1.5 to 5 (e.g., 2 to 4, 2 to 3 or 1.8 to 2.2) or from about 1.5 to about 2. In one or more embodiments, n=2 can provide a parabolic stress profile, exponents that deviate from n=2 provide stress profiles with near parabolic stress profiles. In one or more embodiments, CTn may be less than MaxT where there is a compressive stress spike on one or both major surfaces of the glass article. In one or more embodiments, CTn is equal to MaxT when there is no compressive stress spike on one or both major surfaces of the glass article.

In some embodiments, the stress profile may be modified by heat treatment. In such embodiments, the heat treatment may occur before any ion-exchange processes, between ion-exchange processes, or after all ion-exchange processes. In some embodiments, the heat treatment may reduce the absolute value of the magnitude of the slope of the stress profile at or near the surface. In some embodiments, where a steeper or greater slope is desired at the surface, an ion exchange process after the heat treatment may be utilized to provide a "spike" or to increase the slope of the stress profile at or near the surface.

In one or more embodiments, the stress profile 312 of the chemically strengthened glass article is generated due to a non-zero concentration of a metal oxide(s) that varies along a portion of the thickness. This variation in metal oxide concentration may be referred to herein as a metal oxide concentration gradient. In some embodiments, the concentration of a metal oxide of the chemically strengthened glass article is non-zero and varies, both along a thickness range from about 0·t to about 0.3·t. In some embodiments, the concentration of the metal oxide is non-zero and varies along a thickness range from about 0·t to about 0.35·t, from about 0·t to about 0.4·t, from about 0·t to about 0.45·t or from about 0·t to about 0.48·t. The metal oxide may be described as generating a stress in the glass article. The variation in concentration may be continuous along the above-referenced thickness ranges. Variation in concentration may include a change in metal oxide concentration of about 0.2 mol % along a thickness segment of about 100 micrometers. This change may be measured by known methods in the art including microprobe. The metal oxide that is non-zero in concentration and varies along a portion of the thickness may be described as generating a stress in the glass article.

The variation in metal oxide concentration of the chemically strengthened glass article may be continuous along the above-referenced thickness ranges. In some embodiments, the variation in concentration may be continuous along thickness segments in the range from about 10 micrometers to about 30 micrometers. In some embodiments, the concentration of the metal oxide decreases from the first surface to a value at a point between the first surface and the second surface and increases from the value to the second surface.

The concentration of metal oxide of the chemically strengthened glass article may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while the at deeper depths, the concentration of ions having a smaller radius is greater than the concentration of ions having larger radius. For example, where a single Na- and K-containing bath is used in the ion exchange process, the concentration of K+ ions in the glass article is greater than the concentration of Na+ ions at shallower depths, while the concentration of Na+ is greater than the concentration of K+ ions at deeper depths. This is due, in part, due to the size of the monovalent ions that are exchanged into the glass for smaller monovalent ions. In such glass articles, the area at or near the surface comprises a greater CS due to the greater amount of larger ions (i.e., K+ ions) at or near the surface. This greater CS may be exhibited by a stress profile having a steeper slope at or near the surface (i.e., a spike in the stress profile at the surface).

The concentration gradient or variation of one or more metal oxides is created by chemically strengthening a glass article, as previously described herein, in which a plurality of first metal ions in the glass article is exchanged with a plurality of second metal ions. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius of the first alkali metal ion. The second metal ion is present in the glass article as an oxide thereof (e.g., $Na_2O$, $K_2O$, $Rb_2O$, $Cs_2O$ or a combination thereof).

In one or more embodiments, the metal oxide concentration gradient of the chemically strengthened glass article extends through a substantial portion of the thickness t or the entire thickness t of the glass article, including the CT layer 327. In one or more embodiments, the concentration of the metal oxide is about 0.5 mol % or greater in the CT layer 327. In some embodiments, the concentration of the metal oxide may be about 0.5 mol % or greater (e.g., about 1 mol % or greater) along the entire thickness of the glass article, and is greatest at the first surface 302 and/or the second surface 304 and decreases substantially constantly to a point between the first surface 302 and the second surface 304. At that point, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. In some embodiments, the lowest concentration in the particular metal oxide is in the CT layer 327. The total concentration of the particular metal oxide in the glass article may be in the range from about 1 mol % to about 20 mol %.

In one or more embodiments, the chemically strengthened glass article includes a first metal oxide concentration and a second metal oxide concentration, such that the first metal oxide concentration is in the range from about 0 mol % to about 15 mol % along a first thickness range from about 0 t to about 0.5 t, and the second metal oxide concentration is in the range from about 0 mol % to about 10 mol % from a second thickness range from about 0 micrometers to about 25 micrometers (or from about 0 micrometers to about 12 micrometers); however, the concentration of one or both the first metal oxide and the second metal oxide is non-zero along a substantial portion or the entire thickness of the glass article. The chemically strengthened glass article may include an optional third metal oxide concentration. The first metal oxide may include $Na_2O$ while the second metal oxide may include $K_2O$.

The concentration of the metal oxide in embodiments of the chemically strengthened glass article may be determined from a baseline amount of the metal oxide in the glass article prior to being modified to include the concentration gradient of such metal oxide.

In one or more embodiments, the unstrengthened and chemically strengthened glass articles exhibit a Knoop Lateral Cracking Scratch Threshold of about 6 N or greater, about 8 N or greater, about 10 N or greater, about 12 N or greater, about 14 N or greater, or about 16 N or greater. In some embodiments, the unstrengthened and chemically strengthened glass articles exhibit a Knoop Lateral Scratch Threshold in the range from about 6 N to about 26 N, from about 8 N to about 26 N, from about 10 N to about 26 N, from about 12 N to about 26 N, from about 14 N to about 26 N, from about 15 N to about 26 N, from about 16 N to about 26 N, from about 18 N to about 26 N, from about 6 N to about 24 N, from about 6 N to about 22 N, from about 6 N to about 20 N, from about 6N to about 18 N, from about 6 N to about 16 N, or from about 18 N to about 24 N. The Knoop Scratch Lateral Cracking Threshold may be measured on the first major surface 302 or the second major surface 304 of the unstrengthened and chemically strengthened glass article. As used herein, Knoop Scratch Lateral Cracking Threshold is the onset of lateral cracking (in 3 or more of 5 indentation events). In Knoop Lateral Cracking Scratch Threshold testing, samples of the glass articles and articles were first scratched with a Knoop indenter under a dynamic or ramped load to identify the lateral crack onset load range for the sample population. Once the applicable load range is identified, a series of increasing constant load scratches (3 minimum or more per load) are performed to identify the Knoop scratch threshold. The Knoop scratch threshold range can be determined by comparing the test specimen to one of the following 3 failure modes: 1) sustained lateral surface cracks that are more than two times the width of the groove, 2) damage is contained within the groove, but there are lateral surface cracks that are less than two times the width of groove and there is damage visible by naked eye, or 3) the presence of large subsurface lateral cracks which are greater than two times the width of groove and/or there is a median crack at the vertex of the scratch.

The embodiments of the glass articles (both unstrengthened and chemically strengthened) may be used as a cover glass for mobile electronic devices and touch-enabled displays. The glass articles may also be used in displays (or as display articles) (e.g., billboards, point of sale systems, computers, navigation systems, and the like), architectural articles (walls, fixtures, panels, windows, etc.), transportation articles (e.g., in automotive applications, trains, aircraft, sea craft, etc.), appliances (e.g., washers, dryers, dishwashers, refrigerators and the like), or any article that requires some fracture resistance.

In particular, the glass articles described herein are thin and, when chemically strengthened as described herein, exhibit stress profiles that are typically only achievable through tempering thick glass articles (e.g., having a thickness of about 2 mm or 3 mm or greater). The glass articles exhibit unique stress profiles along the thickness thereof. In some cases, the glass articles described herein exhibit a greater surface CS than tempered glass articles. In one or more embodiments, the glass articles have a compressive stress layer that extends deeper into the glass article (in which the CS decreases and increases more gradually than known chemically strengthened glass articles) such the glass article exhibits substantially improved fracture resistance, even when the glass article or a device including the same is dropped on a hard surface (e.g., granite) or a hard and rough surface (e.g., asphalt). The glass articles of one or more embodiments exhibit a greater maximum CT value than some known chemically strengthened glass articles.

In one or more embodiments, the chemically strengthened glass articles described herein exhibit improved surface strength when subjected to abraded ring-on-ring (AROR) testing. The strength of a material is defined as the stress at which fracture occurs. The AROR test is a surface strength measurement for testing flat glass specimens, and ASTM C1499-09(2013), entitled "Standard Test Method for Monotonic Equibiaxial Flexural Strength of Advanced Ceramics at Ambient Temperature," serves as the basis for the AROR test methodology described herein. The contents of ASTM C1499-09 are incorporated herein by reference in their entirety. In one embodiment, the glass specimen is abraded prior to ring-on-ring testing with 90 grit silicon carbide (SiC) particles that are delivered to the glass sample using the method and apparatus described in Annex A2, entitled "abrasion Procedures," of ASTM C158-02(2012), entitled "Standard Test Methods for Strength of Glass by Flexure (Determination of Modulus of Rupture). The contents of ASTM C158-02 and the contents of Annex 2 in particular are incorporated herein by reference in their entirety.

Prior to ring-on-ring testing a surface of the glass article is abraded as described in ASTM C158-02, Annex 2, to normalize and/or control the surface defect condition of the sample using the apparatus shown in FIG. A2.1 of ASTM C158-02. The abrasive material is sandblasted onto the surface 110 of the glass article at a load of 15 psi using an air pressure of 304 kPa (44 psi). After air flow is established, 5 $cm^3$ of abrasive material is dumped into a funnel and the sample is sandblasted for 5 seconds after introduction of the abrasive material.

Figure 5:
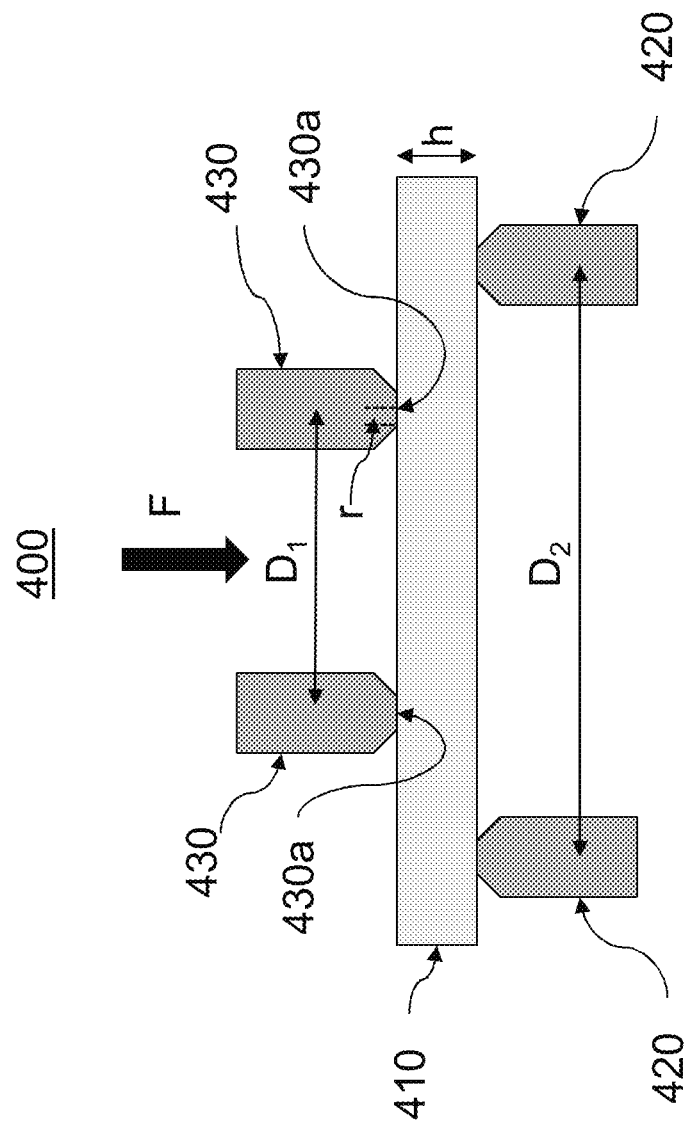
FIG. 5 is a is a schematic cross-sectional view of a ring-on-ring apparatus.

For the AROR test, the chemically strengthened glass article having at least one abraded surface 410 as shown in FIG. 5, is placed between two concentric rings of differing size to determine equibiaxial flexural strength (i.e., the maximum stress that a material is capable of sustaining when subjected to flexure between two concentric rings), as also shown in FIG. 5. In the AROR configuration 400, the abraded glass article 410 is supported by a support ring 420 having a diameter D2. A force F is applied by a load cell (not shown) to the surface of the glass article by a loading ring 430 having a diameter D1.

The ratio of diameters of the loading ring and support ring D1/D2 may be in a range from about 0.2 to about 0.5. In some embodiments, D1/D2 is about 0.5. Loading and support rings 130, 120 should be aligned concentrically to within 0.5% of support ring diameter D2. The load cell used for testing should be accurate to within ±1% at any load within a selected range. In some embodiments, testing is carried out at a temperature of 23±2° C. and a relative humidity of 40±10%.

For fixture design, the radius r of the protruding surface of the loading ring 430, $h/2 \le r \le 3h/2$, where h is the thickness of glass article 410. Loading and support rings 430, 420 are typically made of hardened steel with hardness HRc>40. AROR fixtures are commercially available.

The intended failure mechanism for the AROR test is to observe fracture of the glass article 410 originating from the surface 430a within the loading ring 430. Failures that occur outside of this region—i.e., between the loading rings 430 and support rings 420—are omitted from data analysis. Due to the thinness and high strength of the glass article 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. AROR testing therefore focuses on peak load at failure as the measured response.

The strength of glass article depends on the presence of surface flaws. However, the likelihood of a flaw of a given size being present cannot be precisely predicted, as the strength of glass is statistical in nature. A probability distribution can therefore generally be used as a statistical representation of the data obtained.

In some embodiments, the glass articles described herein have a surface or equibiaxial flexural strength of 20 or more kgf and up to about 30 kgf as determined by AROR testing using a load of 25 psi or even 45 psi to abrade the surface. In other embodiments, the surface strength is 25 or more kgf, and in still other embodiments, 30 or more kgf.

Figure 6:
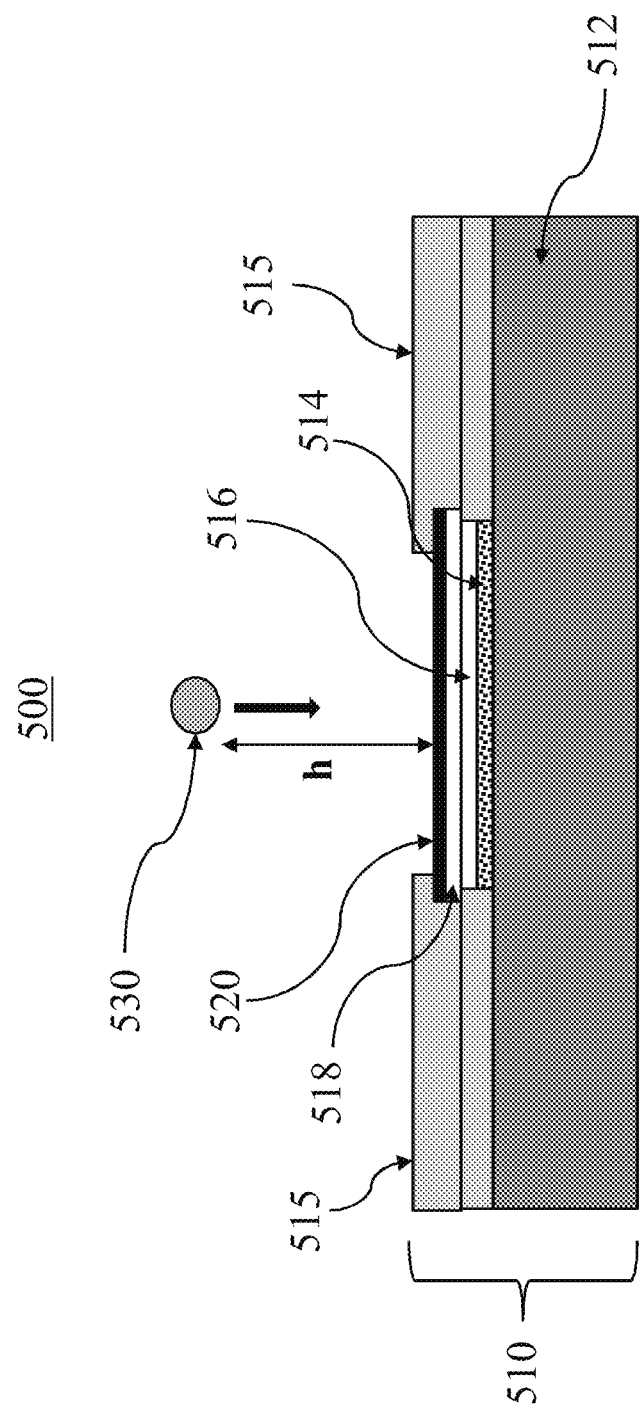
FIG. 6 is a schematic cross-sectional view of an embodiment of the apparatus that is used to perform the inverted ball on sandpaper (IBoS) test described in the present disclosure.
Figure 7:
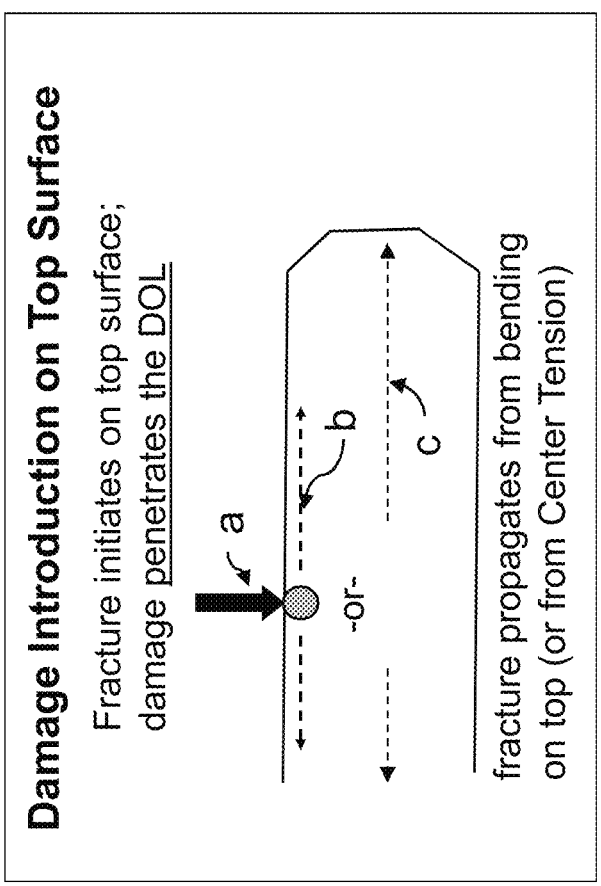
FIG. 7 is a schematic cross-sectional representation of the dominant mechanism for failure due to damage introduction plus bending that typically occurs in glass-based articles that are used in mobile or hand held electronic devices.

In some embodiments, the chemically strengthened glass articles described herein may be described in terms of performance in an inverted ball on sandpaper (IBoS) test. The IBoS test is a dynamic component level test that mimics the dominant mechanism for failure due to damage introduction plus bending that typically occurs in glass articles that are used in mobile or hand held electronic devices, as schematically shown in FIG. 6. In the field, damage introduction (a in FIG. 7) occurs on the top surface of the glass article. Fracture initiates on the top surface of the glass article and damage either penetrates the glass article (b in FIG. 7) or the fracture propagates from bending on the top surface or from the interior portions of the glass article (c in FIG. 7). The IBoS test is designed to simultaneously introduce damage to the surface of the glass and apply bending under dynamic load. In some instances, the glass article exhibits improved drop performance when it includes a compressive stress than if the same glass article does not include a compressive stress.

An IBoS test apparatus is schematically shown in FIG. 6. Apparatus 500 includes a test stand 510 and a ball 530. Ball 530 is a rigid or solid ball such as, for example, a stainless steel ball, or the like. In one embodiment, ball 530 is a 4.2 gram stainless steel ball having diameter of 10 mm. The ball 530 is dropped directly onto the glass article sample 518 from a predetermined height h. Test stand 510 includes a solid base 512 comprising a hard, rigid material such as granite or the like. A sheet 514 having an abrasive material disposed on a surface is placed on the upper surface of the solid base 512 such that surface with the abrasive material faces upward. In some embodiments, sheet 514 is sandpaper having a 30 grit surface and, in other embodiments, a 180 grit surface. The glass article sample 518 is held in place above sheet 514 by sample holder 515 such that an air gap 516 exists between glass article sample 518 and sheet 514. The air gap 516 between sheet 514 and glass article sample 518 allows the glass article sample 518 to bend upon impact by ball 530 and onto the abrasive surface of sheet 514. In one embodiment, the glass article sample 218 is clamped across all corners to keep bending contained only to the point of ball impact and to ensure repeatability. In some embodiments, sample holder 514 and test stand 510 are adapted to accommodate sample thicknesses of up to about 2 mm. The air gap 516 is in a range from about 50 μm to about 100 μm. Air gap 516 is adapted to adjust for difference of material stiffness (Young's modulus), but also includes the Young's modulus and thickness of the sample. An adhesive tape 520 may be used to cover the upper surface of the glass article sample to collect fragments in the event of fracture of the glass article sample 518 upon impact of ball 530.

Various materials may be used as the abrasive surface. In a one particular embodiment, the abrasive surface is sandpaper, such as silicon carbide or alumina sandpaper, engineered sandpaper, or any abrasive material known to those skilled in the art for having comparable hardness and/or sharpness. In some embodiments, sandpaper having 30 grit may be used, as it has a surface topography that is more consistent than either concrete or asphalt, and a particle size and sharpness that produces the desired level of specimen surface damage.

Figure 8:
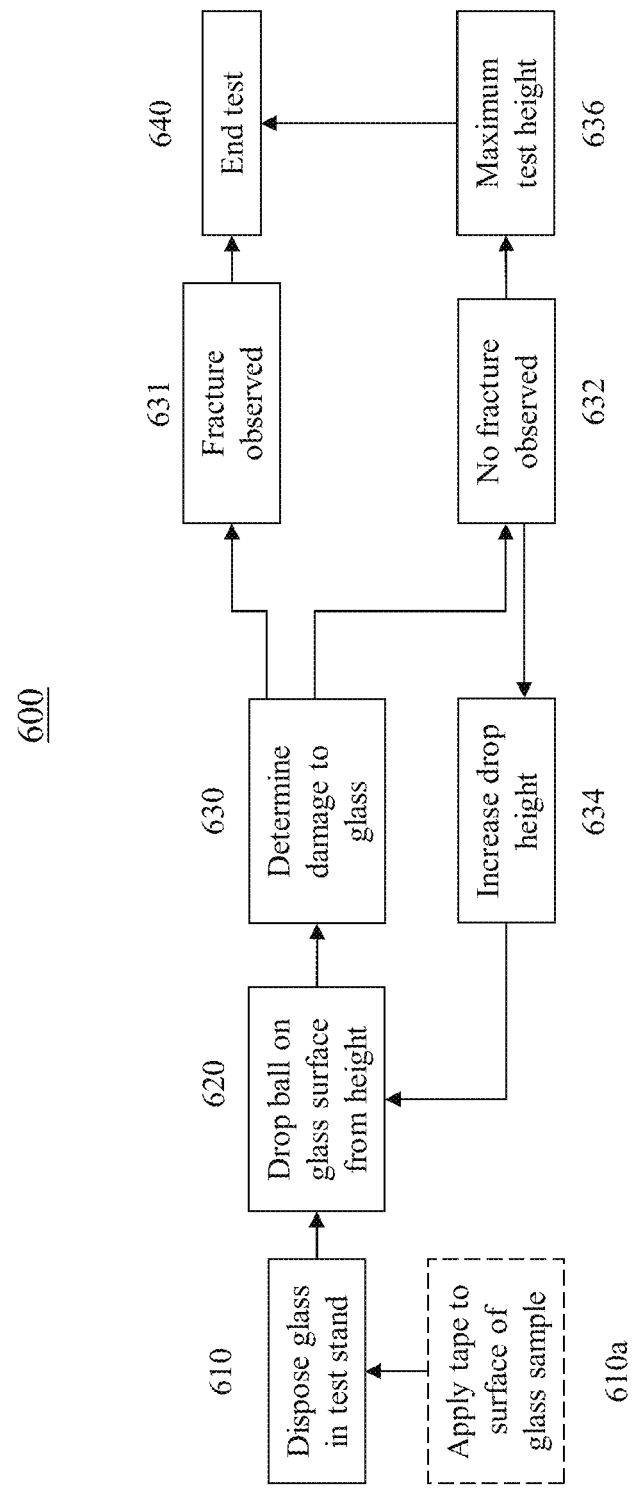
FIG. 8 is a flow chart for a method of conducting the IBoS test in the apparatus described herein.

In one aspect, a method 600 of conducting the IBoS test using the apparatus 500 described hereinabove is shown in FIG. 8. In Step 610, a glass article is placed in the test stand 510, described previously and secured in sample holder 515 such that an air gap 516 is formed between the glass article sample 518 and sheet 514 with an abrasive surface. Method 600 presumes that the sheet 514 with an abrasive surface has already been placed in test stand 510. In some embodiments, however, the method may include placing sheet 514 in test stand 510 such that the surface with abrasive material faces upward. In some embodiments (Step 610a), an adhesive tape 520 is applied to the upper surface of the glass article sample 518 prior to securing the glass article sample 518 in the sample holder 510.

In Step 520, a solid ball 530 of predetermined mass and size is dropped from a predetermined height h onto the upper surface of the glass article sample 518, such that the ball 530 impacts the upper surface (or adhesive tape 520 affixed to the upper surface) at approximately the center (i.e., within 1 mm, or within 3 mm, or within 5 mm, or within 10 mm of the center) of the upper surface. Following impact in Step 520, the extent of damage to the glass article sample 518 is determined (Step 630). As previously described hereinabove, herein, the term "fracture" means that a crack propagates across the entire thickness and/or entire surface of a substrate when the substrate is dropped or impacted by an object.

In method 600, the sheet 518 with the abrasive surface may be replaced after each drop to avoid "aging" effects that have been observed in repeated use of other types (e.g., concrete or asphalt) of drop test surfaces.

Various predetermined drop heights h and increments are typically used in method 600. The test may, for example, utilize a minimum drop height to start (e.g., about 10-20 cm). The height may then be increased for successive drops by either a set increment or variable increments. The test described in method 600 is stopped once the glass article sample 518 breaks or fractures (Step 631). Alternatively, if the drop height h reaches the maximum drop height (e.g., about 100 cm) without fracture, the drop test of method 300 may also be stopped, or Step 520 may be repeated at the maximum height until fracture occurs.

In some embodiments, IBoS test of method 600 is performed only once on each glass article sample 518 at each predetermined height h. In other embodiments, however, each sample may be subjected to multiple tests at each height.

If fracture of the glass article sample 518 has occurred (Step 631 in FIG. 8), the IBoS test according to method 600 is ended (Step 640). If no fracture resulting from the ball drop at the predetermined drop height is observed (Step 632), the drop height is increased by a predetermined increment (Step 634)—such as, for example 5, 10, or 20 cm—and Steps 620 and 630 are repeated until either sample fracture is observed (631) or the maximum test height is reached (636) without sample fracture. When either Step 631 or 636 is reached, the test according to method 600 is ended.

When subjected to the inverted ball on sandpaper (IBoS) test described above, embodiments of the glass article described herein have at least about a 60% survival rate (i.e., a survival rate of 60% or more) when the ball is dropped onto the surface of the glass from a height of 100 cm. For example, a glass article is described as having a 60% survival rate when dropped from a given height when three of five identical (or nearly identical) samples (i.e., having approximately the same composition and, when strengthened, approximately the same compressive stress and depth of compression or compressive stress layer, as described herein) survive the IBoS drop test without fracture when dropped from the prescribed height (here 100 cm). In other embodiments, the survival rate in the 100 cm IBoS test of the glass articles that are strengthened is at least about 70% (70% or more), in other embodiments, at least about 80% (80% or more), and, in still other embodiments, at least about 90% (90% or more). In other embodiments, the survival rate of the strengthened glass articles dropped from a height of 100 cm in the IBoS test is at least about 60% (60% or more), in other embodiments, at least about 70% (70% or more), in still other embodiments, at least about 80% (80% or more), and, in other embodiments, at least about 90% (90% or more). In one or more embodiments, the survival rate of the strengthened glass articles dropped from a height of 150 cm in the IBoS test is at least about 60% (60% or more), in other embodiments, at least about 70% (70% or more), in still other embodiments, at least about 80% (80% or more), and, in other embodiments, at least about 90% (90% or more).

To determine the survivability rate of the glass articles when dropped from a predetermined height using the IBoS test method and apparatus described hereinabove, at least five identical (or nearly identical) samples (i.e., having approximately the same composition and, if strengthened, approximately the same compressive stress and depth of compression or layer) of the glass articles are tested, although larger numbers (e.g., 10, 20, 30, etc.) of samples may be subjected to testing to raise the confidence level of the test results. Each sample is dropped a single time from the predetermined height (e.g., 100 cm or 150 cm) or, alternatively, dropped from progressively higher heights without fracture until the predetermined height is reached, and visually (i.e., with the naked eye) examined for evidence of fracture (crack formation and propagation across the entire thickness and/or entire surface of a sample). A sample is deemed to have "survived" the drop test if no fracture is observed after being dropped from the predetermined height, and a sample is deemed to have "failed (or "not survived") if fracture is observed when the sample is dropped from a height that is less than or equal to the predetermined height. The survivability rate is determined to be the percentage of the sample population that survived the drop test. For example, if 7 samples out of a group of 10 did not fracture when dropped from the predetermined height, the survivability rate of the glass would be 70%.

Figure 9:
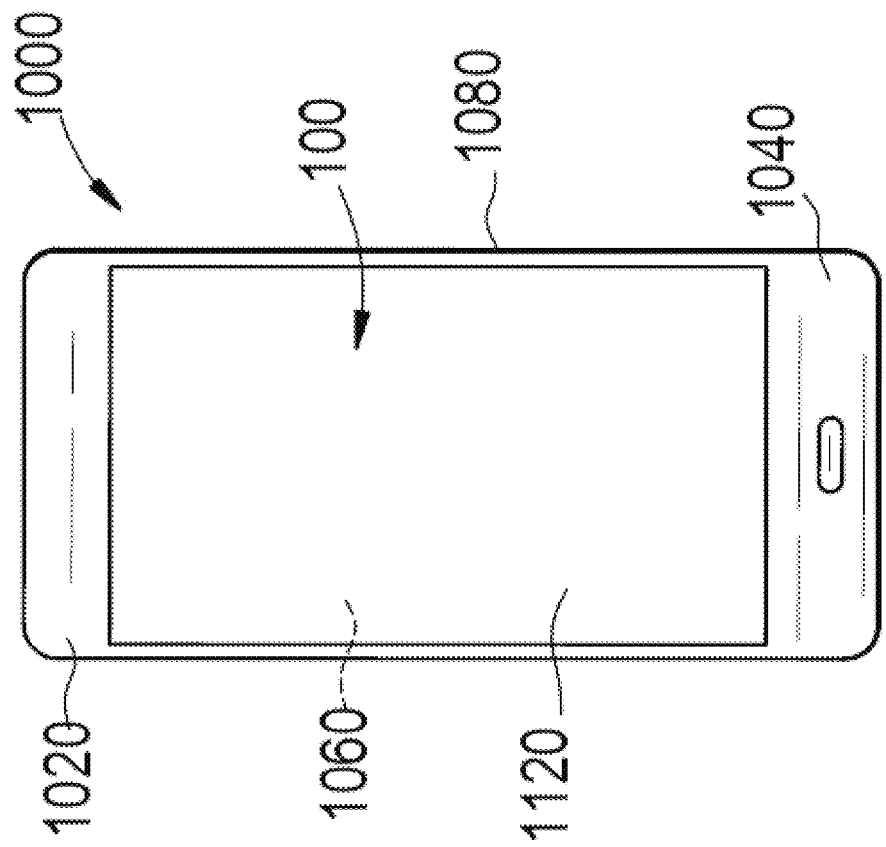
FIG. 9 is a front plan view of an electronic device incorporating one or more embodiments of the glass articles described herein.
Figure 14:
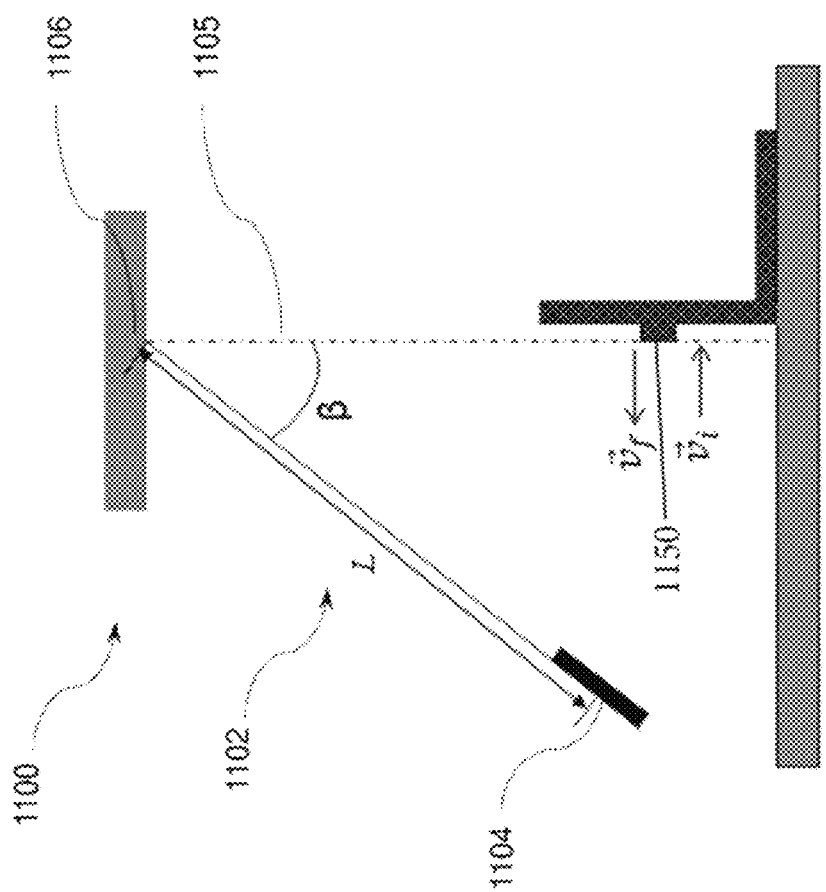
FIG. 14 is a schematic side view of a testing apparatus for glass-based articles.

Another aspect of this disclosure pertains to devices that include the glass articles described herein. For example, the devices may include any device including a display or requiring, strengthened thin glass. In one or more embodiments the devices are electronic devices, which can include mobile devices such as mobile phones, laptops, tablets, mp3 players, navigation devices and the like, or stationary devices such as computers, electronic displays, in vehicle information/entertainment systems, billboards, point of sale systems, navigation systems, and the like). In some embodiments, the glass articles described herein may be incorporated into architectural articles (walls, fixtures, panels, windows, etc.), transportation articles (e.g., glazing or interior surfaces in automotive applications, trains, aircraft, sea craft, etc.), appliances (e.g., washers, dryers, dishwashers, refrigerators and the like), or any article that requires some fracture resistance. As shown in FIG. 9, an electronic device 1000 may include a glass article 100 according to one or more embodiments described herein. The device 1000 includes a housing 1020 having front 1040, back 1060, and side surfaces 1080; electrical components (not shown) that are at least partially inside or entirely within the housing and including at least a controller, a memory, and a display 1120 at or adjacent to the front surface of the housing. The glass article 100 is shown as a cover disposed at or over the front surface of the housing such that it is over the display 1120. In some embodiments, the glass article may be used as a back cover.

Another aspect of this disclosure pertains to a method of forming the embodiments of the chemically strengthened glass articles described herein. The method includes providing a glass article having a first surface and a second surface defining a thickness of about 3 millimeter or less and generating a stress profile in the glass article. In one or more embodiments, generating the stress profile comprises ion exchanging a plurality of alkali ions into the glass article to form a non-zero alkali metal oxide concentration that varies along a substantial portion of the thickness (as described herein) or along the entire thickness. In one example, generating the stress profile includes immersing the glass article in a molten salt bath including nitrates of Na+, K+, Rb+, Cs+ or a combination thereof, having a temperature of about 350° C. or greater (e.g., about 350° C. to about 500° C.). In one example, the molten bath may include $NaNO_3$, $KNO_3$ or a combination thereof, and may have a temperature of about 485° C. or less. In another example, the bath may include a mixture of $NaNO_3$ and $KNO_3$ and have a temperature of about 460° C. The glass article may be immersed in the bath for about 2 hours or more, up to about 48 hours (e.g., from about 2 hours to about 10 hours, from about 2 hours to about 8 hours, from about 2 hours to about 6 hours, from about 3 hours to about 10 hours, or from about 3.5 hours to about 10 hours).

In some embodiments, the method may include immersing the glass article in a single bath or, in successive immersion steps, immersing the glass article in more than one bath. For example, two or more baths may be used successively. The composition of the one or more baths may include a single metal (e.g., Ag+, Na+, K+, Rb+, or Cs+) or a combination of metals in the same bath. When more than one bath is utilized, the baths may have the same or different composition and/or temperature as one another. The immersion times in each such bath may be the same or may vary to provide the desired stress profile.

In one or more embodiments of the method, a second bath or subsequent baths may be utilized to generate a greater surface CS. In some instances, the method includes immersing the glass article in the second or subsequent baths to generate a greater surface CS, without significantly influencing the DOC. In such embodiments, the second or subsequent bath may include a single metal (e.g., $KNO_3$ or $NaNO_3$) or a mixture of metals ($KNO_3$ and $NaNO_3$). The temperature of the second or subsequent bath may be tailored to generate the greater surface CS. In some embodiments, the immersion time of the glass article in the second or subsequent bath may also be tailored to generate a greater surface CS without substantially influencing the DOC. For example, the immersion time in the second or subsequent baths may be less than 10 hours (e.g., about 8 hours or less, about 5 hours or less, about 4 hours or less, about 2 hours or less, about 1 hour or less, about 30 minutes or less, about 15 minutes or less, or about 10 minutes or less).

In one or more embodiments, the method includes immersing the glass article in a molten salt bath of 100% $NaNO_3$ having a temperature of 390° C. for a duration in the range from about 2 hours to about 10 hours (e.g., 7 hours). In one or more embodiments, the method includes immersing the glass article in a molten salt bath of 80% $KNO_3$ and 20% $NaNO_3$ having a temperature of 390° C. for a duration in the range from about 2 hours to about 10 hours (e.g., 7 hours). In one or more embodiments, the method includes immersing the glass article in a molten salt bath of 60% $KNO_3$ and 40% $NaNO_3$ having a temperature of 390° C. for a duration in the range from about 2 hours to about 10 hours (e.g., 4.5, 5, 6, or 7 hours). In one or more embodiments, the method includes immersing the glass article in a molten salt bath of 60% $KNO_3$ and 40% $NaNO_3$ having a temperature of 390° C. for a duration in the range from about 2 hours to about 10 hours (e.g., 4.5, 5, 6, or 7 hours).

In one or more embodiments, the method may include imparting a thermal history to the glass article before ion exchanging the glass article (i.e., immersing the glass article in a molten salt bath). In one or more embodiments, imparting a thermal history includes annealing or fictivating the glass article before ion exchanging the glass article (i.e., immersing in a molten salt bath). In one or more embodiments, annealing the glass article includes heating the glass article to a temperature at which the glass article exhibits a viscosity of $10^{13.2}$ poise. In one or more embodiments, the method includes fictivating the glass article to a $10^{11}$ poise temperature (i.e., the temperature at which the viscosity of a glass article is approximately $10^{11}$ poise). As used herein, annealing the glass article or fictivating the glass article includes heating the glass article to a temperature at which the glass exhibits the prescribed viscosity (i.e., $10^{11}$ poise for fictivating and $10^{13.2}$ poise for annealing), then rapidly quenching the glass article to room temperature. Without being bound by theory, annealing or fictivating the glass article in this manner restricts or locks in the glass structure corresponding to that viscosity. Providing this thermal history to the glass article provides a structure that facilitates chemical strengthening. Moreover, the selection of this annealing or fictivating regime and the relevant viscosity level mimics the thermal history of fusion formed glass and thus can be applied to glass that is not fusion formed to create the same thermal history and enhanced chemical strengthening. Accordingly, in one or more embodiments the method includes annealing or fictivating a float-formed glass article, a slot-drawn glass article, or other non-fusion formed glass article.

In one or more alternative embodiments, the method may include one or more heat treatment steps which may be used in combination with the ion-exchanging processes described herein. The heat treatment includes heat treating the glass article to obtain a desired stress profile. In some embodiments, heat treating includes annealing, tempering or heating the glass article to a temperature in the range from about 300° C. to about 600° C. The heat treatment may last for 1 minute up to about 18 hours. In some embodiments, the heat treatment may be used after one or more ion-exchanging processes, or between ion-exchanging processes.

In one or more embodiments, the glass article may be acid polished or otherwise treated to remove or reduce the effect of surface flaws.

As used and reported herein: strain point temperatures were determined using the fiber elongation method of ASTM C336-71(2015); annealing temperatures were determined using the fiber elongation method of ASTM C336-71(2015); softening point temperatures were determined using the fiber elongation method of ASTM C338-93(2013); and liquidus viscosities were determined as follows—first the liquidus temperature of the glass was measured in accordance with ASTM C829-81 (2015), titled "Standard Practice for Measurement of Liquidus Temperature of Glass by the Gradient Furnace Method", and then the viscosity of the glass at the liquidus temperature was measured in accordance with ASTM C965-96(2012), titled "Standard Practice for Measuring Viscosity of Glass Above the Softening Point".

In the embodiments described herein which include the material property that the article exhibits a threshold failure impact force greater than a certain force value when the article is bent to impart a tensile stress of 100 MPa, this is tested as follows. According to one or more embodiments, "threshold failure impact force" refers to the minimum impact force that is sufficient to causes an observable fracture on the surface of the article, as described above with respect to FIG. 7. In one or more embodiments, the article tested for "threshold failure impact force" is a sheet having a thickness of 0.1 mm, 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm or 2 mm.

Reliability testing of devices is integral to understanding how they will perform during their application lifetime. Device drop testing is commonly employed to understand handheld electronic device (e.g. smartphone, tablets, laptops, etc.) reliability after incurring drop events (e.g. dropping a phone in a parking lot), as these events could compromise the device functionality. One concern with devices is the reliability of the cover glass used in these devices. Damage or fracture to the cover glass of a handheld, electronic device can result in a non-useable device and/or safety issues for the user. Understanding the limitation of the cover material and how it relates to the device design is integral to improving cover glass performance.

Typically, real devices are drop tested to understand their reliability. However, this can become very expensive and is only available when the device design has become finalized and devices have been fabricated. To handle these drawbacks, surrogate test vehicles (reusable, mock-up of devices that resemble device dimensions and weight) are used to simulate device for cover glass performance testing. These surrogate vehicles help in understanding the capability of the glass to meet customer requirements and help in providing design feedback that aids in cover glass survivability (e.g. bevel design). However, the building of the surrogate vehicles and to performing the (drop) test is time consuming and quite expensive. Thus, instead, there is used an apparatus for testing surfaces of a glass-based article, for example, a cover glass for mobile electronic devices such that it simulates a failure mode that has been observed to occur in the field, which is predominantly a combination of stress (bending) and damage introduction. This known failure mode is re-created using a component-level based surface impact test. Extensive testing has been conducted using this apparatus and it has been learned that certain glass compositions and ion exchange stress profiles can improve cover glass survivability, through this test.

The apparatus comprises a simple pendulum-based dynamic impact test having a surface ranging from flat to curved, where the glass-based article test specimen is mounted to a bob of a pendulum, which is then used to cause the test specimen to contact an impact surface, which can be a smooth or roughened surface. To perform the test, the sample is loaded on the holder and then pulled backwards from the pendulum equilibrium position and released to make a dynamic impact on the impact surface. The test mimics a drop event, such that the glass/specimen is the moving part and the surface is the stationary part. Available curved surfaces are a simulative of stress numbers (bending stress) obtained from field failures. The glass-based article is the moving part, which travels to strike the impact surface, which is the stationary part, replicative of a device (moving part) dropped from a given height onto a surface (stationary part).

Failure mode is known to vary with the speed of damage introduction and bending rate. Unlike other quasi-statistic load application based component-level test, such as ring-on-ring (ROR), indentation fracture threshold (IFT) and abraded ring-on-ring (ARoR—which involves damage introduction followed by slow bending through quasi-static load application) used to characterize cover glass performance, this test is dynamic in nature. Furthermore, with the increasing demand for thin cover material in mobile device applications becoming very popular, the need to have a component level based test to evaluate different thin cover materials becomes important. This test can be used in the prediction of the potential drop performance response of this thin glass, as it demonstrated credibility in the evaluation of glass materials, of different compositions and IOX treatments, as low as 0.3 mm thickness. The test method, in a simple manner, enables quicker estimation of glass impact energy and associated impact force, which compares well to those generated from system level drop tests.

Referring now to FIGS. 10-15, an embodiment of an apparatus 1100 for carrying out the "Surface Threshold Failure Impact Force Test" on a brittle substrate is shown as comprising a pendulum 1102 including a bob 1104 attached to a pivot 1106. A bob on a pendulum is a weight suspended from the pivot and connected to a pivot by an arm. Thus, the bob 1104 shown in the Figures is connected to the pivot 1106 by arm 1108, which may be in the form of a string, or a rod or a plurality of rods, such as two rods as shown. As best shown in FIG. 33, the bob 1104 has an equilibrium position 1105 shown as dotted line such that the angle β is zero. In other words, the arm 1108 is not in a raised position.

The bob 1104 can simply be the brittle substrate that is affixed to the lower end of the arm 1108. In one or more embodiments, the bob 1104 includes a base 1110 for receiving a brittle substrate. As shown in better detail in FIG. 15, the base 1110 for receiving a brittle substrate 1112 having at least two ends 1114, 1116, an inner surface 1113 and an outer surface 1115. The base 1110 has a first end 1120 and a second end 1122, and a curved surface 1124 defining a radius of curvature between the first end 1120 and the second end 1122. The base 1110 can be any suitable material to provide a platform to secure a substrate for the impact test, which will be described further below. Suitable materials for the base 1110 can include wood, metal, ceramic, or combinations thereof. The curved surface 1124 has an apex 1125.

Figure 15:
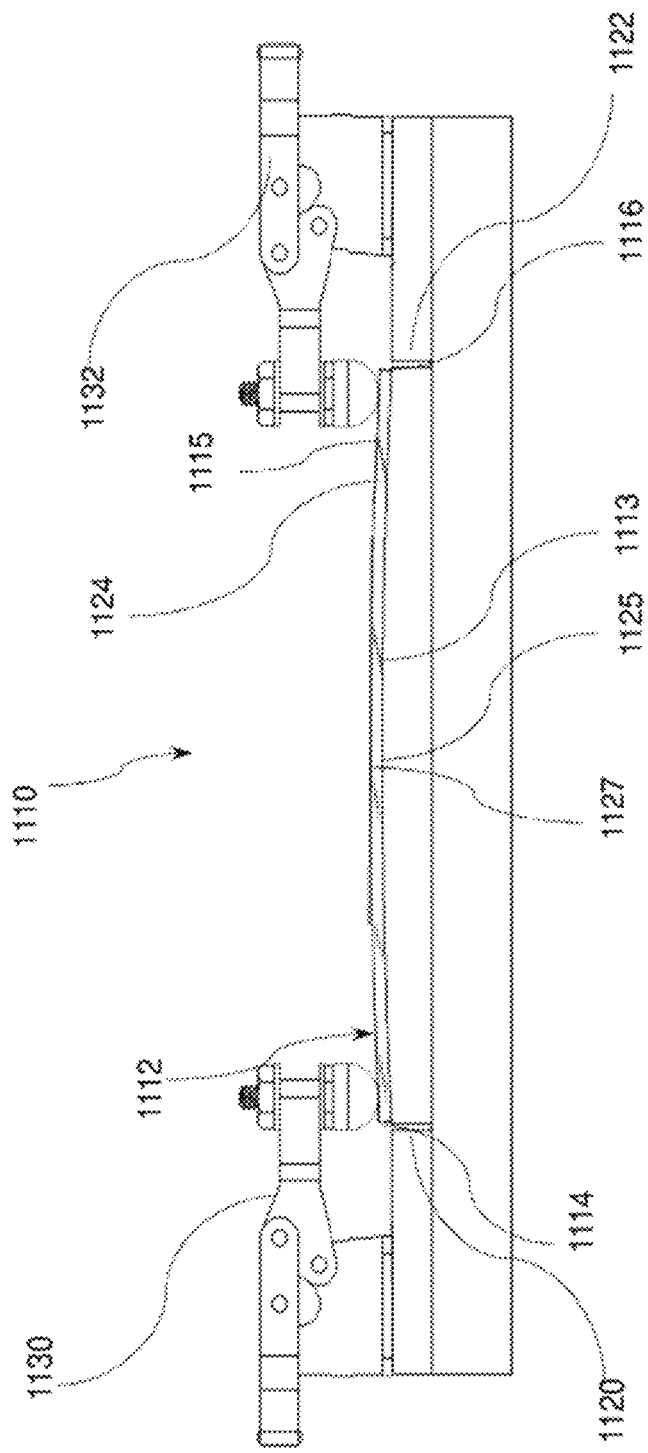
FIG. 15 is a side view of a portion of the testing apparatus shown in FIG. 10.

The apparatus 1100 according to one or more embodiments further includes a first fixture 1130 and a second fixture 1132 to hold the at least two ends 1114, 1116 of the brittle substrate 1112 and to apply a force to bend the brittle substrate 1112 about the curved surface 1124 and to conform the brittle substrate to the radius of curvature. By bending the brittle substrate 1112, the brittle substrate has an apex 1127 conforming to the apex 1125 of the curved surface 1124. In one or more specific embodiments, the curved surface 1124 and the curvature of the brittle substrate 1112 can be a fixed radius or a compound radius. The first fixture 1130 and the second fixture 1132 each are a clamp, and in specific embodiments toggle clamps as shown in FIG. 15. However, other types of fixtures such as bar clamps, C-clamps, or other suitable fixtures to hold the ends of the brittle substrate can be used.

The apparatus 1100 according to one or more embodiments further includes a roughened surface, which can be an abrasive sheet having an abrasive surface to be placed in contact with the outer surface 1115 of the substrate 1112. The abrasive sheet is attached to impact surface 1150 (of impacting object 1140 described below) by double sided tape, with the abrasive surface of the abrasive sheet facing toward the curved surface 1124 on which the substrate 1112 is mounted. In other specific embodiments, the abrasive sheet comprises sandpaper, which may have a grit size in the range of 30 grit to 400 grit, or 100 grit to 300 grit, for example 180 grit. One suitable sandpaper is Indasa Rhynowet® Plus Line P180 grit sandpaper. The sandpaper according to one or more embodiments is cut in 25 mm square pieces, and the sandpaper is flattened if the pieces are bent during the cutting process.

The apparatus 1100 further includes an impacting object 1140 positioned such that when the bob 1104 is released from a position at an angle β greater than zero from the equilibrium position 1105, the curved surface 1124 of the bob 1104 (or a substrate 1112 mounted on the curved surface 1124) contacts the impact surface 1150 (or the abrasive side of an abrasive sheet disposed on the impact surface 1150) of the impacting object 1140. In the embodiment shown, the impacting object 1140 is a L-shaped bracket affixed to platform 1142, and the impacting object 1140 is affixed to the platform 1142 by screw 1144. The impacting object 1140 could also be affixed by any other suitable mechanism such as a bolt, rivet, clamp, etc. The platform 1142 includes a stopper 1146, which permits the apparatus 1100 to be held at the end of work bench 1148. In the embodiment shown, the impacting object 1140 is fixed and does not move when the bob 1104 contacts the impacting object 1140 at impact surface 1150. The impact surface 1150 may be a separate element that is movable in the x-y plane as best seen in FIG. 32 within slot 1152. Alternatively, the impact surface 1150 need not move relative to the impacting object 1140. In one or more embodiments, the bob 1104 and base 1110 are sized and shaped such that when a brittle substrate is affixed to the base 1110 and when the bob 1104 is released from a position at an angle β greater than zero from the equilibrium position 1105, the brittle substrate 1112 is subjected to a bending radius and an impact force that simulate a bending radius of a chemically strengthened cover glass of a mobile phone or tablet device when the mobile phone or tablet device is dropped on a ground surface by a user of the mobile phone or tablet device.

The radius of curvature of the curved surface 1124 on the base 1110 is selected to provide a bending tensile force of 100 MPa when a substrate is bent around the curved surface 1124 such that the tensile force is an externally applied tensile force that results from the stress of bending the substrate. Thus, when the substrate is bent, the tensile force is at the apex 1125 of the brittle substrate. The radius of curvature is in the range of 0.25 m and 1.5 m, for example, in the range of 0.5 m and 1 m.

The first fixture 1130 and second fixture 1132 are spaced apart at a distance of a cover glass length for a mobile phone or a tablet. For example, the first fixture 1130 and second fixture 1132 are spaced apart at a distance in the range of 50 mm to 500 mm.

Another aspect of the disclosure pertains to a method of impact testing a brittle sheet, the method comprising: bending the brittle sheet having a contact surface to provide a bent sheet having a radius of curvature and an apex on the contact surface; and impacting the bent sheet at the apex with an impacting object using a pendulum. In an embodiment, the bent sheet is attached to a pendulum bob. In an embodiment, the bent sheet attached to a pendulum bob is positioned such that the impacting object contacts the apex of the contact surface. The radius of curvature is in a range that simulates a bending radius of a chemically or thermally strengthened cover glass of a mobile phone or tablet device when the mobile phone or tablet device is dropped on a ground surface by a user of the mobile phone or tablet device, wherein the drop event is such that an edge of the device contacts the ground first (as opposed to a face first drop wherein the device generally hits the ground in an orientation such that the contact surface is generally parallel to the ground).

An abrasive sheet is placed on the impact surface 1150 in a position so as to contact the apex of the brittle sheet upon a swinging movement of the arm 1108. The abrasive sheet is secured to the impacting object with double sided tape.

Referring now to FIGS. 10 and 11, specific, non-limiting details of operation of the apparatus include a pointer notch 1200 on the pivot 1106, which can point to various test positions 1202, i.e., positions at which the arm 1108 is positioned at angle β relative to equilibrium position 1105, and positions from which motion of the pendulum is initiated. The pointer notch 1200 enables alignment with a variety of test positions 1202, which may be any suitable number of test positions 1202, for example 1, 2, 3, 4, 5, 6, 7, 8, 9, 10, and so on incrementally up to 50 or more. The apparatus 1100 may further include a lock, which may be in the form of nut 1204 to lock the arm 1108 in the desired rotational orientation about its central longitudinal axis so as to square the base 1110 with the impact surface 1150 of the impacting object 1140.

The apparatus 1100 simulates an actual phone drop event according to one or more embodiments. Incident impact energy, E and average impact force, $\vec{F}_{avg}$ are provided by the equations $$E = mgL\{1 - \cos\beta\}$$

$$|\vec{F}_{avg}| = \frac{|m\vec{v}_f - m\vec{v}_i|}{\Delta t}$$

Where, m=mass of the pendulum 1102 (including swing arm 1108, bob 1104, and base 1110), L=length of arm, g=acceleration of free fall, $\vec{v}_j$ is the initial impact velocity (i.e., the velocity at the point when the glass first contacts the impact surface 1150 of the impacting object 1140), and vi is the final impact velocity (i.e., the velocity at which the glass leaves the impact surface 1150 of the impacting object 1140, or in other words at the point when the glass first separates from the impact surface 1150 of the impacting object 1140), and Δt=contact interaction time (i.e., the time during which the glass is in contact with the impact surface 1150 of the impacting object 1140). The contact interaction time is measured by high-speed video camera by observing the number of frames during which the glass is in contact with the impact surface 1150, and multiplying by the number of frames taken per unit time by the high-speed video camera. The average force equation is useful for samples that have not been broken already, i.e., the samples loaded into the apparatus 1100 prior to the test are ones that have not already been broken. To find the average value of a given set of samples, at least five identical (or nearly identical) samples (i.e., having approximately the same composition and, if strengthened, approximately the same compressive stress and depth of compression or layer) of the glass-based articles are tested, although larger numbers (e.g., 10, 20, 30, etc.) of samples may be subjected to testing to raise the confidence level of the test results. When the mass and length of the swing arm are known, setting the angle β to a selected position, an impact force can be calculated and used to simulate impacts on a device when dropped from a specific height. For example, the average force experienced by a substrate cover glass on a 130 g mobile phone device when dropped from 1 meter height has been calculated to be 800 N. Using the mass, arm length and angle β, this force can be replicated using the apparatus 1100 shown in FIGS. 10-15.

Figure 16:
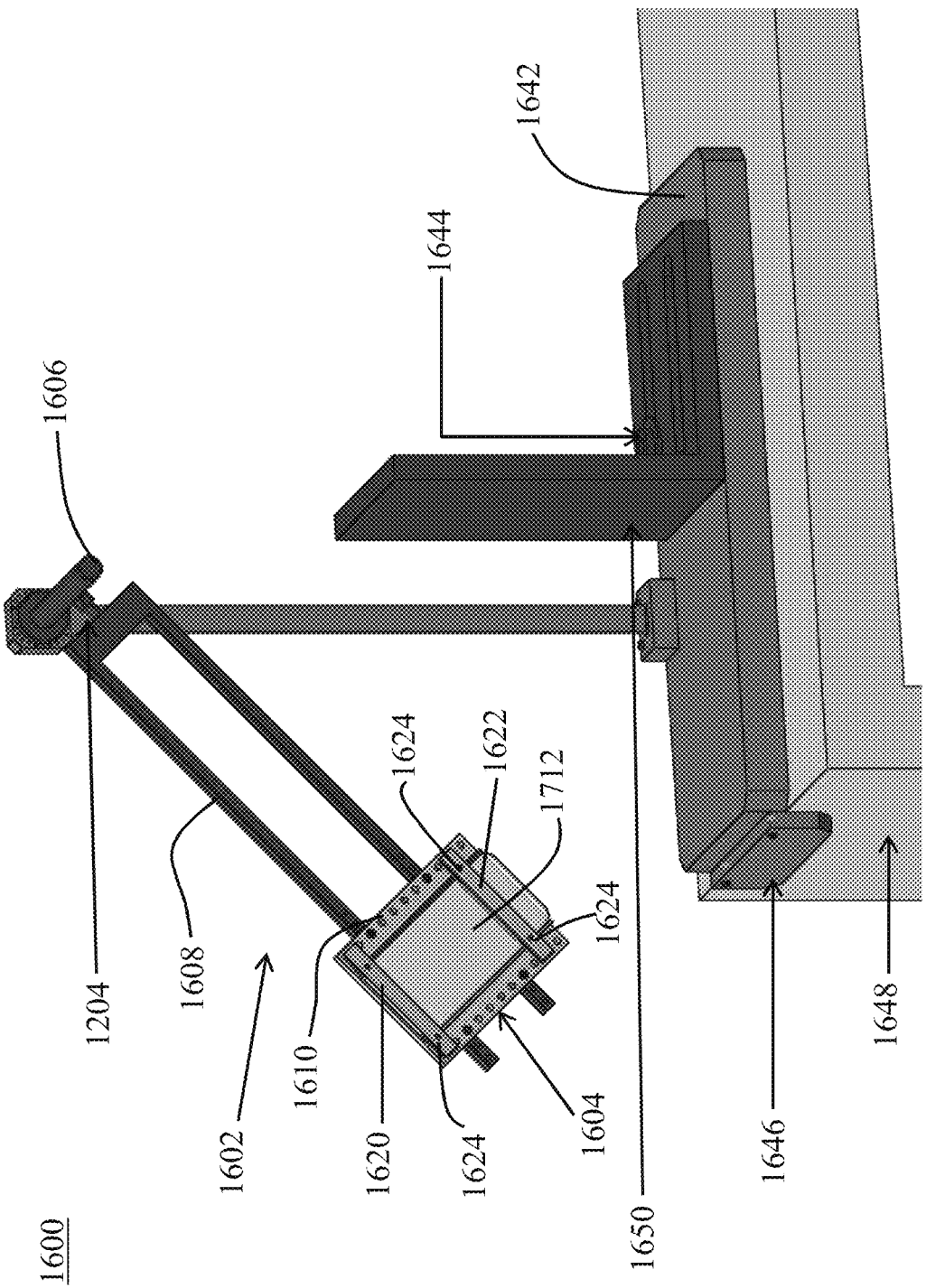
FIG. 16 is a perspective view of another testing apparatus for glass-based articles.
Figure 17:
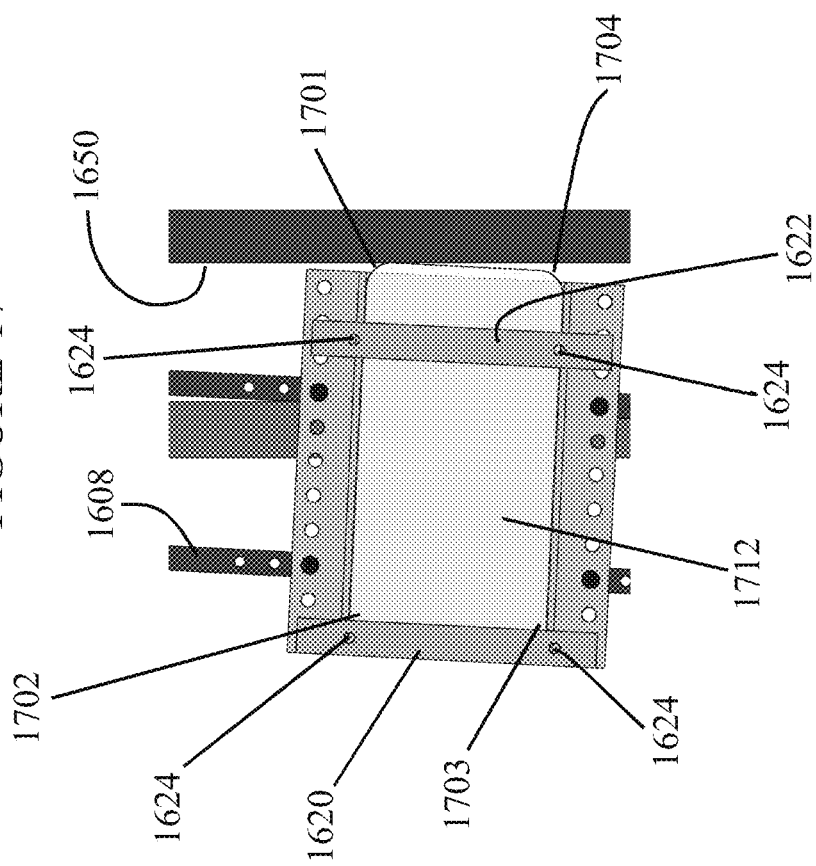
FIG. 17 is a side view of a portion of the testing apparatus of FIG. 16.

Referring now to FIGS. 16 and 17, an embodiment of an apparatus 1600 for carrying out an "Edge Threshold Failure Impact Force Test" on a brittle substrate is shown as comprising a pendulum 1602 including a bob 1604 attached to a pivot 1606. A bob on a pendulum is a weight suspended from the pivot and connected to a pivot by an arm. Thus, the bob 1604 shown in FIG. 16 is connected to the pivot 1606 by arm 1608, which is in the form of two rods as shown. Similarly to the Surface Threshold Impact Force Test, the bob 1604 has an equilibrium position such that the angle β is zero. In other words, the arm 1608 is not in a raised position. Because of the similarity with the Surface Threshold Failure Impact Force Test, only the differences therefrom will be described for the Edge Threshold Failure Impact Force Test.

Bob 1604 includes a planar sample holder 1610, a stopper 1620, and a support 1622. The sample holder 1610 is connected to the arm 1608. The stopper 1620 and support are connected to the sample holder 1610. A sample 1712 is mounted to the sample holder 1610 by abutting one edge of the sample 1712 with the stopper 1620, and then the support 1622 is secured to the sample holder 1610 by screws 1624

(or the like). The sample 1712 may have tape disposed on one face to retain fragments for further analysis of the fracture modes after testing.

The apparatus 1600 further includes an impacting object 1640 positioned such that when the bob 1604 is released from a position at an angle β greater than zero from the equilibrium position, a corner (1701, 1702, 1703, or 1704) of a substrate 1712 mounted on the sample holder 1610 contacts the impact surface 1650 (or the abrasive side of an abrasive sheet disposed on the impact surface 1650) of the impacting object 1640. In the embodiment shown, the impacting object 1640 is a L-shaped bracket affixed to platform 1642, and the impacting object 1640 is affixed to the platform 1642 by screw 1644. The impacting object 1640 could also be affixed by any other suitable mechanism such as a bolt, rivet, clamp, etc. The platform 1642 includes a stopper 1646, which permits the apparatus 1600 to be held at the end of work bench 1648. In the embodiment shown, the impacting object 1640 is fixed and does not move when the bob 1604 contacts the impacting object 1640 at impact surface 1650.

As shown in FIG. 17, the sample 1712 is mounted to the holder 1610 so that only one corner 1701 at a time contacts with the impact surface 1650. The sample 1712 may be reoriented within the holder 1610 so that the remaining corners 1702, 1703 and 1704, in turn, are contacted with the impact surface 1650. During sample testing, only one drop is performed on any one particular corner 1701-1704 so as to avoid accumulation of damage introduction, i.e., so that the impact from one test does not affect a subsequent test. The test is performed by raising the pendulum to a first height (corresponding to a first impact force and energy), and having one corner of the sample 1712 impact with the impacting surface 1650. If no fracture or chip is observed, the sample is reoriented to test a diagonally opposite corner that has not yet previously been tested, and the test is run again at a higher pendulum height (increased impact force and energy). A typical test protocol includes testing the corners 1701 and 1703 of a particular sample, or testing corners 1702 and then 1704 of the sample; the corners on the same end of the sample are not tested (for example, if 1701 is tested, 1704 is not tested. The test is repeated until fracture or chipping are observed. If one sample (two diagonally opposite corners) is tested without damage (fracture or chipping), then a second sample of the same type (composition, ion-exchange conditions, thickness, and edge finish) is tested in a similar manner, and so on with as many samples as necessary to find the pendulum height (impact force and energy) at which fracturing or chipping occurs for that sample type (composition, ion-exchange conditions, thickness, and edge finish).

EXAMPLES

Various embodiments will be further clarified by the following examples.

Example 1

Compositions 1-13 were batched and formed into glass articles. The resulting glass articles were then fictivated to a $10^{11}$ poise temperature and then ion exchanged according to Ion Exchange Conditions A-C for varying durations to form chemically strengthened glass articles having the stress profiles described herein. Ion exchange condition A included immersion in a single bath of 100% $NaNO_3$ having a temperature of 390° C. Ion exchange condition B included immersion in a single bath of 80% $KNO_3$ and 20% $NaNO_3$ having a temperature of 390° C. Ion exchange condition C included immersion in a single bath of 60% $KNO_3$ and 40% $NaNO_3$ having a temperature of 390° C. The properties of the stress profiles and the Knoop Scratch Lateral Cracking Threshold of the chemically strengthened glass articles were then measured. Table 1 includes Compositions 1-13 and properties of the unstrengthened glass articles. Table 2 shows the ion exchange conditions and the properties of the chemically strengthened glass articles formed from Compositions 1-13.

TABLE 1

Compositions 1-13 and properties of the composition and resulting glass articles.

| Analyzed mol % | 1 | 2 | 3 | 4 | 5 |
|---|---|---|---|---|---|
| $Al_2O_3$ | 15.68 | 15.60 | 15.45 | 15.34 | 15.18 |
| $B_2O_3$ | 0 | 0.48 | 0.92 | 1.42 | 1.89 |
| $Li_2O$ | 6.07 | 5.90 | 5.93 | 5.91 | 5.86 |
| $Na_2O$ | 10.93 | 10.65 | 10.30 | 9.92 | 9.57 |
| $P_2O_5$ | 2.44 | 2.44 | 2.47 | 2.47 | 2.46 |
| $SiO_2$ | 63.67 | 63.69 | 63.70 | 63.72 | 63.80 |
| $SnO_2$ | 0.04 | 0.05 | 0.05 | 0.05 | 0.05 |
| ZnO | 1.17 | 1.18 | 1.18 | 1.19 | 1.18 |
| R2O | 17 | 16.55 | 16.23 | 15.82 | 15.44 |
| B2O3 + P2O5 + SiO2 + Al2O3 | 81.79 | 82.22 | 82.54 | 82.94 | 83.33 |
| RO | 1.17 | 1.18 | 1.18 | 1.18 | 1.18 |
| Fulchers A | −2.909 | −3.078 | −3.569 | −3.207 | −3.499 |
| Fulchers B | 7908.7 | 8359.4 | 9634.4 | 8682.8 | 9471.2 |
| Fulchers To | 141.6 | 101.6 | 5.1 | 67.8 | 3 |
| 200 P Temperature (° C.) | 1660 | 1656 | 1646 | 1644 | 1636 |
| 35000 P Temperature (° C.) | 1203 | 1198 | 1193 | 1188 | 1181 |
| 200000 P Temperature (° C.) | 1105 | 1099 | 1091 | 1088 | 1079 |
| Density (g/cm³) | 2.434 | 2.428 | 2.423 | 2.417 | 2.412 |
| CTE (*10⁻⁷/° C.) | 78.7 | 78.1 | 76.7 | 74.8 | 73.1 |
| Strain Pt. (° C.) | 580 | 573 | 566 | 558 | 552 |
| Anneal Pt. (° C.) | 633 | 625 | 618 | 611 | 603 |

TABLE 1-continued

| | | | | | |
|---|---|---|---|---|---|
| Softening Pt. (° C.) | 892.4 | 889.4 | 882.9 | 877.7 | 873.7 |
| Liquidus Temperature (° C.) | 1005 | 990 | 1000 | 1005 | 1000 |
| Liquidus Viscosity (P) | 1782170 | 2145360 | 1302529 | 1141874 | 1001611 |
| Stress Optical Coefficient (nm/mm/MPa) | 3.025 | 3.047 | 3.064 | 3.107 | 3.169 |
| Refractive Index | 1.505 | 1.5045 | 1.504 | 1.5036 | 1.5028 |
| Young's Modulus (GPa) | 76.32 | 75.70 | 75.15 | 74.81 | 74.39 |

Compositions 1-13 and properties of the composition and resulting glass articles.
The density was determined using the buoyancy method of ASTM C693-93(2013).

| Analyzed mol % | 6 | 7 | 8 | 9 | 10 |
|---|---|---|---|---|---|
| $Al_2O_3$ | 15.05 | 14.94 | 14.75 | 14.61 | 14.47 |
| $B_2O_3$ | 2.37 | 2.80 | 3.30 | 3.77 | 4.24 |
| $Li_2O$ | 5.88 | 5.77 | 5.85 | 5.83 | 5.87 |
| $Na_2O$ | 9.24 | 8.83 | 8.56 | 8.16 | 7.80 |
| $P_2O_5$ | 2.47 | 2.43 | 2.45 | 2.45 | 2.44 |
| $SiO_2$ | 63.76 | 64.02 | 63.88 | 63.95 | 63.96 |
| $SnO_2$ | 0.05 | 0.05 | 0.05 | 0.05 | 0.05 |
| ZnO | 1.18 | 1.17 | 1.17 | 1.17 | 1.17 |
| $R_2O$ | 15.12 | 14.60 | 14.41 | 14.00 | 13.67 |
| B2O3 + P2O5 + SiO2 + Al2O3 | 83.65 | 84.19 | 84.37 | 84.78 | 85.11 |
| RO | 1.18 | 1.17 | 1.17 | 1.17 | 1.17 |
| Fulchers A | −3.522 | −3.704 | −3.752 | −3.04 | −3.572 |
| Fulchers B | 9506.6 | 10017.8 | 10106 | 8481.4 | 9626.5 |
| Fulchers To | 4.9 | −37.3 | −46.6 | 53 | −15.2 |
| 200 P Temperature (° C.) | 1637 | 1631 | 1623 | 1641 | 1624 |
| 35000 P Temperature (° C.) | 1183 | 1177 | 1172 | 1171 | 1171 |
| 200000 P Temperature (° C.) | 1082 | 1075 | 1070 | 1070 | 1070 |
| Density (g/cm³) | 2.406 | 2.401 | 2.395 | 2.39 | 2.384 |
| CTE (*10⁻⁷ ppm/° C.) | 72 | 70.5 | 68.9 | 67.4 | 66 |
| Strain Pt. (° C.) | 550 | 541 | 541 | 538 | 534 |
| Anneal Pt. (° C.) | 602 | 593 | 592 | 589 | 586 |
| Softening Pt. (° C.) | 869.8 | 865.2 | 858 | 857.3 | 858.9 |
| Liquidus Temperature (° C.) | 1005 | 1000 | 1000 | 990 | 1000 |
| Liquidus Viscosity (P) | 963051 | 898613 | 801732 | 1027198 | 813520 |
| Stress Optical Coefficient (nm/mm/MPa) | 3.163 | 3.206 | 3.217 | 3.276 | 3.295 |
| Refractive Index | 1.5024 | 1.5021 | 1.5016 | 1.501 | 1.5005 |
| Young's Modulus (GPa) | 73.98 | | 72.81 | 72.46 | 72.05 |

Compositions 1-13 and properties of the composition and resulting glass articles.

| Analyzed mol % | 11 | 12 | 13 |
|---|---|---|---|
| $Al_2O_3$ | 14.31 | 14.14 | 14.05 |
| $B_2O_3$ | 4.76 | 5.22 | 5.65 |
| $Li_2O$ | 5.83 | 5.86 | 5.74 |
| $Na_2O$ | 7.50 | 7.14 | 6.77 |
| $P_2O_5$ | 2.47 | 2.45 | 2.45 |
| $SiO_2$ | 63.89 | 63.96 | 64.10 |
| $SnO_2$ | 0.05 | 0.05 | 0.05 |
| ZnO | 1.19 | 1.17 | 1.18 |
| R2O | 13.34 | 13.00 | 12.51 |
| B2O3 + P2O5 + SiO2 + Al2O3 | 85.43 | 85.78 | 86.26 |
| RO | 1.186 | 1.174 | 1.182 |
| Fulchers A | −3.624 | −3.36 | −3.427 |
| Fulchers B | 9703.8 | 9119.3 | 9380.6 |
| Fulchers To | −25.4 | 9.5 | −23.5 |
| 200 P Temperature (° C.) | 1612 | 1620 | 1614 |
| 35000 P Temperature (° C.) | 1163 | 1163 | 1153 |

TABLE 1-continued

| | | | |
|---|---|---|---|
| 200000 P Temperature (° C.) | 1062 | 1062 | 1051 |
| Density (g/cm³) | 2.378 | 2.373 | 2.367 |
| CTE (*10⁻⁷ ppm/° C.) | 64.2 | 63.4 | 62.6 |
| Strain Pt. (° C.) | 526 | 525 | 522 |
| Anneal Pt. (° C.) | 577 | 575 | 572 |
| Softening Pt. (° C.) | 851.4 | 852.3 | 850.8 |
| Liquidus Temperature (° C.) | 995 | 990 | 985 |
| Liquidus Viscosity (P) | 768776 | 872294 | 749095 |
| Stress Optical Coefficient (nm/mm/MPa) | 3.35 | 3.365 | 3.379 |
| Refractive Index | 1.5 | 1.4995 | 1.4991 |
| Young's Modulus (GPa) | 71.71 | 71.29 | 70.81 |

TABLE 2

Ion exchange conditions, stress profile properties and Knoop Scratch Lateral Cracking Threshold of chemically strengthened glass articles formed from Compositions 1-13.

| | Composition used to form the glass articles | | | | |
|---|---|---|---|---|---|
| | 1 | 2 | 3 | 4 | 5 |
| *Ion Exchange Condition A for 2 hours* | | | | | |
| Thickness t (mm) | 0.79 | 0.71 | 0.79 | 0.73 | 0.74 |
| Maximum CT (MPa) | 66 | 68 | 66 | 64 | 62 |
| DOC as a fraction t | 0.14 | 0.13 | 0.14 | 0.13 | 0.14 |
| Knoop Scratch Lateral Cracking Threshold (N) | | | | | |
| *Ion Exchange Condition A for 7 hours* | | | | | |
| Thickness t (mm) | 0.79 | 0.68 | 0.8 | 0.72 | 0.77 |
| Maximum CT (MPa) | 72 | 64 | 70 | 64 | 68 |
| DOC as a fraction t | 0.13 | 0.13 | 0.15 | 0.13 | 0.16 |
| Knoop Scratch Lateral Cracking Threshold (N) | | | | | |
| *Ion Exchange Condition A for 10 hours* | | | | | |
| Thickness t (mm) | 0.8 | 0.72 | 0.81 | 0.71 | 0.73 |
| Maximum CT (MPa) | 69.31 | 65 | 68 | 66 | 61 |
| DOC as a fraction t | 0.14 | 0.14 | 0.15 | 0.13 | 0.15 |
| Knoop Scratch Lateral Cracking Threshold (N) | | | | | |
| *Ion Exchange Condition B for 2 hours* | | | | | |
| Thickness t (mm) | 0.79 | 0.67 | 0.8 | 0.7 | 0.77 |
| Maximum CT (MPa) | 55.96 | 63 | 57 | 54 | 57 |
| DOC as a fraction t | 0.13 | 0.12 | 0.14 | 0.13 | 0.14 |
| Knoop Scratch Lateral Cracking Threshold (N) | | 6-8 | 6-8 | 10-12 | 12-14 |
| Surface CS (MPa) | 666 | 642 | 641 | 635 | 621 |
| Potassium DOL (micrometers) | 12 | 12 | 12 | 11 | 11 |
| *Ion Exchange Condition B for 7 hours* | | | | | |
| Thickness t (mm) | 0.8 | 0.73 | 0.81 | 0.74 | 0.76 |
| Maximum CT (MPa) | 62.85 | 55 | 59 | 57 | 56 |
| DOC as a fraction t | 0.13 | 0.13 | 0.13 | 0.13 | 0.14 |
| Knoop Scratch Lateral Cracking Threshold (N) | | 4-6 | 4-8 | 4-6 | 6-8 |
| Surface CS (MPa) | 649 | 617 | 621 | 603 | 588 |
| Potassium DOL (micrometers) | 21 | 21 | 21 | 20 | 19 |
| *Ion Exchange Condition B for 10 hours* | | | | | |
| Thickness t (mm) | 0.8 | 0.66 | 0.81 | 0.72 | 0.76 |
| Maximum CT (MPa) | 60.17 | 54 | 63 | 48 | 54 |
| DOC as a fraction t | 0.12 | 0.12 | 0.14 | 0.13 | 0.14 |
| Knoop Scratch Lateral Cracking Threshold (N) | | 4-6 | 4-8 | 4-8 | 8-10 |
| Surface CS (MPa) | | 600 | 618 | 588 | 577 |
| Potassium DOL (micrometers) | | 27 | 26 | 25 | 24 |

| | Composition used to form the glass articles | | | | |
|---|---|---|---|---|---|
| | 6 | 7 | 8 | 9 | 10 |
| *Ion Exchange Condition A for 2 hours* | | | | | |
| Thickness t (mm) | 0.78 | 0.85 | 0.84 | 0.85 | 0.8 |
| Maximum CT (MPa) | 61 | 55 | 53 | 51 | 54 |
| DOC as a fraction t | 0.14 | 0.14 | 0.14 | 0.13 | 0.13 |
| Knoop Scratch Lateral Cracking Threshold (N) | 8-10 | 14-16 | | | |
| *Ion Exchange Condition A for 7 hours* | | | | | |
| Thickness t (mm) | 0.79 | 0.85 | 0.85 | 0.85 | 0.8 |
| Maximum CT (MPa) | 69 | 70 | 67 | 68 | 69 |
| DOC as a fraction t | 0.14 | 0.16 | 0.16 | 0.16 | 0.15 |
| Knoop Scratch Lateral Cracking Threshold (N) | 10-12 | 12-14 | | | |
| *Ion Exchange Condition A for 10 hours* | | | | | |
| Thickness t (mm) | 0.8 | 0.85 | 0.85 | 0.84 | 0.8 |
| Maximum CT (MPa) | 65 | 64 | 66 | 64 | 65 |
| DOC as a fraction t | 0.15 | 0.16 | 0.15 | 0.16 | 0.15 |
| Knoop Scratch Lateral Cracking Threshold (N) | 6-8 | 12-14 | | | |
| *Ion Exchange Condition B for 2 hours* | | | | | |
| Thickness t (mm) | 0.79 | 0.84 | 0.85 | 0.85 | 0.81 |
| Maximum CT (MPa) | 54 | 44 | 48 | 46 | 43 |
| DOC as a fraction t | 0.13 | 0.14 | 0.15 | 0.15 | 0.12 |
| Knoop Scratch Lateral Cracking Threshold (N) | 14-16 | 16-18 | 18-20 | 18-20 | 18-20 |
| Surface CS (MPa) | 613 | 601 | 596 | 576 | 574 |
| Potassium DOL (micrometers) | 10 | 10 | 9 | 10 | 8 |

TABLE 2-continued

Ion exchange conditions, stress profile properties and Knoop Scratch Lateral Cracking Threshold of chemically strengthened glass articles formed from Compositions 1-13.

Ion Exchange Condition B for 7 hours

| | | | | | |
|---|---|---|---|---|---|
| Thickness t (mm) | 0.83 | 0.8 | 0.84 | 0.85 | 0.8 |
| Maximum CT (MPa) | 61 | 56 | 57 | 52 | 56 |
| DOC as a fraction t | 0.14 | 0.16 | 0.15 | 0.16 | 0.15 |
| Knoop Scratch Lateral Cracking Threshold (N) | 10-12 | 14-16 | 16-18 | 18-20 | 22-24 |
| Surface CS (MPa) | 589 | 573 | 567 | 549 | 553 |
| Potassium DOL (micrometers) | 18 | 17 | 17 | 17 | 15 |

Ion Exchange Condition B for 10 hours

| | | | | | |
|---|---|---|---|---|---|
| Thickness t (mm) | 0.8 | 0.85 | | 0.85 | 0.81 |
| Maximum CT (MPa) | 56 | 53 | | 52 | 54 |
| DOC as a fraction t | 0.13 | 0.14 | | 0.15 | 0.13 |
| Knoop Scratch Lateral Cracking Threshold (N) | 8-10 | | | 20-22 | 18-20 |
| Surface CS (MPa) | 581 | | | | |
| Potassium DOL (micrometers) | 23 | | | | |

Ion Exchange Condition B for 4.5 hours

| | |
|---|---|
| Thickness t (mm) | 0.76 |
| Maximum CT (MPa) | 44 |
| DOC as a fraction t | 0.13 |
| Knoop Scratch Lateral Cracking Threshold (N) | 8-10 |
| Surface CS (MPa) | 746 |
| Potassium DOL (micrometers) | 16 |

Ion Exchange Condition B for 5 hours

| | |
|---|---|
| Thickness t (mm) | 0.76 |
| Maximum CT (MPa) | 44 |
| DOC as a fraction t | 0.12 |
| Knoop Scratch Lateral Cracking Threshold (N) | 8-10 |
| Surface CS (MPa) | 742 |
| Potassium DOL (micrometers) | 17 |

Ion Exchange Condition B for 6 hours

| | |
|---|---|
| Thickness t (mm) | 0.77 |
| Maximum CT (MPa) | 44 |
| DOC as a fraction t | 0.12 |
| Knoop Scratch Lateral Cracking Threshold (N) | 8-10 |
| Surface CS (MPa) | 742 |
| Potassium DOL (micrometers) | 18 |

Ion Exchange Condition B for 7 hours

| | |
|---|---|
| Thickness t (mm) | 0.77 |
| Maximum CT (MPa) | 44 |
| DOC as a fraction t | 0.11 |
| Knoop Scratch Lateral Cracking Threshold (N) | 10-12 |
| Surface CS (MPa) | 731 |
| Potassium DOL (micrometers) | 20 |

Ion Exchange Condition C for 4.5 hours

| | |
|---|---|
| Thickness t (mm) | 0.76 |
| Maximum CT (MPa) | 66 |
| DOC as a fraction t | 0.14 |
| Knoop Scratch Lateral Cracking Threshold (N) | 18-20 |
| Surface CS (MPa) | 490 |
| Potassium DOL (micrometers) | 14 |

Ion Exchange Condition C for 5 hours

| | |
|---|---|
| Thickness t (mm) | 0.78 |
| Maximum CT (MPa) | 62 |
| DOC as a fraction t | 0.14 |
| Knoop Scratch Lateral Cracking Threshold (N) | 16-18 |
| Surface CS (MPa) | 491 |
| Potassium DOL (micrometers) | 14 |

Ion Exchange Condition C for 6 hours

| | |
|---|---|
| Thickness t (mm) | 0.76 |
| Maximum CT (MPa) | 63 |
| DOC as a fraction t | 0.13 |
| Knoop Scratch Lateral Cracking Threshold (N) | 16-18 |
| Surface CS (MPa) | 480 |
| Potassium DOL (micrometers) | 14 |

Ion Exchange Condition C for 7 hours

| | |
|---|---|
| Thickness t (mm) | 0.76 |
| Maximum CT (MPa) | 57 |
| DOC as a fraction t | 0.15 |
| Knoop Scratch Lateral Cracking Threshold (N) | 16-18 |
| Surface CS (MPa) | 475 |
| Potassium DOL (micrometers) | 17 |

Composition used to form the glass articles

| | 11 | 12 | 13 |
|---|---|---|---|

Ion Exchange Condition A for 2 hours

| | | | |
|---|---|---|---|
| Thickness t (mm) | 0.8 | 0.88 | 0.87 |
| Maximum CT (MPa) | 54 | 49 | 47 |
| DOC as a fraction t | 0.13 | 0.13 | 0.13 |
| Knoop Scratch Lateral Cracking Threshold (N) | | | |

Ion Exchange Condition A for 7 hours

| | | | |
|---|---|---|---|
| Thickness t (mm) | 0.8 | 0.89 | 0.89 |
| Maximum CT (MPa) | 65 | 66 | 63 |
| DOC as a fraction t | 0.14 | 0.16 | 0.16 |
| Knoop Scratch Lateral Cracking Threshold (N) | | | |

Ion Exchange Condition A for 10 hours

| | | | |
|---|---|---|---|
| Thickness t (mm) | 0.81 | 0.88 | 0.88 |
| Maximum CT (MPa) | 64 | 65 | 64 |
| DOC as a fraction t | 0.15 | 0.17 | 0.16 |
| Knoop Scratch Lateral Cracking Threshold (N) | | | |

Ion Exchange Condition B for 2 hours

| | | | |
|---|---|---|---|
| Thickness t (mm) | 0.8 | 0.88 | 0.88 |
| Maximum CT (MPa) | 47 | 42 | 42 |
| DOC as a fraction t | 0.13 | 0.14 | 0.15 |
| Knoop Scratch Lateral Cracking Threshold (N) | 18-20 | 16-18 | 16-18 |

TABLE 2-continued

Ion exchange conditions, stress profile properties and Knoop
Scratch Lateral Cracking Threshold of chemically strengthened
glass articles formed from Compositions 1-13.

| | | | |
|---|---|---|---|
| Surface CS (MPa) | 544 | 536 | 516 |
| Potassium DOL (micrometers) | 8 | 8 | 8 |
| Ion Exchange Condition B for 7 hours | | | |
| Thickness t (mm) | 0.8 | 0.87 | 0.86 |
| Maximum CT (MPa) | 51 | 53 | 51 |
| DOC as a fraction t | 0.14 | 0.15 | 0.16 |
| Knoop Scratch Lateral Cracking Threshold (N) | 24-26 | 24-26 | 20-22 |
| Surface CS (MPa) | 529 | 513 | 502 |
| Potassium DOL (micrometers) | 16 | 15 | 15 |
| Ion Exchange Condition B for 10 hours | | | |
| Thickness t (mm) | 0.8 | 0.88 | 0.87 |
| Maximum CT (MPa) | 53 | 52 | 50 |
| DOC as a fraction t | 0.13 | 0.16 | 0.15 |
| Knoop Scratch Lateral Cracking Threshold (N) | 22-24 | 22-24 | 22-24 |
| Surface CS (MPa) | | | |
| Potassium DOL (micrometers) | | | |

In Table 2, DOC is reported as a fraction of thickness and can be used to calculate the DOC in absolute terms, in units of mm. For Example, the chemically strengthened glass article formed from Composition 1 has a DOC that is reported as 0.14 of the thickness (i.e., 14% of the thickness or 0.14 t), after being ion exchanged under Ion Exchange Condition A for 2 hours. The absolute DOC value is 0.11 mm, which is calculated by taking 14% of the thickness (0.14*0.79).

In Compositions 1-13, the amount of $B_2O_3$ was increased in increments of about 0.5 mol %, sequentially from Composition 1 through Composition 13. At the same time, the relative amounts of $Al_2O_3$ and $Na_2O$ were reduced in increments of about 0.15 mol % and 0.35 mol %, respectively, sequentially from Composition 1 through Composition 13. These compositional changes reduce the average network connectivity of glass forming species, while maintaining the maximum CT values exhibited by the chemically strengthened glass articles. Moreover, the resulting chemically strengthened glass articles exhibited increasing Knoop Scratch Lateral Cracking Threshold values, as shown in Table 2. For example, the chemically strengthened glass articles formed from Compositions 10-12 exhibited high Knoop Scratch Lateral Cracking Threshold values, while still maintaining deep DOC values (e.g., greater than 0.12 t) and relatively high surface CS values (e.g., greater than 500 MPa). Chemically strengthened glass articles formed from Composition 6 and ion exchanged under Ion Exchange Condition B for 4.5 hours, 5 hours, 6 hours and 7 hours exhibited even higher surface CS values (e.g., greater than 700 MPa), while maintaining deep DOC values (0.12 t or greater).

Figure 18:
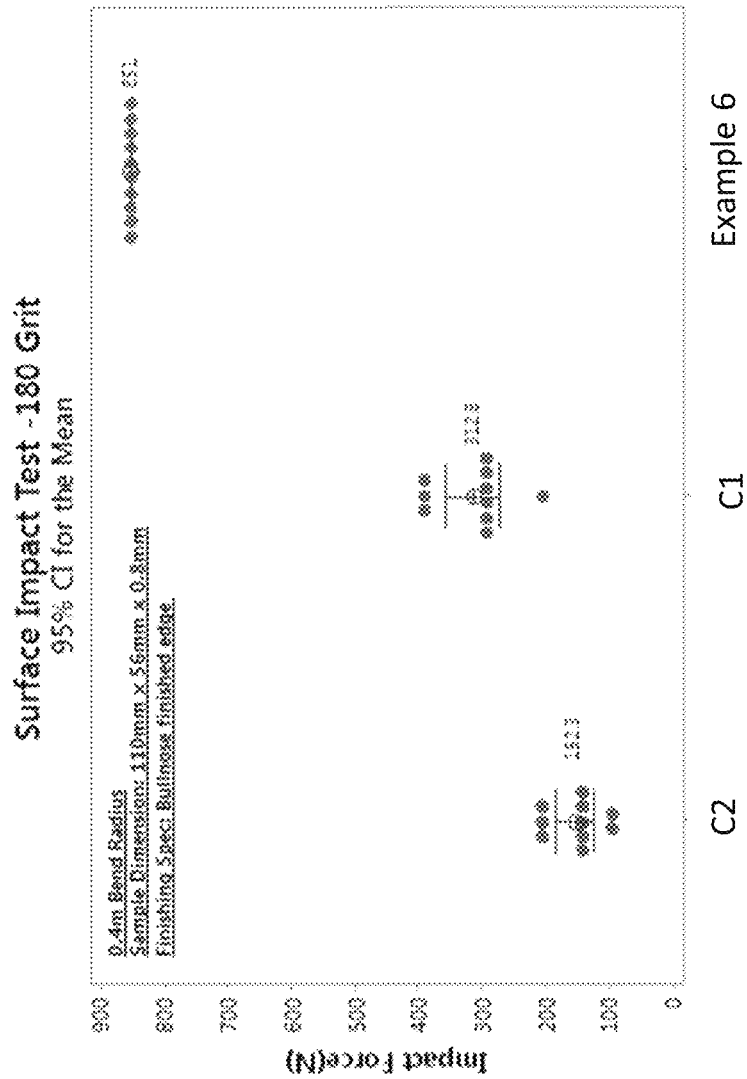
FIG. 18 is a plot of results of surface impact testing for glass samples tested with the apparatus of FIG. 10.
Figure 19:
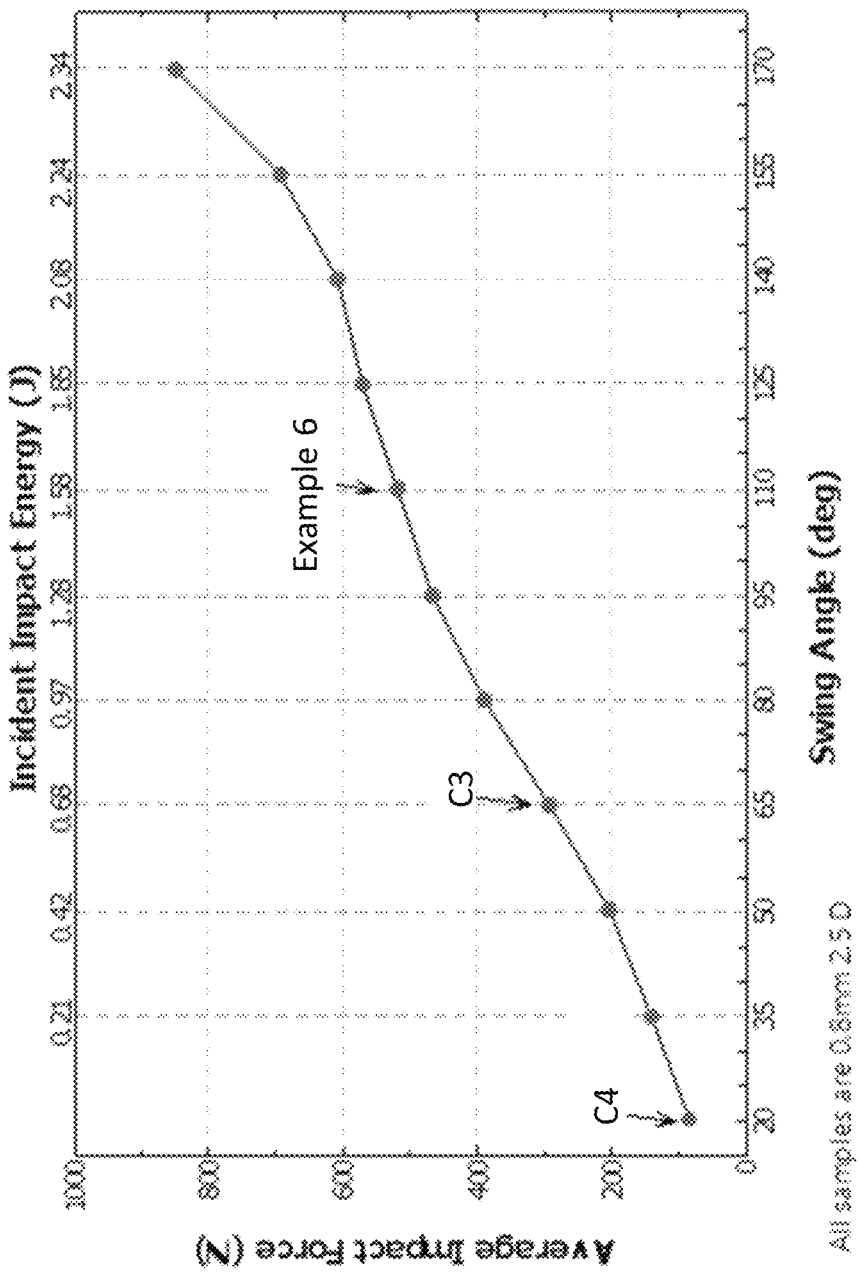
FIG. 19 is a plot of results of edge impact testing of glass samples tested with the apparatus of FIG. 16.

Samples of the composition of Example 6, were subject to ion-exchange including immersion in a bath of 30% $KNO_3$ and 70% $NaNO_3$ having a temperature of 380° C., for 4 hours, followed by immersion in a bath of 93% $KNO_3$ and 7% $NaNO_3$ having a temperature of 380° C., for 40 minutes. The resulting samples had a CS of 777 MPa, a potassium DOL of 8.2 microns, and a CT of 66.4 MPa. These samples were then tested using the Surface Threshold Failure Impact Force test (with 180 grit sandpaper on the impact surface), and using the Edge Threshold Failure Impact Force test (with 30 grit sandpaper on the impact surface). The results are shown in FIGS. 18 and 19 respectively. All samples were 0.8 mm thick, and had a bullnose edge finish. For the Surface Threshold Failure Impact Force test, the samples had a 0.4 meter (m) bend radius imparted thereto, and were 110 mm×56 mm length by width.

As seen in FIG. 18, samples of Example 6 (as noted above) were able to survive an average surface Impact Force of 851 N. Even further, each one of the ten samples tested survived a surface impact force of 851 N; no samples were fractured. Accordingly, the samples of Example 6 were able to survive a maximum, as well as average over at least 10 samples, surface impact force of more than 400 N, for example: 400N to 851N; 450N to 851N; 500N to 851N; 550N to 851N; 600N to 851N; 650N to 851N; 700N to 851N; 750N to 851N; or 800N to 851N.

In comparison, samples of Comparative Example 1 and Comparative Example 2 (C2), of the same size and having the same finish as the samples of Example 6, were tested in the same manner as for the samples of Example 6; the results are shown in FIG. 18. Comparative Example 1 had a nominal composition in mol % of: 57.4% $SiO_2$; 16.1% $Al_2O_3$; 17.1% NaO; 2.8% MgO; and 6.54% $P_2O_5$. Samples of Comparative Example 1 were subject to ion-exchange including immersion in a bath of 60% $KNO_3$ and 40% $NaNO_3$ having a temperature of 450° C., for 7 hours, followed by immersion in a bath of 99.5% $KNO_3$ and 0.5% $NaNO_3$ having a temperature of 390° C., for 12 minutes. The resulting samples had a surface CS of 870 MPa, and a potassium DOL of 74.3 microns. As seen from FIG. 18, the samples of Comparative Example 1 (C1 data) were able to survive a maximum surface impact force of less than 400N, and an average surface impact force for 10 samples of 313N. Comparative Example 2 had a nominal composition consistent with that of Dragontrail® glass as manufactured by Asahi Glass Company (Japan), namely a nominal composition, in mol %, of: 64.8% $SiO_2$; 7.7% $Al_2O_3$; 12.4% NaO; 4% K2O; 10.4% MgO; 0.3% CaO; 0.1% SrO; 0.5% $ZrO_2$; and 0.03% BaO. Samples of Comparative Example 2 had a surface CS of 802 MPa, and a potassium DOL of 24 microns. As seen from FIG. 18, the samples of Comparative Example 2 (C2 data) were able to survive a maximum surface impact force of about 200N, and an average surface impact force for 10 samples of 152N.

For the Edge Threshold Failure Impact Force test, for each sample type, the point marked with an arrow is where the impact force (Newtons, N) and impact energy (Joules, J) brought the onset of glass fracture, as observed visually (i.e., with the naked eye). That is, the arrow marks the spot where the samples did not survive, whereas at the data point immediately to the left of the one marked, all the samples survived. For example, in the case of the samples of Example 6, the arrow marks the data point at a swing angle of 110 degrees, an incident impact energy of 1.58 J, and an average impact force of slightly higher than 500N; at this data point, the samples did not survive, but all samples did survive at a swing angle of 95 degrees, an incident impact energy of 1.28 J, and an average impact force of about 450N. Higher values mean improved performance. All samples were 0.8 mm thick, and had a 2.5 D finish with 0.3 mm at the edge.

As seen in FIG. 19, samples of Example 6 (as noted above) were able to survive an edge impact force of from about 200N to about 450N, for example, from: about 225; to 450N; about 250N to about 450N; about 275N to about 450N; about 300N to about 450N; about 325N to about 450N; about 350N to about 450N; about 400N to about 450N; or about 425N to about 450N. Similarly, the samples of Example 6 (prepared as noted above) were able to survive an edge incident impact energy of from about 0.43 J to about 1.3 J, for example: about 0.44 J to about 1.3 J; about 0.45 J to about 1.3 J; about 0.46 J to about 1.3 J; about 0.47 J to about 1.3 J; about 0.48 J to about 1.3 J; about 0.49 J to about 1.3 J; about 0.5 J to about 1.3 J; about 0.55 J to about 1.3 J; about 0.6 J to about 1.3 J; about 0.65 J to about 1.3 J; about 0.7 J to about 1.3 J; about 0.75 J to about 1.3 J; about 0.8 J to about 1.3 J; about 0.9 J to about 1.3 J; about 1.0 J to about 1.3 J; about 1.1 J to about 1.3 J; about 1.2 J to about 1.3 J.

In comparison, samples of Comparative Example 3 and Comparative Example 4, of the same size and having the same edge finish as the samples of Example 6, were tested in the same manner as for the samples of Example 6; the results are shown in FIG. 19. Comparative Example 3 had a nominal composition in mol % of: 63.6% $SiO_2$; 15.7% $Al_2O_3$; 10.8% NaO; 6.2% $Li_2O$; 1.2% ZnO; and 2.5% $P_2O_5$. Samples of Comparative Example 3 were subject to ion-exchange including immersion in a bath of 75% $KNO_3$ and 25% $NaNO_3$ having a temperature of 380° C., for 3 hours and 36 minutes, followed by immersion in a bath of 91% $KNO_3$ and 9% $NaNO_3$ having a temperature of 380° C., for 30 minutes. The resulting samples had a surface CS of from about 800 MPa to about 830 MPa, a DOC of about 155 microns, a CT of about 70 MPa, a potassium DOL of about 8 microns, and a CS of about 130 MPa at the potassium DOL. As seen from FIG. 19, the samples of Comparative Example 3 (C3 data) were able to survive an edge impact force of about 200N, and an edge incident impact energy of 0.42 J (swing angle of 50 degrees). Comparative Example 4 had a nominal composition, in mol %, of: 64.6% $SiO_2$; 5.1 $B_2O_3$; 14% $Al_2O_3$; 13.8% NaO; and 2.4% MgO. The samples had, after ion-exchange treatment, a surface CS of 870 MPa, a potassium DOL of 46 microns, and a CT of about 57 MPa. As seen from FIG. 19, the samples of Comparative Example 4 (C4 data) were able to survive an edge impact force less than 100N, and an edge incident impact energy of less than 0.1 J (swing angle of less than 20 degrees).

Example 2

Compositions 14-26 were batched and formed into glass articles. The resulting glass articles were then annealed to a $10^{13}$ poise temperature or fictivated to a $10^{11}$ poise temperature (as indicated in Table 4), and then ion exchanged according to Ion Exchange Condition B for varying durations to form chemically strengthened glass articles. The resulting chemically strengthened glass articles exhibited stress profiles having the attributes described herein, which were measured, along with the Knoop Scratch Lateral Cracking Threshold. Table 3 includes Compositions 14-26 and properties of the unstrengthened glass articles. Table 4 shows the ion exchange conditions and the properties of the chemically strengthened glass articles formed from Compositions 14-26.

TABLE 3

| Compositions 14-26 and properties of the composition and resulting glass articles. | | | | | |
|---|---|---|---|---|---|
| Analyzed mol % | 14 | 15 | 16 | 17 | 18 |
| $Al_2O_3$ | 16.68 | 16.57 | 16.43 | 16.26 | 16.13 |
| $B_2O_3$ | | 0.46 | 0.92 | 1.43 | 1.90 |
| CaO | | | | | |
| $Li_2O$ | 9.99 | 9.79 | 9.82 | 9.86 | 9.80 |
| MgO | | | | | |
| $Na_2O$ | 7.32 | 6.94 | 6.59 | 6.26 | 5.91 |
| $P_2O_5$ | 2.45 | 2.48 | 2.47 | 2.49 | 2.48 |
| $SiO_2$ | 63.50 | 63.71 | 63.72 | 63.66 | 63.73 |
| $SnO_2$ | 0.05 | 0.05 | 0.05 | 0.05 | 0.05 |
| SrO | | | | | |
| ZnO | | | | | |
| $ZrO_2$ | | | | | |
| $R_2O$ | 17.31 | 16.73 | 16.40 | 16.12 | 15.71 |
| $B_2O_3 + P_2O_5 + SiO_2 + Al_2O_3$ | 82.64 | 83.21 | 83.55 | 83.83 | 84.24 |
| RO | 0.00 | 0.00 | 0.00 | 0.00 | 0.00 |
| Fulchers A | −3.231 | −3.218 | −2.945 | −3.309 | −3.07 |
| Fulchers B | 8275.1 | 8230 | 7638.3 | 8414 | 7920.8 |
| Fulchers To | 126.8 | 128.3 | 163.7 | 107.5 | 134.1 |
| 200 P Temperature (° C.) | 1623 | 1620 | 1620 | 1607 | 1609 |
| 35000 P Temperature (° C.) | 1191 | 1189 | 1184 | 1179 | 1174 |
| 200000 P Temperature (° C.) | 1097 | 1094 | 1090 | 1085 | 1080 |
| Density (g/cm³) | 2.401 | 2.396 | 2.39 | 2.385 | 2.38 |
| CTE (*$10^{-7}$ ppm/° C.) | 74.5 | 72.7 | 71.7 | 71 | 68.1 |
| Strain Pt. (° C.) | 607 | 595 | 588 | 582 | 574 |
| Anneal Pt. (° C.) | 656 | 647 | 641 | 635 | 627 |
| Softening Pt. (° C.) | 900.7 | 895.7 | 892.4 | 886.8 | 881.7 |
| Liquidus Temperature (° C.) | 1180 | 1150 | 1165 | 1135 | 1160 |
| Liquidus Viscosity (P) | 42277 | 68739 | 48237 | 75824 | 44754 |
| Stress Optical Coefficient (nm/mm/MPa) | 2.937 | 2.999 | 3.019 | 3.066 | 3.093 |
| Refractive Index | 1.5071 | 1.5065 | 1.5061 | 1.5056 | 1.5051 |
| Young's Modulus (GPa) | 78.60 | 78.12 | 77.50 | 76.95 | 76.53 |

TABLE 3-continued

Compositions 14-26 and properties of the composition and resulting glass articles.

| Analyzed mol % | 19 | 20 | 21 | 22 | 23 |
|---|---|---|---|---|---|
| $Al_2O_3$ | 15.98 | 15.85 | 15.65 | 15.52 | 15.35 |
| $B_2O_3$ | 2.36 | 2.80 | 3.28 | 3.77 | 4.21 |
| CaO | | | | | |
| $Li_2O$ | 9.77 | 9.80 | 9.95 | 9.80 | 9.91 |
| MgO | | | | | |
| $Na_2O$ | 5.54 | 5.18 | 4.87 | 4.52 | 4.18 |
| $P_2O_5$ | 2.46 | 2.46 | 2.41 | 2.45 | 2.43 |
| $SiO_2$ | 63.84 | 63.87 | 63.79 | 63.89 | 63.87 |
| $SnO_2$ | 0.05 | 0.05 | 0.05 | 0.05 | 0.05 |
| SrO | | | | | |
| ZnO | | | | | |
| $ZrO_2$ | | | | | |
| $R_2O$ | 15.31 | 14.98 | 14.82 | 14.32 | 14.09 |
| $B_2O_3 + P_2O_5 + SiO_2 + Al_2O_3$ | 84.65 | 84.98 | 85.13 | 85.63 | 85.86 |
| RO | 0.00 | 0.00 | 0.00 | 0.00 | 0.00 |
| Fulchers A | −2.9 | −3.284 | −3.262 | −3.19 | −3.571 |
| Fulchers B | 7553.9 | 8397.4 | 8230.8 | 8186 | 9069.8 |
| Fulchers To | 156.1 | 97.4 | 110.3 | 99.2 | 42.2 |
| 200 P Temperature (° C.) | 1608 | 1601 | 1590 | 1591 | 1587 |
| 35000 P Temperature (° C.) | 1171 | 1170 | 1165 | 1158 | 1160 |
| 200000 P Temperature (° C.) | 1077 | 1076 | 1072 | 1064 | 1064 |
| Density (g/cm³) | 2.374 | 2.369 | 2.364 | 2.358 | 2.352 |
| CTE (*10⁻⁷ ppm/° C.) | 67.9 | 65.4 | 64.5 | 62.9 | 61 |
| Strain Pt. (° C.) | 568 | 565 | 562 | 560 | 557 |
| Anneal Pt. (° C.) | 620 | 618 | 614 | 613 | 609 |
| Softening Pt. (° C.) | 875 | 872.6 | 868 | 867 | 862 |
| Liquidus Temperature (° C.) | 1090 | 1175 | | | |
| Liquidus Viscosity (P) | 154367 | 32262 | | | |
| Stress Optical Coefficient (nm/mm/MPa) | 3.114 | 3.127 | | | |
| Refractive Index | 1.5046 | 1.504 | | | |
| Young's Modulus (GPa) | 76.12 | 75.77 | | | |

| Analyzed mol % | 24 | 25 | 26 |
|---|---|---|---|
| $Al_2O_3$ | 15.26 | 15.08 | 14.97 |
| $B_2O_3$ | 4.66 | 5.15 | 5.58 |
| CaO | | | |
| $Li_2O$ | 9.71 | 9.71 | 9.73 |
| MgO | | | |
| $Na_2O$ | 3.83 | 3.51 | 3.14 |
| $P_2O_5$ | 2.44 | 2.43 | 2.43 |
| $SiO_2$ | 64.05 | 64.08 | 64.10 |
| $SnO_2$ | 0.05 | 0.04 | 0.05 |
| SrO | | | |
| ZnO | | | |
| $ZrO_2$ | | | |
| $R_2O$ | 13.54 | 13.22 | 12.87 |
| $B_2O_3 + P_2O_5 + SiO_2 + Al_2O_3$ | 86.41 | 86.74 | 87.08 |
| RO | 0.00 | 0.00 | 0.00 |
| Fulchers A | −2.899 | −3.196 | −3.182 |
| Fulchers B | 7388.6 | 8200.4 | 8201.5 |
| Fulchers To | 160.9 | 89.6 | 88.7 |
| 200 P Temperature (° C.) | 1582 | 1581 | 1584 |
| 35000 P Temperature (° C.) | 1154 | 1149 | 1150 |
| 200000 P Temperature (° C.) | 1062 | 1055 | 1056 |
| Density (g/cm³) | 2.347 | 2.341 | 2.336 |
| CTE (*10⁻⁷ ppm/° C.) | 59 | 57.8 | 57 |
| Strain Pt. (° C.) | 549 | 554 | 549 |
| Anneal Pt. (° C.) | 601 | 608 | 602 |
| Softening Pt. (° C.) | 855 | 864 | 860 |
| Liquidus | | | |

TABLE 3-continued

Compositions 14-26 and properties of the composition and resulting glass articles.

Temperature (° C.)
Liquidus
Viscosity (P)
Stress Optical Coefficient (nm/mm/MPa)
Refractive Index
Young's Modulus (GPa)

TABLE 4

Ion exchange conditions, stress profile properties and Knoop Scratch Lateral Cracking Threshold of chemically strengthened glass articles formed from Compositions 14-26.

| | Composition used to form the glass articles | | | | |
|---|---|---|---|---|---|
| | 14 | 15 | 16 | 17 | 18 |
| *Annealed, ion exchanged under Ion Exchange Condition B for 2 hours* | | | | | |
| Thickness t (mm) | 0.83 | 1.02 | 1.01 | 0.95 | 0.95 |
| Maximum CT (MPa) | 78 | 69 | 69 | 68 | 66 |
| DOC as a fraction t | 0.16 | 0.19 | 0.17 | 0.16 | 0.17 |
| Knoop Scratch Lateral Cracking Threshold (N) | 4-6 | 8-12 | 8-10 | 14-16 | 16-18 |
| Surface CS (MPa) | 882 | 880 | 868 | 840 | 828 |
| Potassium DOL (micrometers) | 10 | 10 | 9 | 9 | 9 |
| *Fictivated, ion exchanged under Ion Exchange Condition B for 2 hours* | | | | | |
| Thickness t (mm) | 0.78 | 1.01 | 1.01 | 0.95 | 0.93 |
| Maximum CT (MPa) | 79 | 70 | 66 | 64 | 63 |
| DOC as a fraction t | 0.15 | 0.17 | 0.18 | 0.17 | 0.17 |
| Knoop Scratch Lateral Cracking Threshold (N) | 12-14 | 4-6 | 16-18 | 18-20 | 16-18 |
| Surface CS (MPa) | 892 | 887 | 839 | 814 | 815 |
| Potassium DOL (micrometers) | 10 | 10 | 11 | 11 | 9 |
| *Annealed, ion exchanged under Ion Exchange Condition B for 7 hours* | | | | | |
| Thickness t (mm) | 0.83 | 1.01 | 1.01 | 0.96 | 0.95 |
| Maximum CT (MPa) | 57 | 68 | 75 | 72 | 70 |
| DOC as a fraction t | 0.15 | 0.17 | 0.18 | 0.17 | 0.18 |
| Knoop Scratch Lateral Cracking Threshold (N) | 4-6 | 4-6 | 6-8 | 4-6 | 4-6 |
| Surface CS (MPa) | 836 | 847 | 841 | 809 | 793 |
| Potassium DOL (micrometers) | 21 | 19 | 18 | 18 | 17 |
| *Fictivated, ion exchanged under Ion Exchange Condition B for 7 hours* | | | | | |
| Thickness t (mm) | 0.82 | 1.01 | 1 | 0.95 | 0.93 |
| Maximum CT (MPa) | 64 | 74 | 57 | 59 | 62 |
| DOC as a fraction t | 0.15 | 0.2 | 0.18 | 0.18 | 0.17 |
| Knoop Scratch Lateral Cracking Threshold (N) | 4-6 | 4-6 | 6-8 | 6-8 | 8-10 |
| Surface CS (MPa) | 848 | 842 | 800 | 771 | 774 |
| Potassium DOL (micrometers) | 20 | 19 | 21 | 20 | 18 |
| *Annealed, ion exchanged under Ion Exchange Condition B for 10 hours* | | | | | |
| Thickness t (mm) | 0.79 | 1.02 | 1.01 | 0.96 | 0.94 |
| Maximum CT (MPa) | 53 | 65 | 68 | 60 | 63 |
| DOC as a fraction t | 0.11 | 0.16 | 0.16 | 0.17 | 0.17 |
| Knoop Scratch Lateral Cracking Threshold (N) | 4-6 | 4-6 | 4-6 | 6-8 | 8-10 |
| Surface CS (MPa) | 807 | 823 | 816 | 787 | 772 |
| Potassium DOL (micrometers) | 25 | 23 | 22 | 22 | 20 |
| *Fictivated, ion exchanged under Ion Exchange Condition B for 10 hours* | | | | | |
| Thickness t (mm) | 0.84 | 1.04 | 1.03 | 0.96 | 0.94 |
| Maximum CT (MPa) | 57 | 61 | 51 | 52 | 52 |
| DOC as a fraction t | 0.15 | 0.17 | 0.16 | 0.14 | 0.16 |
| Knoop Scratch Lateral Cracking Threshold (N) | 2-4 | 4-6 | 6-8 | 8-10 | 6-8 |
| Surface CS (MPa) | 826 | 821 | 762 | 741 | 736 |
| Potassium DOL (micrometers) | 24 | 24 | 26 | 24 | 23 |

| | Composition used to form the glass articles | |
|---|---|---|
| | 19 | 20 |
| *Annealed, ion exchanged under Ion Exchange Condition B for 2 hours* | | |
| Thickness t (mm) | 0.95 | 0.96 |
| Maximum CT (MPa) | 66 | 63 |
| DOC as a fraction t | 0.16 | 0.16 |
| Knoop Scratch Lateral Cracking Threshold (N) | 20-22 | 22-24 |
| Surface CS (MPa) | 820 | 810 |
| Potassium DOL (micrometers) | 8 | 8 |
| *Fictivated, ion exchanged under Ion Exchange Condition B for 2 hours* | | |
| Thickness t (mm) | 0.92 | 0.95 |
| Maximum CT (MPa) | 62 | 58 |
| DOC as a fraction t | 0.17 | 0.17 |
| Knoop Scratch Lateral Cracking Threshold (N) | 24-26 | 18-20 |
| Surface CS (MPa) | 780 | 790 |
| Potassium DOL (micrometers) | 9 | 10 |
| *Annealed, ion exchanged under Ion Exchange Condition B for 7 hours* | | |
| Thickness t (mm) | 0.92 | 0.94 |
| Maximum CT (MPa) | 75 | 71 |
| DOC as a fraction t | 0.17 | 0.18 |
| Knoop Scratch Lateral Cracking Threshold (N) | 8-10 | 6-8 |
| Surface CS (MPa) | 783 | 779 |
| Potassium DOL (micrometers) | 16 | 16 |

TABLE 4-continued

Ion exchange conditions, stress profile properties and Knoop Scratch Lateral Cracking Threshold of chemically strengthened glass articles formed from Compositions 14-26.

| | Fictivated, ion exchanged under Ion Exchange Condition B for 7 hours | |
|---|---|---|
| Thickness t (mm) | 0.92 | 0.94 |
| Maximum CT (MPa) | 60 | 55 |
| DOC as a fraction t | 0.17 | 0.16 |
| Knoop Scratch Lateral Cracking Threshold (N) | 16-18 | 12-14 |
| Surface CS (MPa) | 738 | 745 |
| Potassium DOL (micrometers) | 18 | 18 |
| | Annealed, ion exchanged under Ion Exchange Condition B for 10 hours | |
| Thickness t (mm) | 0.96 | 0.95 |
| Maximum CT (MPa) | 64 | 63 |
| DOC as a fraction t | 0.18 | 0.18 |
| Knoop Scratch Lateral Cracking Threshold (N) | 6-8 | 6-8 |
| Surface CS (MPa) | 757 | 755 |
| Potassium DOL (micrometers) | 19 | 19 |
| | Fictivated, ion exchanged under Ion Exchange Condition B for 10 hours | |
| Thickness t (mm) | 0.96 | 0.93 |
| Maximum CT (MPa) | 51 | 48 |
| DOC as a fraction t | 0.16 | 0.15 |
| Knoop Scratch Lateral Cracking Threshold (N) | 6-8 | 14-16 |
| Surface CS (MPa) | 710 | 706 |
| Potassium DOL (micrometers) | 22 | 21 |

In Table 4, DOC is reported as a fraction of thickness and can be used to calculate the DOC in absolute terms, in units of mm, as described above with respect to Table 2.

Compositions 14-26 generally have different $Al_2O_3$, $Li_2O$, and $Na_2O$ values than Compositions 1-13. In Compositions 14-26, the amount of $B_2O_3$ was increased in increments of about 0.5 mol %, sequentially from Composition 14 through Composition 26. At the same time, the relative amounts of $Al_2O_3$ and $Na_2O$ were reduced in increments of about 0.15 mol % and 0.35 mol %, respectively, sequentially from Composition 14 to Composition 26. These compositional changes reduce the average network connectively of glass forming species, while maintaining the maximum CT values exhibited by the chemically strengthened glass articles. Moreover, the resulting chemically strengthened glass articles exhibited increasing Knoop Scratch Lateral Cracking Threshold values, as shown in Table 4. For example, the chemically strengthened glass articles formed from Compositions 16-20 exhibited high Knoop Scratch Lateral Cracking Threshold values, while still maintaining deep DOC values (e.g., greater than 0.15 t) and relatively high surface CS values (e.g., greater than 700 MPa).

Example 3

Compositions 27-33 were batched and formed into glass articles. The resulting glass articles were then fictivated to a $10^{11}$ poise temperature and then ion exchanged according to Ion Exchange Condition A for varying durations to form chemically strengthened glass articles. The resulting chemically strengthened glass articles exhibited stress profiles having the attributes described herein, which were measured, along with the Knoop Scratch Lateral Cracking Threshold. Table 5 includes Compositions 27-33 and properties of the unstrengthened glass articles. Table 6 shows the ion exchange conditions and the properties of the chemically strengthened glass articles formed from Compositions 27-33.

TABLE 5

Compositions 27-33 and properties of the composition and resulting glass articles.

| Analyzed mol % | 27 | 28 | 29 | 30 |
|---|---|---|---|---|
| $Al_2O_3$ | 16.27 | 15.73 | 16.69 | 16.72 |
| $B_2O_3$ | 1.87 | 1.89 | 0.97 | 1.92 |
| CaO | | | | |
| $Li_2O$ | 7.40 | 7.40 | 7.40 | 7.40 |
| MgO | | | | |
| $Na_2O$ | 7.24 | 7.74 | 8.75 | 7.75 |
| $P_2O_5$ | 2.39 | 2.45 | 2.46 | 2.49 |
| $SiO_2$ | 63.83 | 63.78 | 63.68 | 63.68 |
| $SnO_2$ | 0.04 | 0.04 | 0.05 | 0.05 |
| SrO | | | | |
| ZnO | 0.96 | 0.98 | | |
| $ZrO_2$ | | | | |
| $R_2O$ | 14.64 | 15.14 | 16.15 | 15.15 |
| $B_2O_3 + P_2O_5 + SiO2 + Al2O3$ | 84.36 | 83.84 | 83.80 | 84.80 |
| RO | 0.96 | 0.98 | 0.00 | 0.00 |
| Fulchers A | −3.55 | −3.551 | −3.41 | −3.734 |
| Fulchers B | 9133.7 | 9324.6 | 8761.6 | 9373.1 |
| Fulchers To | 62.8 | 35 | 109.4 | 74 |
| 200 P Temperature (° C.) | 1624 | 1628 | 1644 | 1627 |
| 35000 P Temperature (° C.) | 1191 | 1187 | 1211 | 1206 |
| 200000 P Temperature (° C.) | 1095 | 1088 | 1115 | 1111 |
| Density (g/cm³) | 2.402 | 2.403 | 2.396 | 2.385 |
| CTE (*$10^{-7}$ ppm/° C.) | 66 | 69 | 73.9 | 69.2 |
| Strain Pt. (° C.) | 571 | 561 | 595 | 586 |

TABLE 5-continued

Compositions 27-33 and properties of the composition and resulting glass articles.

| | 27 | 28 | 29 | 30 |
|---|---|---|---|---|
| Anneal Pt. (° C.) | 626 | 615 | 650 | 642 |
| Softening Pt. (° C.) | 892.7 | 880.1 | 910.1 | 910.6 |
| Liquidus Temperature (° C.) | 1100 | 1085 | 1085 | 1085 |
| Liquidus Viscosity (P) | 180349 | 213585 | 372160 | 344443 |
| Stress Optical Coefficient (nm/mm/MPa) | 31.42 | 31.09 | 30.76 | 31.42 |
| Refractive Index | 1.5045 | 1.5044 | 1.5031 | 1.5025 |
| Young's Modulus (GPa) | 76.26 | 75.70 | 76.19 | 75.50 |

| Analyzed mol % | 31 | 32 | 33 |
|---|---|---|---|
| $Al_2O_3$ | 14.53 | 14.7 | 12.8 |
| $B_2O_3$ | 2.35 | 2.38 | 4.84 |
| CaO | | | |
| $Li_2O$ | 5.95 | 9.93 | 9.9 |
| MgO | | | |
| $Na_2O$ | 8.95 | 5.31 | 3.31 |
| $P_2O_5$ | 2.44 | 2.48 | 2.46 |
| $SiO_2$ | 65.73 | 65.15 | 66.64 |
| $SnO_2$ | 0.05 | 0.05 | 0.05 |
| SrO | | | |
| ZnO | | | |
| $ZrO_2$ | | | |
| R2O | 14.90 | 15.24 | 13.21 |
| B2O3 + P2O5 + SiO2 + Al2O3 | 85.05 | 84.71 | 86.74 |
| RO | 0.00 | 0.00 | 0.00 |
| Fulchers A | −3.314 | −3.569 | −3.078 |
| Fulchers B | 9123.1 | 9483.3 | 8596.2 |
| Fulchers To | 25.9 | 7.6 | 28.7 |
| 200 P Temperature (° C.) | 1651 | 1623 | 1627 |
| 35000 P Temperature (° C.) | 1187 | 1176 | 1157 |
| 200000 P Temperature (° C.) | 1085 | 1077 | 1055 |
| Density (g/cm$^3$) | 2.402 | 2.367 | 2.332 |
| CTE ($*10^{-7}$ ppm/° C.) | 71 | 67.2 | 58.9 |
| Strain Pt. (° C.) | 547 | 555 | 524 |
| Anneal Pt. (° C.) | 599 | 608 | 577 |
| Softening Pt. (° C.) | 869 | 864.7 | 837.7 |
| Liquidus Temperature (° C.) | | | |
| Liquidus Viscosity (P) | | | |
| Stress Optical Coefficient (nm/mm/MPa) | 3.235 | 3.143 | 3.295 |
| Refractive Index | 1.5015 | 1.503 | 1.4987 |
| Young's Modulus (GPa) | 73.5 | 75.84 | 72.67 |

TABLE 6

Ion exchange conditions, stress profile properties and Knoop Scratch Lateral Cracking Threshold of chemically strengthened glass articles formed from Compositions 27-33.

| | Composition used to form the glass articles | | | |
|---|---|---|---|---|
| | 27 | 28 | 29 | 30 |
| | Ion Exchange Condition A for 4 hours | | | |
| Thickness t (mm) | 1.05 | 1.09 | 1.07 | 1.04 |
| Maximum CT (MPa) | 75 | 71 | 79 | 82 |
| DOC as a fraction t | 0.17 | 0.17 | 0.18 | 0.17 |
| Knoop Scratch Lateral Cracking Threshold (N) | 16-18 | | | |
| | Ion Exchange Condition A for 6 hours | | | |
| Thickness t (mm) | 1.07 | 1.11 | 1.09 | 1.04 |
| Maximum CT (MPa) | 90 | 90 | 88 | 92 |
| DOC as a fraction t | 0.2 | 0.19 | 0.2 | 0.19 |
| Knoop Scratch Lateral Cracking Threshold (N) | | | | |

TABLE 6-continued

Ion exchange conditions, stress profile properties and Knoop Scratch Lateral Cracking Threshold of chemically strengthened glass articles formed from Compositions 27-33.

| | Composition used to form the glass articles | | | |
|---|---|---|---|---|
| | 27 | 28 | 29 | 30 |
| | Ion Exchange Condition A for 8 hours | | | |
| Thickness t (mm) | 1.06 | 1.09 | 1.07 | 1.04 |
| Maximum CT (MPa) | 87 | 86 | 91 | 86 |
| DOC as a fraction t | 0.19 | 0.19 | 0.18 | 0.19 |
| Knoop Scratch Lateral Cracking Threshold (N) | 18-20 | | | |

In Table 6, DOC is reported as a fraction of thickness and can be used to calculate the DOC in absolute terms, in units of mm, as described above with respect to Table 2.

Compositions 27-33 generally have different $Al_2O_3$, $Li_2O$, and $Na_2O$ values than Compositions 1-13. In Compositions 14-26, the amount of $Li_2O$ was increased, while the amount of $Na_2O$ was decreased, sequentially from Composition 27 through Composition 33. The replacement of $Na_2O$ with $Li_2O$ in the compositions and the subsequent ion exchange by immersion in a 100% $NaNO_3$ molten salt bath resulted in chemically strengthened glass articles with increasing maximum CT, while maintaining deep DOC approaching and in at least one instance achieving 0.2 t.

It will be apparent to those skilled in the art that various modifications and variations can be made without departing from the spirit or scope of the invention. For example, the various features can be combined according to the following exemplary embodiments.

Embodiment 1. A glass article comprising a composition, the composition comprising:
  $SiO_2$ in an amount in the range from about 60 mol % to about 80 mol %;
  Al2O3 in an amount greater than or equal to about 13.5 mol %;
  $Li_2O$ in an amount in the range from about 5 mol % to about 11 mol %;
  $P_2O_5$ in an amount in the range from about 1 mol % to about 5 mol %; greater than about 0.9 mol % $B_2O_3$; and
  $Na_2O$ in an amount in the range from about 0.5 mol % to about 12 mol %.

Embodiment 2. A glass article comprising a composition, the composition comprising:
  $SiO_2$ in an amount in the range from about 60 mol % to about 80 mol %;
  Al2O3 in an amount greater than or equal to about 10 mol %;
  $Li_2O$ in an amount in the range from about 4 mol % to about 11 mol %;
  $B_2O_3$ in an amount in the range of from about 0.9 mol % to about 7.5 mol %;
  the total amount of $B_2O_3$, $P_2O_5$, $SiO_2$ and $Al_2O_3$ is about 80 mol % or greater; and
  the ratio of $Li_2O$ to the total amount of $B_2O_3$, $P_2O_5$, $SiO_2$ and $Al_2O_3$ is less than 0.074.

Embodiment 3. The glass article of embodiment 2, wherein the amount of $SiO_2$ is in the range from about 65 mol % to about 80 mol %.

Embodiment 4. The glass article of embodiment 2 or 3, further comprising: a non-zero amount of $P_2O_5$; and $K_2O$ in an amount of less than 1.0 mol %.

Embodiment 5. The glass article of any one of embodiments 1-4, wherein the amount of $B_2O_3$ is in an amount in the range from about 0.9 mol % to about 6.5 mol %.

Embodiment 6. The glass article of any one of embodiments 1-5, wherein the amount of $Na_2O$ is in an amount in the range from about 3 mol % to about 11 mol %.

Embodiment 7. The glass article of any one of the preceding embodiments, wherein the composition comprises $Li_2O$ in an amount in the range from about 5 mol % to about 11 mol %.

Embodiment 8. The glass article of any one of the preceding embodiments, wherein the composition further comprises RO, wherein RO comprises any one or more of MgO, CaO, SrO, BaO and ZnO.

Embodiment 9. The glass article of embodiment 8, wherein the total amount of RO is in the range of at least one of: from about 0.05 mol % to about 4 mol %; and from about 0.05 mol % to about 2 mol %.

Embodiment 10. The glass article of any one of the preceding embodiments, wherein the composition is substantially free of $K_2O$.

Embodiment 11. The glass article of any one of embodiments 1 or 5-10, the total amount of $B_2O_3$, $P_2O_5$, $SiO_2$ and $Al_2O_3$ is about 80 mol % or greater.

Embodiment 12. The glass article of any one of the preceding embodiments, wherein the composition further comprises, in mol %:
  $Al_2O_3$ in the range from about 13.5 mol % to about 18 mol %; and
  ZnO in the range from about 0.5 mol % to about 3 mol %.

Embodiment 13. The glass article of any one of the preceding embodiments, wherein the amount of $Na_2O$ is greater than the amount of $Li_2O$.

Embodiment 14. The glass article of any one of the preceding embodiments, wherein the amount of $P_2O_5$ is less than about 3 mol %.

Embodiment 15. The glass article of any one of the preceding embodiments, wherein the composition further comprises $SnO_2$.

Embodiment 16. The glass article of any one of the preceding embodiments, wherein the composition further comprises a liquidus viscosity of about 300 kilopoise or less.

Embodiment 17. The glass article of any one of embodiments 1-16, wherein the composition further comprises a liquidus viscosity greater than about 300 kilopoise.

Embodiment 18. The glass article of any one of the preceding embodiments, wherein the composition further comprises less than about 1.5 mol % $ZrO_2$.

Embodiment 19. A glass article comprising a composition, the composition comprising:
  $SiO_2$ in an amount in the range from about 60 mol % to about 80 mol %;
  $Al_2O_3$ in an amount greater than or equal to 10 mol %;
  $Li_2O$ in an amount in the range from about 5 mol % to about 10 mol %;
  $P_2O_5$ in an amount in the range from about 1 mol % to about 5 mol % greater than about 0.9 mol % $B_2O_3$; and
  $Na_2O$ in an amount in the range from about 0.5 mol % to about 12 mol %.

Embodiment 20. The glass article of embodiment 19, wherein the composition further comprises a total amount of $R_2O$ in the range from about 12 mol % to about 20 mol %.

Embodiment 21. The glass article of any one of embodiments 19-20, wherein the amount of $B_2O_3$ is in the range from about 1 mol % to about 6.5 mol %.

Embodiment 22. The glass article of any one of embodiments 19-21, wherein the amount of $Na_2O$ is the range from about 3 mol % to about 11 mol %.

Embodiment 23. The glass article of any one of embodiments 19-22, wherein the amount of $Li_2O$ is in the range from about 5 mol % to about 7 mol %.

Embodiment 24. The glass article of any one of embodiments 19-23, wherein the composition further comprises RO, wherein RO comprises any one or more of MgO, CaO, SrO, BaO and ZnO.

Embodiment 25. The glass article of embodiment 24, wherein the total amount of RO is in the range from about 0.05 mol % to about 4 mol %.

Embodiment 26. The glass article of any one of embodiments 19-25, wherein the composition is substantially free of $K_2O$ and comprises less than about 1.5 mol % $ZrO_2$.

Embodiment 27. The glass article of any one of embodiments 19-26, wherein the total amount of $B_2O_3$, $P_2O_5$, $SiO_2$ and $Al_2O_3$ is greater than about 80 mol %.

Embodiment 28. The glass article of any one of embodiments 19-27, wherein the composition further comprises:
$Al_2O_3$ in the range from about 10 mol % to about 16 mol %; and
ZnO in the range from about 0.5 mol % to about 3 mol %.

Embodiment 29. The glass article of any one of embodiments 19-28, wherein the amount of $Na_2O$ is greater than the amount of $Li_2O$.

Embodiment 30. The glass article of any one of embodiments 19-29, wherein the amount of $P_2O_5$ is less than about 3 mol %.

Embodiment 31. The glass article of any one of embodiments 19-30, wherein the composition further comprises $SnO_2$.

Embodiment 32. The glass article of any one of embodiments 19-31, wherein the composition further comprises a liquidus viscosity of about 300 kilopoise or less.

Embodiment 33. The glass article of any one of embodiments 19-32, wherein the composition further comprises a liquidus viscosity greater than about 300 kilopoise.

Embodiment 34. A chemically strengthened glass article comprising:
a first major surface and an opposing second major surface defining a thickness t in the range from about 0.3 mm to about 1.5 mm,
a composition comprising $Li_2O$; $P_2O_5$; greater than about 0.9 mol % $B_2O_3$; $Al_2O_3$ in an amount greater than or equal to 13.5 mol %; and from about 0.5 mol % to about 12 mol % $Na_2O$,
a compressive stress (CS) layer extending from the first major surface to a depth of compression (DOC) greater than about 0.12 t,
wherein the CS layer comprises a maximum stress of about 200 MPa or greater, and
wherein the glass article comprises a Knoop Lateral Cracking Scratch Threshold greater than about 6 N, as measured on either one of the first major surface and the second major surface.

Embodiment 35. A chemically strengthened glass article comprising:
a first major surface and an opposing second major surface defining a thickness t in the range from about 0.3 mm to about 1.5 mm,
a composition comprising: $SiO_2$ in an amount in the range from about 60 mol % to about 80 mol %; Al2O3 in an amount greater than or equal to about 10 mol %; $Li_2O$ in an amount in the range from about 4 mol % to about 11 mol %; $B_2O_3$ in an amount in the range of from about 0.9 mol % to about 7.5 mol %; the total amount of $B_2O_3$, $P_2O_5$, $SiO_2$ and $Al_2O_3$ is about 80 mol % or greater; and the ratio of $Li_2O$ to the total amount of $B_2O_3$, $P_2O_5$, $SiO_2$ and $Al_2O_3$ is less than 0.074;
a compressive stress (CS) layer extending from the first major surface to a depth of compression (DOC) greater than about 0.12 t,
wherein the CS layer comprises a maximum stress of about 200 MPa or greater, and
wherein the glass article comprises a Knoop Lateral Cracking Scratch Threshold greater than about 6 N, as measured on either one of the first major surface and the second major surface.

Embodiment 36. The chemically strengthened glass article of embodiment 35, wherein the amount of $SiO_2$ is in the range from about 65 mol % to about 80 mol %.

Embodiment 37. The chemically strengthened glass article of embodiment 35 or 36, further comprising: a non-zero amount of $P_2O_5$; and $K_2O$ in an amount of less than 1.0 mol %.

Embodiment 38. The chemically strengthened glass article of any one of embodiments 34-37, further comprising a concentration of a metal oxide that is both non-zero and varies along a thickness range from about 0•t to about 0.3•t, wherein the metal oxide comprises any one or more of $Na_2O$, $K_2O$ $Rb_2O$, and $Cs_2O$.

Embodiment 39. The chemically strengthened glass article of any one of embodiments 34-38, wherein the concentration of the metal oxide is non-zero and varies along the entire thickness.

Embodiment 40. The chemically strengthened glass article of any one of embodiments 34-39, wherein the metal oxide generates a stress along the thickness range.

Embodiment 41. The chemically strengthened glass article of any one of embodiments 34-40, wherein the concentration of the metal oxide decreases from the first surface to a value at a point between the first surface and the second surface and increases from the value to the second surface.

Embodiment 42. The chemically strengthened glass article of any one of embodiments 34-41, further comprising a maximum central tension greater than about 40 MPa.

Embodiment 43. The chemically strengthened glass article of embodiment 42, wherein the maximum CT is in the range from about 40 MPa to about 100 MPa.

Embodiment 44. The chemically strengthened glass article of embodiment 43, further comprising a Young's modulus of less than 85 MPa.

Embodiment 45. The chemically strengthened glass article of any one of embodiments 34-44, wherein the article survives a maximum surface impact force of from about 400N to about 851N, as measured by the Surface Threshold Failure Impact Force test.

Embodiment 46. The chemically strengthened glass article of any one of embodiments 34-45, wherein the article survives an average edge incident impact force of from about greater than 200N to about 500N, as measured by the Edge Threshold Failure Impact Force test.

Embodiment 47. The chemically strengthened glass article of any one of embodiments 34-46, wherein the article survives an edge incident impact energy of from about greater than 0.43 J to about 1.3 J, as measured by the Edge Threshold Failure Impact Force test.

Embodiment 48. A device comprising:
a housing having front, back, and side surfaces;
electrical components that are at least partially inside the housing;

a display at or adjacent to the front surface of the housing; and a cover article disposed over the display, wherein at least one of the cover article and at least a portion of the housing comprises the chemically strengthened glass article of any one of embodiments 34-47.

Embodiment 49. A chemically strengthened glass article comprising:

a first major surface and a second major surface opposing the first surface defining a thickness (t) of about less than about 3 millimeters;

a composition comprising $Li_2O$ in an amount less than or equal to about 10 mol %; $P_2O_5$; greater than about 0.9 mol % $B_2O_3$; Al2O3 in an amount greater than or equal to 10 mol %; and from about 0.5 mol % to about 12 mol % $Na_2O$; and a stress profile extending along the thickness, wherein at least one point of the stress profile between a thickness range from about 0•t up to 0.3•t and at least one point of the stress profile from a thickness greater than 0.7•t, comprise a tangent having a slope with an absolute value that is greater than about 0.1 MPa/micrometer, wherein the stress profile comprises a maximum CS, a DOC and a maximum CT of less than about 100 MPa, wherein the ratio of maximum CT to absolute value of maximum CS is in the range from about 0.01 to about 0.2 and wherein the DOC is about 0.1•t or greater.

Embodiment 50. A chemically strengthened glass article comprising:

a first major surface and a second major surface opposing the first surface defining a thickness (t) of about less than about 3 millimeters;

a composition comprising: $SiO_2$ in an amount in the range from about 60 mol % to about 80 mol %; Al2O3 in an amount greater than or equal to about 10 mol %; $Li_2O$ in an amount in the range from about 4 mol % to about 11 mol %; $B_2O_3$ in an amount in the range of from about 0.9 mol % to about 7.5 mol %; the total amount of $B_2O_3$, $P_2O_5$, $SiO_2$ and $Al_2O_3$ is about 80 mol % or greater; and the ratio of $Li_2O$ to the total amount of $B_2O_3$, $P_2O_5$, $SiO_2$ and $Al_2O_3$ is less than 0.074; and a stress profile extending along the thickness, wherein at least one point of the stress profile between a thickness range from about 0•t up to 0.3•t and at least one point of the stress profile from a thickness greater than 0.7•t, comprise a tangent having a slope with an absolute value that is greater than about 0.1 MPa/micrometer, wherein the stress profile comprises a maximum CS, a DOC and a maximum CT of less than about 100 MPa, wherein the ratio of maximum CT to absolute value of maximum CS is in the range from about 0.01 to about 0.2 and wherein the DOC is about 0.1•t or greater.

Embodiment 51. The chemically strengthened glass article of embodiment 50, wherein the amount of $SiO_2$ is in the range from about 65 mol % to about 80 mol %.

Embodiment 52. The chemically strengthened glass article of embodiment 50 or 51, further comprising: a non-zero amount of $P_2O_5$; and $K_2O$ in an amount of less than 1.0 mol %.

Embodiment 53. The chemically strengthened glass article of any one of embodiments 49-52, further comprising a surface CS of about 300 MPa or greater.

Embodiment 54. The chemically strengthened glass article of any one of embodiments 49-53, further comprising a Young's modulus of less than 85 MPa.

Embodiment 55. The chemically strengthened glass article of any one of embodiments 49-54, further comprising a surface CS of about 200 MPa or greater and a maximum chemical depth of about 0.4•t or greater.

Embodiment 56. The chemically strengthened glass article of any one of embodiments 49-55, further comprising a CS layer extending from the first surface to a DOC, wherein the DOC is about 0.1•t or greater.

Embodiment 57. The chemically strengthened glass article of any one of embodiments 49-56, further comprising a CT region, wherein the CT region comprises a metal oxide concentration gradient and wherein the metal oxide comprises any one or more of $Na_2O$, $K_2O$ $Rb_2O$, and $Cs_2O$.

Embodiment 58. The chemically strengthened glass article of any one of embodiments 49-57, further comprising ratio of maximum CT to surface CS in the range from about 0.01 to about 0.2.

Embodiment 59. The chemically strengthened glass article of any one of embodiments 49-58, wherein the glass article comprises a Knoop Lateral Cracking Scratch Threshold greater than about 6 N, as measured on either one of the first major surface and the second major surface.

Embodiment 60. The chemically strengthened glass article of any one of embodiments 49-59, wherein the article survives a maximum surface impact force of from about 400N to about 851N, as measured by the Surface Threshold Failure Impact Force test.

Embodiment 61. The chemically strengthened glass article of any one of embodiments 49-60, wherein the article survives an average edge incident impact force of from about greater than 200N to about 500N, as measured by the Edge Threshold Failure Impact Force test.

Embodiment 62. The chemically strengthened glass article of any one of embodiments 49-61, wherein the article survives an edge incident impact energy of from about greater than 0.43 J to about 1.3 J, as measured by the Edge Threshold Failure Impact Force test.

Embodiment 63. A consumer electronic product, comprising:

a housing having a front surface, a back surface and side surfaces;

electrical components at least partially within the housing, the electrical components including at least a controller, a memory, and a display, the display being provided at or adjacent the front surface of the housing; and a cover substrate disposed over the display, wherein at least one of a portion of the housing or the cover substrate comprises the strengthened glass article of any one of embodiments 49-62.

Embodiment 64. A chemically strengthened glass article comprising:

a first major surface and an opposing second major surface defining a thickness t in the range from about 0.3 mm to about 1.5 mm, a composition of alkalialuminosilicate comprising $Li_2O$ and $B_2O_3$;

a compressive stress (CS) layer extending from the first major surface to a depth of compression (DOC) greater than about 0.12 t, wherein the CS layer comprises a maximum stress of about 200 MPa or greater, and wherein the glass article comprises a Knoop Lateral Cracking Scratch Threshold greater than about 6 N, as measured on either one of the first major surface and the second major surface, and wherein at least one of:
(i) the article survives a maximum surface impact force of from about 400N to about 851N, as measured by the Surface Threshold Failure Impact Force test;
(ii) the article survives an average edge incident impact force of from about greater than 200N to about 500N, as measured by the Edge Threshold Failure Impact Force test; and
(iii) the article survives an edge incident impact energy of from about greater than 0.43 J to about 1.3 J, as measured by the Edge Threshold Failure Impact Force test.

Embodiment 65. The chemically strengthened glass article of Embodiment 64, wherein the composition further comprises: a composition $SiO_2$ in an amount in the range from about 60 mol % to about 80 mol %; Al2O3 in an amount greater than or equal to about 10 mol %; $Li_2O$ in an amount in the range from about 4 mol % to about 11 mol %; $B_2O_3$ in an amount in the range of from about 0.9 mol % to about 7.5 mol %; the total amount of $B_2O_3$, $P_2O_5$, $SiO_2$ and $Al_2O_3$ is about 80 mol % or greater; andthe ratio of $Li_2O$ to the total amount of $B_2O_3$, $P_2O_5$, $SiO_2$ and $Al_2O_3$ is less than 0.074.

Embodiment 66. The chemically strengthened glass article of Embodiment64 or Embodiment 65, further comprising: a non-zero amount of $P_2O_5$; and $K_2O$ in an amount of less than 1.0 mol %.

Embodiment 67. The chemically strengthened glass article of any one of Embodiments 64-66, further comprising a concentration of a metal oxide that is both non-zero and varies along a thickness range from about 0•t to about 0.3•t, wherein the metal oxide comprises any one or more of $Na_2O$, $K_2O$ $Rb_2O$, and $Cs_2O$.

Embodiment 68. The chemically strengthened glass article of any one of Embodiments 64-67, wherein the concentration of the metal oxide is non-zero and varies along the entire thickness.

Embodiment 69. The chemically strengthened glass article of any one of Embodiments 64-68, wherein the metal oxide generates a stress along the thickness range.

Embodiment 70. The chemically strengthened glass article of any one of Embodiments 64-69, wherein the concentration of the metal oxide decreases from the first surface to a value at a point between the first surface and the second surface and increases from the value to the second surface.

Embodiment 71. The chemically strengthened glass article of any one of Embodiments 64-70, further comprising a maximum central tension in the range from about 40 MPa to about 100 MPa.

Embodiment 72. The chemically strengthened glass article of Embodiment 71, further comprising a Young's modulus of less than 85 MPa.

Embodiment 73. The chemically strengthened glass article of any one of Embodiments 64-72, wherein the amount of $SiO_2$ is in the range from about 65 mol % to about 80 mol %.

Embodiment 74. A device comprising:
a housing having front, back, and side surfaces;
electrical components that are at least partially inside the housing;
a display at or adjacent to the front surface of the housing; and
a cover article disposed over the display, wherein at least one of the cover article and at least a portion of the housing comprises the chemically strengthened glass article of any one of Embodiments 64-73.

What is claimed is:
1. A glass article comprising a composition, the composition comprising:
$SiO_2$ in an amount in the range from about 60 mol % to about 80 mol %;
$Al_2O_3$ in an amount in the range from about 10 mol % to about 20 mol %;
$Li_2O$ in an amount in the range from about 4 mol % to about 6 mol %;
$Na_2O$ in an amount in the range from about 4.5 mol % to about 12 mol %, wherein the amount of $Na_2O$ is greater than the amount of $Li_2O$;
ZnO in an amount in the range from about 0.5 mol % to about 3 mol %;
$B_2O_3$ in an amount in the range of from about 0.9 mol % to about 7.5 mol %; and
$P_2O_5$ in an amount in the range of from 0 mol % to about 10 mol %, wherein:
the total amount of $B_2O_3$, $P_2O_5$, $SiO_2$ and $Al_2O_3$ is about 80 mol % or greater;
the ratio of $Li_2O$ to the total amount of $B_2O_3$, $P_2O_5$, $SiO_2$ and $Al_2O_3$ is from 0.065 to less than 0.074; and
the glass article excludes glass-ceramic materials and the composition is free of nucleating agents.

2. The glass article of claim 1, further comprising: a non-zero amount of $P_2O_5$; and $K_2O$ in an amount of less than 1.0 mol %.

3. The glass article of claim 1, wherein the composition is substantially free of $K_2O$.

4. The glass article of claim 1, wherein the composition further comprises $SnO_2$.

5. The glass article of claim 1, wherein the composition further comprises less than about 1.5 mol % $ZrO_2$.

6. The glass article of claim 1, wherein the composition further comprises RO, wherein RO comprises any one or more of MgO, CaO, SrO, and BaO, and wherein the total amount of RO is in the range of at least one of: from about 0.05 mol % to about 4 mol %; and from about 0.05 mol % to about 2 mol %.

7. A chemically strengthened glass article comprising:
a first major surface and an opposing second major surface defining a thickness t in the range from about 0.3 mm to about 1.5 mm,
a composition comprising: $SiO_2$ in an amount in the range from about 60 mol % to about 80 mol %; $Al_2O_3$ in an amount in the range from about 10 mol % to about 20 mol %; $Li_2O$ in an amount in the range from about 4 mol % to about 6 mol %; $Na_2O$ in an amount in the range from about 4.5 mol % to about 12 mol %, wherein the amount of $Na_2O$ is greater than the amount of $Li_2O$; ZnO in an amount in the range of from about 0.5 mol % to about 3 mol %; $B_2O_3$ in an amount in the range of from about 0.9 mol % to about 7.5 mol %; $P_2O_5$ in an amount in the range from 0 mol % to about 10 mol %, wherein the total amount of $B_2O_3$, $P_2O_5$, $SiO_2$ and $Al_2O_3$ is about 80 mol % or greater; and the ratio of $Li_2O$ to the total amount of $B_2O_3$, $P_2O_5$, $SiO_2$ and $Al_2O_3$ is from 0.065 to less than 0.074;
a compressive stress (CS) layer extending from the first major surface to a depth of compression (DOC) greater than about 0.12 t,
wherein the CS layer comprises a maximum stress of about 550 MPa or greater,
wherein the glass article excludes glass-ceramic materials and the composition is free of nucleating agents, and wherein the glass article comprises a Knoop Lateral Cracking Scratch Threshold greater than about 6 N, as measured on either one of the first major surface and the second major surface.

8. The chemically strengthened glass article of claim 7, further comprising: a non-zero amount of $P_2O_5$; and $K_2O$ in an amount of less than 1.0 mol %.

9. The chemically strengthened glass article of claim 7, further comprising a concentration of a metal oxide that is both non-zero and varies along a thickness range from about 0·t to about 0.3·t, wherein the metal oxide comprises any one or more of $Na_2O$, $K_2O$ $Rb_2O$, and $Cs_2O$.

10. The chemically strengthened glass article of claim 9, wherein the concentration of the metal oxide is non-zero and varies along the entire thickness.

11. The chemically strengthened glass article of claim 9, wherein the metal oxide generates a stress along the thickness range.

12. The chemically strengthened glass article of claim 9, wherein the concentration of the metal oxide decreases from the first surface to a value at a point between the first surface and the second surface and increases from the value to the second surface.

13. The chemically strengthened glass article of claim 7, further comprising a maximum central tension in the range from about 40 MPa to about 100 MPa.

14. The chemically strengthened glass article of claim 13, further comprising a Young's modulus of less than 85 MPa.

15. The chemically strengthened glass article of claim 7, wherein at least one of:
(i) the article survives a maximum surface impact force of from about 400N to about 851N, as measured by the Surface Threshold Failure Impact Force test;
(ii) the article survives an average edge incident impact force of from about greater than 200N to about 500N, as measured by the Edge Threshold Failure Impact Force test; and
(iii) the article survives an edge incident impact energy of from about greater than 0.43 J to about 1.3 J, as measured by the Edge Threshold Failure Impact Force test.

16. A device comprising:
a housing having front, back, and side surfaces;
electrical components that are at least partially inside the housing;
a display at or adjacent to the front surface of the housing; and
a cover article disposed over the display, wherein at least one of the cover article and at least a portion of the housing comprises the chemically strengthened glass article of claim 7.

17. A chemically strengthened glass article comprising:
a first major surface and a second major surface opposing the first surface defining a thickness (t) of about less than about 3 millimeters;
a composition comprising: $SiO_2$ in an amount in the range from about 60 mol % to about 80 mol %; $Al_2O_3$ in an amount in the range from about 10 mol % to about 20 mol %; $Li_2O$ in an amount in the range from about 4 mol % to about 6 mol %; $Na_2O$ in an amount in the range from about 4.5 mol % to about 12 mol %, wherein the amount of $Na_2O$ is greater than the amount of $Li_2O$; ZnO in an amount in the range of from about 0.5 mol % to about 3 mol %; $B_2O_3$ in an amount in the range of from about 0.9 mol % to about 7.5 mol %; $P_2O_5$ in an amount in the range from 0 mol % to about 10 mol %, wherein the total amount of $B_2O_3$, $P_2O_5$, $SiO_2$ and $Al_2O_3$ is about 80 mol % or greater; and the ratio of $Li_2O$ to the total amount of $B_2O_3$, $P_2O_5$, $SiO_2$ and $Al_2O_3$ is from 0.065 to less than 0.074; and
a stress profile extending along the thickness,
wherein at least one point of the stress profile between a thickness range from about 0·t up to 0.3·t and at least one point of the stress profile from a thickness greater than 0.7·t, comprise a tangent having a slope with an absolute value that is greater than about 0.1 MPa/micrometer,
wherein the stress profile comprises a maximum CS, a DOC and a maximum CT of less than about 100 MPa, wherein the ratio of maximum CT to absolute value of maximum CS is in the range from about 0.01 to about 0.2 and wherein the DOC is about 0.1·t or greater; and
wherein the glass article excludes glass-ceramic materials and the composition is free of nucleating agents.

18. The chemically strengthened glass article of claim 17, further comprising: a non-zero amount of $P_2O_5$; and $K_2O$ in an amount of less than 1.0 mol %.

19. The chemically strengthened glass article of claim 17, further comprising a Young's modulus of less than 85 MPa.

20. The chemically strengthened glass article of claim 17, further comprising a surface CS of about 550 MPa or greater and a maximum chemical depth of about 0.4·t or greater.

21. The chemically strengthened glass article of claim 17, further comprising a CT region, wherein the CT region comprises a metal oxide concentration gradient and wherein the metal oxide comprises any one or more of $Na_2O$, $K_2O$ $Rb_2O$, and $Cs_2O$.

22. The chemically strengthened glass article of claim 17, further comprising a ratio of maximum CT to surface CS in the range from about 0.01 to about 0.2.

23. The chemically strengthened glass article of claim 17, wherein the glass article comprises a Knoop Lateral Cracking Scratch Threshold greater than about 6 N, as measured on either one of the first major surface and the second major surface.

24. The chemically strengthened glass article of claim 17, wherein at least one of:
(i) the article survives a maximum surface impact force of from about 400N to about 851N, as measured by the Surface Threshold Failure Impact Force test;
(ii) the article survives an average edge incident impact force of from about greater than 200N to about 500N, as measured by the Edge Threshold Failure Impact Force test; and
(iii) the article survives an edge incident impact energy of from about greater than 0.43 J to about 1.3 J, as measured by the Edge Threshold Failure Impact Force test.

* * * * *

UNITED STATES PATENT AND TRADEMARK OFFICE
CERTIFICATE OF CORRECTION

PATENT NO. : 11,279,649 B2
APPLICATION NO. : 15/606596
DATED : March 22, 2022
INVENTOR(S) : Timothy Michael Gross et al.

It is certified that error appears in the above-identified patent and that said Letters Patent is hereby corrected as shown below:

In the Claims

In Column 63, Line 12, in Claim 9, delete "$K_2O$" and insert -- $K_2O$, --.

In Column 64, Line 36, in Claim 21, delete "$K_2O$" and insert -- $K_2O$, --.

Signed and Sealed this
Twentieth Day of December, 2022

*Katherine Kelly Vidal*
Katherine Kelly Vidal
*Director of the United States Patent and Trademark Office*